United States Patent

Sasaki et al.

Patent Number: 5,870,477
Date of Patent: Feb. 9, 1999

[54] ENCIPHERING/DECIPHERING DEVICE AND METHOD, AND ENCRYPTION/DECRYPTION COMMUNICATION SYSTEM

[75] Inventors: Minoru Sasaki, Atsugi; Hiroharu Yoshikawa, Zama, both of Japan

[73] Assignee: Pumpkin House Incorporated, Kanagawa-ken, Japan

[21] Appl. No.: 619,601

[22] PCT Filed: Sep. 29, 1994

[86] PCT No.: PCT/JP94/01617

§ 371 Date: Mar. 29, 1996

§ 102(e) Date: Mar. 29, 1996

[87] PCT Pub. No.: WO95/09410

PCT Pub. Date: Apr. 6, 1995

[30] Foreign Application Priority Data

Sep. 29, 1993 [JP] Japan ................................. 5-264058
Dec. 24, 1993 [JP] Japan ................................. 5-345785

[51] Int. Cl.⁶ .................................................. H04L 9/00
[52] U.S. Cl. .................................. 380/25; 380/21; 380/30
[58] Field of Search .................................. 380/25, 30, 21

[56] References Cited

U.S. PATENT DOCUMENTS 5,200,999  4/1993  Matyas et al. ............................. 380/3
5,201,000  4/1993  Matyas et al. ............................. 380/3

FOREIGN PATENT DOCUMENTS 62-287388  12/1987  Japan.
3-265888   11/1991  Japan.
5-289612   11/1993  Japan.

OTHER PUBLICATIONS

"Protecting Public Keys and Signature Keys", by Dorothy E. Denning, Computer, vol. 16, No. 2, Feb. 1983, pp. 27–35.

"System for Safe User Certification by Single Control Information", by Ryumei Okamoto, et al, IN83–85–92, vol. 83, No. 253, Jan. 25, 1984.

Primary Examiner—Salvatore Cangialosi
Attorney, Agent, or Firm—McDermott, Will & Emery

[57] ABSTRACT

A plaintext file 41 is enciphered using a file key 44, to generate ciphertext 42. The file key 44 is enciphered using a secret key 47 and a management key 48, respectively, to form an enciphered key 1 (45) and an enciphered key 2 (46). An enciphered file 43 is produced from the ciphertext 42, the enciphered key 1 and the enciphered key 2. At the time of decryption, the enciphered key 1 is taken out from the enciphered file 43. The enciphered key 1 taken out is deciphered using a secret key 47, to obtain a file key 44. The ciphertext 42 is deciphered using the file key 44, to obtain the plaintext 41.

39 Claims, 73 Drawing Sheets

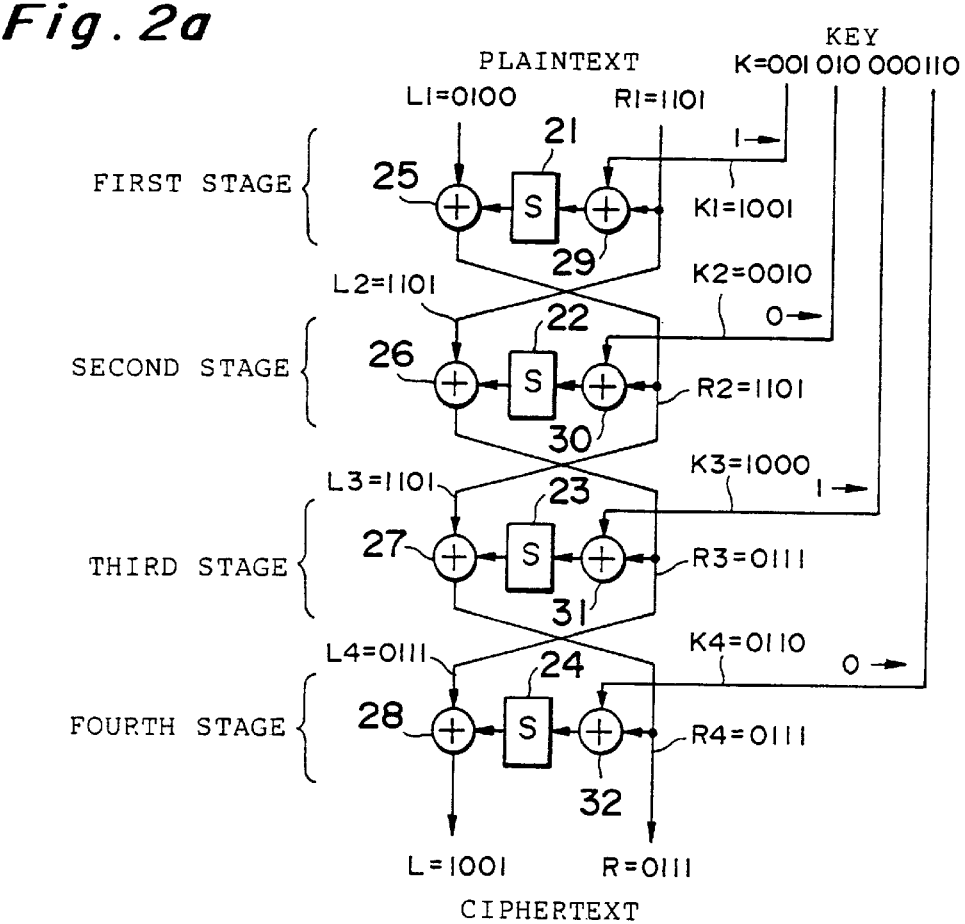

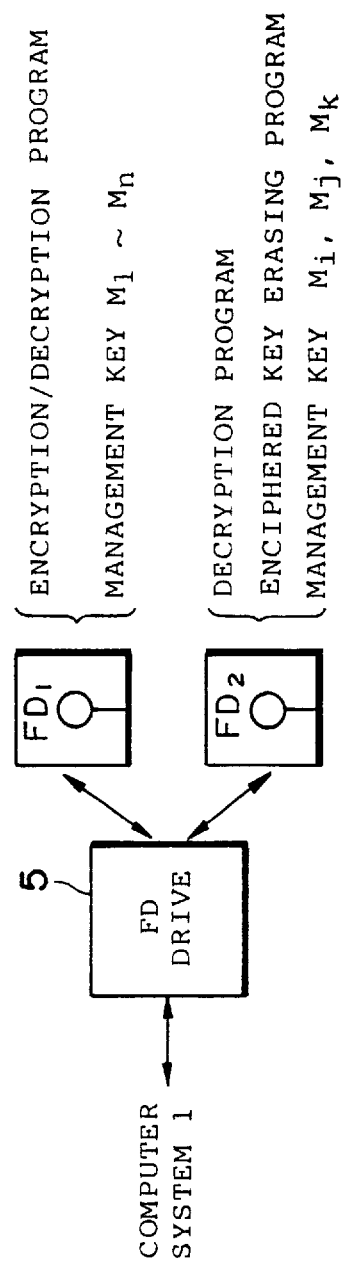

Fig. 37

ENCIPHERED FILE

| | |
|---|---|
| VERSION NUMBER | ; NUMBER INDICATING TYPE OF OPFD USED FOR CREATION |
| CREATOR DECRYPTION INHIBITION INFORMATION | ; NAME OF OPFD USED FOR INHIBITION |
| IDs | ; IDs FOR SPFD USED FOR CREATION (INHERENT NAME OF SVFD + INHERENT IDENTIFICATION DATA) |
| IDm | ; IDm FOR OPFD USED FOR CREATION (INHERENT NAME OF OPFD + INHERENT IDENTIFICATION DATA) |
| IDf | ; FILE NUMBER REGISTERED BY OPFD USED FOR CREATION (ID INHERENT TO ENCIPHERED FILE) |
| FILE NAME OF PLAINTEXT | |
| ENCIPHERED KEY 1 | |
| ENCIPHERED KEY 2 | |
| SIZE OF CIPHERTEXT | |
| CIPHERTEXT DATA | |

Fig. 38

MANAGEMENT KEY FILE 1
(SVFD)

| Field | Description |
|---|---|
| ENCIPHERED PASSWORD | ; PASSWORD FOR AUTHENTICATING USER |
| VERSION NUMBER | ; NUMBER INDICATING TYPE OF SVFD |
| IDs | ; IDs FOR SVFD |
| IDm-j | ; IDm FOR OPFD-j |
| ENCIPHERED MANAGEMENT KEY - j | ; DATA OBTAINED BY ENCIPHERING MANAGEMENT KEY IN OPFD-j |
| CUSTOMIZATION FLAG | ; 0 : NOT CUSTOMIZED<br>1 : CUSTOMIZED |
| IDm-k | ; IDm FOR OPFD-k |
| ENCIPHERED MANAGEMENT KEY - k | ; DATA OBTAINED BY ENCIPHERING MANAGEMENT KEY IN OPFD-k |
| CUSTOMIZATION FLAG | |
| ⋮ | |
| IDm-n | ; IDm FOR OPFD-n |
| ENCIPHERED MANAGEMENT KEY - n | ; DATA OBTAINED BY ENCIPHERING MANAGEMENT KEY IN OPFD-n |
| CUSTOMIZATION FLAG | |

Fig. 39

REGISTERED NAME READING FILE (SVFD)

| |
|---|
| IDs |
| NAME OF OPFD-j |
| NAME -1 OF OPFD TO BE MANAGED |
| NAME -2 OF OPFD TO BE MANAGED |
| ⋮ |
| NAME OF OPFD-k |
| NAME -1 FOR OPFD TO BE MANAGED |
| NAME -2 FOR OPFD TO BE MANAGED |
| ⋮ |
| NAME OF OPFD-n |
| NAME -1 FOR OPFD TO BE MANAGED |
| NAME -2 FOR OPFD TO BE MANAGED |
| ⋮ |

; NAME OF OPFD MANAGED BY OPFD-j

; NAME OF OPFD MANAGED BY OPFD-k

; NAME OF OPFD MANAGED BY OPFD-n

Fig. 40

SECRET KEY FILE (OPFD)

| | |
|---|---|
| VERSION NUMBER | ; NUMBER INDICATING TYPE OF OPFD |
| ENCIPHERED PASSWORD | ; PASSWORD FOR AUTHENTICATING USER |
| IDs | ; REGISTERED IDs FOR SVFD |
| IDmi | ; IDm FOR ITS OWN |
| ENCIPHERED MANAGEMENT KEY - i | ; DATA OBTAINED BY ENCIPHERING ITS OWN MANAGEMENT KEY |
| IDf-1 | ; ID FOR CREATED ENCIPHERED FILE |
| ENCIPHERED SECRET KEY - 1 | ; DATA OBTAINED BY ENCIPHERING SECRET KEY OF ENCIPHERED FILE |
| IDf-2 | |
| ENCIPHERED SECRET KEY - 2 | |
| ⋮ | |
| IDf-p | |
| ENCIPHERED SECRET KEY - p | |

Fig. 41

MANAGEMENT KEY FILE 2 (OPFD)

| IDm-j | ; REGISTERED IDm FOR OPFD |
|---|---|
| ENCIPHERED MANAGEMENT KEY - j | ; REGISTERED MANAGEMENT KEY IN OPFD |
| IDm-k | |
| ENCIPHERED MANAGEMENT KEY - k | |
| ⋮ | |
| IDm-q | |
| ENCIPHERED MANAGEMENT KEY - q | |

Fig. 42

PROGRAM FILE (SVFD)

| CONTROL PROGRAM 1 |
| --- |
| SYSTEM REGISTRATION PROGRAM |
| SUCCESSION PROGRAM |
| BACKUP ERASURE PROGRAM |
| PASSWORD RESETTING PROGRAM 1 |
| OPFD INHIBITION RELEASE PROGRAM |
| IDm-FOR-OPFD SETTING PROGRAM |
| REGISTERED NAME READING PROGRAM |
| OPFD CUSTOMIZATION PROGRAM |
| MANAGEMENT KEY REGISTRATION PROGRAM |
| MANAGEMENT KEY ELIMINATION PROGRAM |
| DECRYPTION PROGRAM 1 |
| FILE CHECK PROGRAM |
| INSTALLATION PROGRAM 1 |
| REVERSE INSTALLATION PROGRAM 1 |
| KEY GENERATION PROGRAM 1 |

ENCIPHERING/DECIPHERING DEVICE AND METHOD, AND ENCRYPTION/DECRYPTION COMMUNICATION SYSTEM

TECHNICAL FIELD

The present invention relates to an enciphering/deciphering device for performing at least one of encryption processing of data and decryption processing of enciphered data. Further, the present invention relates to an encryption/decryption communication system in which enciphering/deciphering devices are connected to each other through communicating means. The enciphering/deciphering device is the concept including an enciphering device for enciphering (encrypting) plaintext data, a deciphering device for deciphering (decrypting) ciphertext data, and a device for performing both encryption processing and decryption processing. Similarly, an enciphering/deciphering method is the concept including a method of enciphering plaintext data, a method of deciphering ciphertext data, and a method of performing both encryption processing and decryption processing. The encryption/decryption communication system is the concept including a communication system comprising an enciphering device, a communication system comprising a deciphering device, and a communication system comprising both the enciphering device and the deciphering device.

BACKGROUND ART

In order to prevent leakage of the contents of document data generated by a word processor, code data of a computer program, statistical data, total data, and the like, the data are enciphered.

Encryption processing has been conventionally performed using as a key used for enciphering data (an encryption key) a key entered from an input device such as a keyboard or a key selected from a key table stored in a device for performing encryption processing (a computer system, etc.).

In such a conventional method, however, an encryption key (=a decryption key) may, in some cases, be seen by a third person or orally conveyed to a third person due to carelessness of a person who performs encryption processing (a creator of ciphertext), whereby it is highly possible that the encryption key is known by the third person. Consequently, the secrecy of the data cannot be sufficiently held. When a manager of ciphertext other than the creator of ciphertext sees the contents of the ciphertext, the creator must inform the manager of a decryption key for each production of ciphertext. When the creator informs the manager of the decryption key, the decryption key may be known by the third person due to carelessness or the like. In addition, the management of a correspondence between the ciphertext and the decryption key also becomes complicated for both the creator and the manager.

Furthermore, generally in a company or the like, a staff member generates ciphertext, and his or her superior manages the ciphertext. In such a case, the superior desires to prevent the ciphertext from being deciphered and known by a third person due to carelessness of the staff member by making it impossible for the staff member to decipher the ciphertext. That is, the superior has a strong request to intensively manage the secrecy of the ciphertext.

DISCLOSURE OF THE INVENTION

An object of the present invention is to prevent a key used at the time of encryption from being easily known by a third person. An object of the present invention is to make it easy to manage a correspondence between ciphertext and a key used for encryption. An object of the present invention is to make it possible for a manager to intensively manage ciphertext.

An enciphering/deciphering device according to the first invention comprises data encryption key forming means for forming a data encryption key used for enciphering plaintext data, secret key forming means for forming a secret key used for enciphering the data encryption key formed by the data encryption key forming means, management key forming means for forming a management key used for enciphering the data encryption key formed by the data encryption key forming means, data enciphering means for enciphering the plaintext data using the data encryption key to form ciphertext data, first key enciphering means for enciphering the data encryption key using the secret key to form a first enciphered key, second key enciphering means for enciphering the data encryption key using the management key to form a second enciphered key, and first storage controlling means for storing the ciphertext data, the first enciphered key, and the second enciphered key in a first storage medium.

An enciphering/deciphering method according to the first invention comprises the steps of forming a data encryption key used for enciphering plaintext data, forming a secret key used for enciphering the formed data encryption key, forming a management key used for enciphering the formed data encryption key, enciphering the plaintext data using the data encryption key to form ciphertext data, enciphering the data encryption key using the secret key to form a first enciphered key, enciphering the data encryption key using the management key to form a second enciphered key, and storing the ciphertext data, the first enciphered key and the second enciphered key in a first storage medium.

There are several methods of forming a data encryption key by data encryption key forming means. One of them is a method of generating data used for key formation and forming a data encryption key on the basis of the generated data. Arbitrary data is generated within a computer. A counted value of a counter for counting a time interval between entries using two keys by an operator, for example, can be employed for this data. The data thus generated is enciphered. A key used for encryption will be generated, similarly to the above-mentioned data. The enciphered data becomes a data encryption key.

Another method is a method of generating a first pseudo-random number and a second pseudo-random number by software or hardware and enciphering the generated first pseudo-random number using the second pseudo-random number as a key to form a data encryption key. The first pseudo-random number and the second pseudo-random number may be the same or different from each other. Alternatively, a plurality of upper bits of one random number and a plurality of lower bits thereof can be also used as the first pseudo-random number and the second pseudo-random number, respectively.

There are several methods of forming a secret key by secret key forming means. One of them is a method of generating data used for key formation and forming a secret key on the basis of the generated data. The second method is a method of generating a first pseudo-random number and a second pseudo-random number and enciphering the generated first pseudo-random number using the second pseudo-random number as a key to form a secret key. The methods are realized by the same processing as the above-mentioned formation of the data encryption key.

The third method is a method of forming a secret key on the basis of data externally inputted. For example, an operator enters his or her password from a keyboard. The entered password becomes a secret key. In this case, secret key forming means is realized by means for accepting the entry. The entered password may be enciphered using a particular key, and the enciphered password may be a secret key. The particular key may be previously set within a computer, can be also set on the basis of a time interval between key entries, for example, as described above, and can be also obtained by generating a pseudo-random number.

The fourth method is a method of forming a secret key on the basis of data stored in a storage medium externally given. A floppy disk, an IC card, a magnetic card, an optical card, and other media are used as the storage medium. The above-mentioned data stored in the storage medium may be, of course, a secret key itself. In this case, the secret key forming means is realized by means for reading the data from the storage medium. The data stored in the storage medium may be enciphered using a particular key, and the enciphered data may be a secret key.

There are also several methods of forming a management key by management key forming means. One of them is a method of forming a management key on the basis of data previously fed. For example, particular data previously stored in a ROM, a RAM, an internal disk device, or the like within a computer becomes a management key. In this case, the management key forming means is realized by means for reading data from the ROM or the like.

The second method is a method of forming a management key on the basis of data stored in a storage medium externally given. The third method is a method of generating data used for key formation and forming a management key on the basis of the generated data. The fourth method is a method of generating a first pseudo-random number and a second pseudo-random number and enciphering the generated first pseudo-random number using the second pseudo-random number as a key to form a management key. The methods are realized by the same processing as the formation of the data encryption key or the formation of the secret key.

Examples of plaintext data include various data such as document data prepared by a word processor, code data of a computer program, statistical data and total data. When the enciphered data is further enciphered, the enciphered data is included in the plaintext data.

As a method of enciphering (deciphering) plaintext data and a key, various algorithms such as a DES (Data Encryption Standard) algorithm and FEAL (Fast Encryption Algorithm) can be used. Further, it does not matter which of a symmetric cryptosystem and an asymmetric cryptosystem (of a modulo exponentiation type, a knapsack type, etc.) is used as an algorithm, and which of a block cipher and a stream cipher (a Vernam cipher, NFSR (Non-linear Feedback Shift Register), etc.) is used.

A data encryption key for enciphering plaintext data is automatically formed. Plaintext data is enciphered using the formed data encryption key, to form ciphertext data. A secret key and a management key for enciphering the data encryption key are further formed. The data encryption key is enciphered using the formed secret key, to form a first enciphered key. Further, the data encryption key is enciphered using the formed management key, to form a second enciphered key. The ciphertext data, the first enciphered key and the second enciphered key are stored in a first storage medium.

The first storage medium may be a floppy disk or a transmission buffer. In the case of the floppy disk, the ciphertext data can be handed over from a creator of ciphertext data to another person such as a manager. In the case of the transmission buffer, the ciphertext data can be transmitted to another device or the like. Further, the first storage medium may be a storage medium such as a hard disk device, an IC card, a magnetic card, or an optical card.

According to the present embodiment, a data encryption key for enciphering plaintext data is automatically formed, whereby a creator of ciphertext data need not enter a key, and need not know the contents of the key. Consequently, the data encryption key can be prevented from leaking out to a third person due to carelessness, for example, of the creator of ciphertext data.

Furthermore, ciphertext data and a data encryption key (which is enciphered as a first or second enciphered key) for deciphering the ciphertext data are stored in a first storage medium, whereby the management of a correspondence therebetween is easy. Further, the data encryption key is enciphered using a secret key and a management key, respectively. Accordingly, even if the ciphertext data and the data encryption key for deciphering the ciphertext data are stored in one storage medium, it is possible to maintain high security.

An operator who has enciphered plaintext data can have a secret key. When the secret key is formed on the basis of data inputted by the operator, the operator (the creator of ciphertext data) can use the inputted data as a secret key because he or she reasonably knows the inputted data. When the secret key is formed on the basis of encryption of the inputted data or counting, the formed secret key is stored in a storage medium (for example, a floppy disk). Alternatively, when the secret key is previously stored in a storage medium, the operator has the storage medium. Consequently, the operator can decipher the ciphertext data using the secret key in the storage medium.

A manager who manages ciphertext data can have a management key. When the management key is formed on the basis of data previously fed to the device, the manager can reasonably form the management key on the basis of the data at the time of decryption. When the management key is formed on the basis of encryption of inputted data or counting, the formed management key is stored in a storage medium (for example, a floppy disk). Alternatively, when the management key is previously stored in the storage medium, the manager has the storage medium. Consequently, the manager can decipher the ciphertext data using the management key in the storage medium.

Preferably, the data encryption key forming means generates a first pseudo-random number and a second pseudo-random number, and enciphers the generated first pseudo-random number using the second pseudo-random number as a key to form a data encryption key. Since the data encryption key is formed by further enciphering the pseudo-random number, the data encryption key can be random data, whereby it can be difficult for a third person to presume the key.

In one embodiment of the present invention, the enciphering/deciphering device comprises second storage controlling means for storing the management key formed by the management key forming means in a second storage medium. Examples of the second storage medium include various storage media such as a hard disk, a floppy disk, an IC card, a magnetic card, an optical card, and a transmission buffer. When the second storage medium is a portable medium such as a floppy disk or an IC card, the second storage medium is handed over to a manager, whereby the manager can decipher ciphertext data using a management key stored in the handed medium. By previously distributing the medium storing the management key to the manager, the creator and the manager need not know the contents of the management key and are released from trouble in managing a correspondence between the ciphertext data and the key.

There is preferably provided eliminating means for erasing the first enciphered key or the second enciphered key from the first storage medium. In a case where a creator who creates ciphertext data manages a secret key and a manager who manages ciphertext data manages a management key, the manager eliminates the first enciphered key so that the creator becomes incapable of deciphering the ciphertext data. Consequently, plaintext data obtained by the decryption can be prevented from being known by a third person due to carelessness of the creator, whereby the manager can intensively manage the secrecy of the ciphertext data. By eliminating the second enciphered key, the manager also becomes incapable of deciphering the ciphertext data. In a case where a new person takes the place of the manager, for example, therefore, it is possible to prevent the ciphertext data from being decrypted by a person who has been a manager in the past.

In one embodiment of the present invention, in the enciphering/deciphering device, the management key forming means forms a plurality of management keys. The enciphering/deciphering device comprises selecting means for selecting one of the plurality of management keys formed by the management key forming means. The second key enciphering means enciphers the data encryption key using the management key selected by the selecting means. A creator of ciphertext can select one of the plurality of management keys formed by the management key forming means using the selecting means. The data encryption key is enciphered using the selected management key, to form a second enciphered key. When a plurality of managers respectively have different management keys, the creator of ciphertext can encipher plaintext data by selecting the management key which the manager who manages the ciphertext has.

In a preferred embodiment, there are provided first key deciphering means for deciphering the first enciphered key stored in the first storage medium using the secret key to form a data encryption key, data deciphering means for deciphering the ciphertext data stored in the first storage medium using the data encryption key formed by the first key deciphering means to form plaintext data, and third storage controlling means for storing the plaintext data formed by the data deciphering means in a third storage medium. The first enciphered key is deciphered using the secret key, to form a data encryption key. The ciphertext data is deciphered using the data encryption key, to form plaintext data. The formed plaintext data is stored in the third storage medium. When a creator of ciphertext who has the secret key desires to confirm the contents of the ciphertext data, for example, the creator can decipher the ciphertext to form plaintext.

In another preferred embodiment, there are provided second key deciphering means for deciphering the second enciphered key stored in the first storage medium using the management key to form a data encryption key, data deciphering means for deciphering the ciphertext data stored in the first storage medium using the data encryption key formed by the second key deciphering means to form plaintext data, and third storage controlling means for storing the plaintext data formed by the data deciphering means in a third storage medium. The second enciphered key is deciphered using the management key, to form a data encryption key. The ciphertext data is deciphered using the data encryption key, to form plaintext data. The formed plaintext data is stored in the third storage medium. Consequently, a manager of ciphertext who has the management key can decipher the ciphertext data to form plaintext data and know the contents thereof.

Examples of the third storage medium include an internal memory (for example, a RAM) in a computer, a hard disk, a floppy disk, an IC card, a magnetic card, an optical card, and a transmission buffer.

An enciphering/deciphering device according to the second invention comprises reading means for reading out from a first storage medium storing ciphertext data, a first enciphered key and a second enciphered key the ciphertext data and the first enciphered key, secret key entering means for entering a secret key used for deciphering the first enciphered key read out by the reading means, key deciphering means for deciphering the first enciphered key using the secret key entered by the secret key entering means to form a data decryption key, data deciphering means for deciphering the ciphertext data using the data decryption key formed by the key deciphering means to form plaintext data, and storage controlling means for storing the plaintext data formed by the data deciphering means in a second storage medium.

An enciphering/deciphering method according to the second invention comprises the steps of reading out from a first storage medium storing ciphertext data, a first enciphered key and a second enciphered key the ciphertext data and the first enciphered key, deciphering the first enciphered key using an entered secret key to form a data decryption key, deciphering the ciphertext data using the formed data decryption key to form plaintext data, and storing the formed plaintext data in a second storage medium.

Examples of the first and second storage media include various media such as an internal memory (for example, a RAM) in a computer, a transmission buffer, a magnetic disk, an optical disk, a floppy disk, an IC card, a memory card, and an optical card.

Examples of the secret key entering means include a keyboard or a pointing device for entering a secret key, and a device for reading a secret key from a storage medium (a floppy disk, an IC card, a magnetic card, an optical card, etc.). When the secret key is entered from the keyboard or the like, the same key as the secret key formed when the plaintext data is enciphered in the enciphering/deciphering device according to the first invention will be entered. The same key as the secret key formed when the plaintext data is enciphered is stored in the storage medium. The secret key may be individually stored. When the ciphertext data is stored as a file, the secret key may be stored in such a form as to have a correspondence with the name of the file.

The first enciphered key stored in the first storage medium is deciphered using the entered secret key, to form a data encryption key. The ciphertext data stored in the first storage medium is deciphered using the data encryption key, to form plaintext data. The formed plaintext data is stored in the second storage medium. According to the present invention, a person who has a secret key, that is, the above-mentioned creator of ciphertext can decipher the ciphertext data to form plaintext data. Consequently, the creator can know the contents of the ciphertext data when required.

There is preferably provided eliminating means for erasing the first enciphered key or the second enciphered key from the first storage medium. Consequently, the creator of ciphertext becomes incapable of deciphering the ciphertext data, whereby a person who has a management key, that is, the above-mentioned manager of ciphertext can intensively manage the secrecy of the ciphertext data. By eliminating the second enciphered key, the manager also becomes incapable of deciphering the ciphertext data. In a case where a new person takes the place of the manager, for example, therefore, it is possible to prevent the ciphertext data from being deciphered by a person who has been a manager in the past.

An enciphering/deciphering device according to the third invention comprises reading means for reading out from a first storage medium storing ciphertext data, a first enciphered key and a second enciphered key the ciphertext data and the second enciphered key, management key entering means for entering a management key used for deciphering the second enciphered key read out by the reading means, key deciphering means for deciphering the second enciphered key using the management key entered by the management key entering means to form a data decryption key, data deciphering means for deciphering the ciphertext data using a data decryption key formed by the key deciphering means to form plaintext data, and storage controlling means for storing the plaintext data formed by the data deciphering means in a second storage medium.

An enciphering/deciphering method according to the third invention comprises the steps of reading out from a first storage medium storing ciphertext data, a first enciphered key and a second enciphered key the ciphertext data and the second enciphered key, deciphering the second enciphered key using an entered management key to form a data decryption key, deciphering the ciphertext data using the formed data decryption key to generate plaintext data, and storing the formed plaintext data in a second storage medium.

Examples of the first and second storage media include various media such as an internal memory (for example, a RAM) in a computer, a transmission buffer, a magnetic disk, an optical disk, a floppy disk, an IC card, a memory card, and an optical card.

Examples of the management key entering means include a device for reading a management key from a storage medium. Examples of the storage medium include a floppy disk, an IC card, a magnetic card, an optical card, and a buffer for receiving transmitted data. The same key as the management key formed by the above-mentioned enciphering/deciphering device for enciphering plaintext is stored in the storage medium. The management key may be individually stored or may be stored in such a form as to have a correspondence with ciphertext data (for example, in such a form as to have a correspondence with the file name of ciphertext data).

The second enciphered key stored in the first storage medium is deciphered using the entered management key, to form a data encryption key. The ciphertext data stored in the first storing means is deciphered using the data encryption key, to form plaintext data. The formed plaintext data is stored in the second storing means. According to the present embodiment, a person who has a management key, that is, the above-mentioned manager of ciphertext can decipher the ciphertext data to form plaintext data. Consequently, the manager can know the contents of the ciphertext data when required.

There is preferably provided eliminating means for erasing the first enciphered key or the second enciphered key from the first storage medium. Consequently, a person who has a secret key, that is, the above-mentioned creator of ciphertext becomes incapable of deciphering the ciphertext data, whereby the manager of ciphertext can intensively manage the secrecy of the ciphertext data. By eliminating the second enciphered key, the manager also becomes incapable of deciphering the ciphertext data. In a case where a new person takes the place of the manager, for example, therefore, it is possible to prevent the ciphertext data from being deciphered by a person who has been a manager in the past.

An encryption/decryption communication system according to the fourth invention is an encryption/decryption communication system in which a plurality of enciphering/deciphering devices are connected to each other through communicating means. The enciphering/deciphering device comprises data encryption key forming means for generating a data encryption key used for enciphering plaintext data, management key forming means for forming a management key used for enciphering the data encryption key formed by the data encryption key forming means, data enciphering means for enciphering the plaintext data using the data encryption key to form ciphertext data, key enciphering means for enciphering the data encryption key using the management key to form an enciphered key, and first transmitting means for transmitting the ciphertext data and the enciphered key.

The formation of the data encryption key by the data encryption key forming means and the formation of the management key by the management key forming means are performed by the same processing as that in the above-mentioned first invention. A plurality of different management keys can be also formed. In this case, the data encryption key is enciphered using the management key selected from the plurality of management keys.

The data encryption key for enciphering plaintext data is automatically formed. Plaintext data is enciphered using the formed data encryption key, to form ciphertext data. Further, a management key for enciphering the data encryption key is formed. The data encryption key is enciphered using the formed management key, to form an enciphered key. The ciphertext data and the enciphered key are transmitted by the first transmitting means. According to the present invention, the ciphertext data and the enciphered key formed by the enciphering/deciphering device can be transmitted through the communicating means. Since both the ciphertext data and a data encryption key for deciphering the ciphertext data are transmitted, the management of a correspondence therebetween is easy. Further, the data encryption key is enciphered using the management key. Even if both the ciphertext data and the data encryption key for deciphering the ciphertext data are transmitted, therefore, it is possible to maintain high security.

The enciphering/deciphering device preferably comprises first receiving means for receiving the ciphertext data and the enciphered key transmitted by the first transmitting means, management key entering means for entering a management key used for deciphering the enciphered key received by the first receiving means, key deciphering means for deciphering the enciphered key received by the first receiving means using the management key entered by the management key entering means to form a data encryption key, data deciphering means for deciphering the ciphertext data received by the first receiving means using the data encryption key formed by the key deciphering means to form plaintext data, and storage controlling means for storing the plaintext data formed by the data deciphering means in a first storage medium.

The management key entered by the management key entering means is the same as that used for enciphering the data encryption key when the plaintext data is enciphered in the enciphering/deciphering device on the transmission side. Examples of the entry of the management key by the management key entering means include entry of the management key from the second storage medium externally given (a floppy disk, an IC card, a magnetic card, an optical card, etc.). In this case, the management key entering means is realized by means for reading out the management key from the second storage medium. The management key transmitted from the enciphering/deciphering device on the transmission side may, in some cases, be previously stored in the second storage medium. A receiving person may enter a management key previously distributed by mail or the like using a keyboard or the like, or may read out a management key stored in an internal memory (a ROM, an internal disk, etc.) in the device. Further, it is also possible to encipher the inputted data using a particular key and use the enciphered data as a management key.

A plurality of different management keys can be also entered. When each of the management keys and each of a plurality of devices on the transmission side correspond to each other, the management key corresponding to the device on the transmission side which has transmitted data is selected and is used for decryption. The selection may be carried out by an operator. Alternatively, when the management key is entered (stored) by establishing a correspondence with an identification code of the device on the transmission side, the management key corresponding to the identification code of the device on the transmission side and included in the transmitted data may be also selected by the selecting means. Data indicating which management key should be used can be also transmitted to the device on the receiving side by the device on the transmission side. In the device on the receiving side, the management key is selected by the operator or the selecting means in accordance with the data, and is used for decryption.

Examples of the first storage medium include an internal memory (for example, a RAM) and an internal disk storage device in the enciphering/deciphering device, or a floppy disk, an IC card, an optical card, and a magnetic card. The first storage medium and the second storage medium may be the same.

The ciphertext data and the enciphered key transmitted by the first transmitting means in the enciphering/deciphering device on the transmission side are received by the first receiving means in the enciphering/deciphering device on the receiving side. On the receiving side, the received enciphered key is deciphered using the management key entered by the management key entering means, to obtain a data encryption key. The received ciphertext data is deciphered using the data encryption key, to obtain plaintext data. According to the present invention, the ciphertext data received through the communicating means can be deciphered in the device on the receiving side, and the receiving person can know the contents of the ciphertext data. Since both the ciphertext data and the data encryption key (which is enciphered as an enciphered key using the management key) are received, the management of a correspondence therebetween is easy.

In one embodiment, there is provided second transmitting means for transmitting the management key formed by the management key forming means. In this embodiment, the management key is transmitted by the second transmitting means. A device to which the management key is to be transmitted is an enciphering/deciphering device to which the ciphertext data and the enciphered key are to be transmitted. The management key is transmitted to the enciphering/deciphering device which has received the ciphertext data, whereby the ciphertext data can be deciphered in the device on the receiving side. The management key is transmitted in secret to the device to which the ciphertext data is to be transmitted. Accordingly, even if a third person monitors ciphertext, it is possible to prevent the contents of the ciphertext data from being known by the third person.

The enciphering/deciphering device comprises second receiving means for receiving the management key transmitted by the second transmitting means, first receiving means for receiving the ciphertext data and the enciphered key transmitted by the first transmitting means, key deciphering means for deciphering the enciphered key received by the first receiving means using the management key received by the second receiving means to form a data encryption key, data deciphering means for deciphering the ciphertext data received by the first receiving means using the data encryption key formed by the key deciphering means to form plaintext data, and storage controlling means for storing the plaintext data generated by the data deciphering means in a first storage medium.

The management key is received through the communicating means in the enciphering/deciphering device on the receiving side. On the receiving side, the received enciphered key is deciphered using the received management key, to obtain a data encryption key. The received ciphertext data is deciphered using the data encryption key, to obtain plaintext data. The plaintext data is stored in the first storage medium. In a device which has received the management key, it is possible to decipher the ciphertext data and know the contents thereof.

As a preferred embodiment in the fourth invention, there is an encryption/decryption communication system transmitting or receiving an enciphered authenticator. As a first mode, the enciphering/deciphering device comprises authenticator forming means for forming a first authenticator for confirming whether or not transmitted data is correctly received, first authenticator enciphering means for enciphering the first authenticator using the data encryption key to form a first enciphered authenticator, the above-mentioned first transmitting means for transmitting the ciphertext data, the enciphered key and the first enciphered authenticator, authenticator receiving means for receiving a second enciphered authenticator transmitted from the enciphering/deciphering device which has received the ciphertext data, the enciphered key and the first enciphered authenticator transmitted by the first transmitting means, and first authenticator deciphering means for deciphering the second enciphered authenticator using the management key to form a second authenticator.

Furthermore, in the first mode, the enciphering/deciphering device comprises first receiving means for receiving the ciphertext data, the enciphered key and the first enciphered authenticator transmitted by the first transmitting means, management key entering means for entering a management key used for deciphering the enciphered key received by the first receiving means, key deciphering means for deciphering the enciphered key received by the first receiving means using the management key entered by the management key entering means to form a data encryption key, data deciphering means for deciphering the ciphertext data received by the first receiving means using the data encryption key formed by the key deciphering means to form plaintext data, storage controlling means for storing the plaintext data formed by the data deciphering means in a first storage medium, second authenticator deciphering means for deciphering the first enciphered authenticator received by the first receiving means using the data encryption key formed by the key deciphering means to form a first authenticator, second authenticator enciphering means for enciphering the first authenticator formed by the second authenticator deciphering means using the management key to form a second enciphered authenticator, and returning means for returning the second enciphered authenticator to the enciphering/deciphering device on the transmission side.

The formation of the authenticator by the authenticator forming means is performed by the same processing as the formation of the key by the secret key forming means in the first invention. The entry of the management key by the management key entering means is also performed in the above-mentioned manner.

The formed first authenticator is enciphered using the data encryption key, to form a first enciphered authenticator. The first enciphered authenticator, together with the ciphertext data and the enciphered key, is transmitted to the enciphering/deciphering device on the receiving side by the first transmitting means.

The device on the receiving side receives the ciphertext data, the enciphered key and the first enciphered authenticator by the first receiving means. The enciphered key is deciphered using the management key entered by the management key entering means, to obtain a data encryption key. The entered management key is the same as that used for enciphering the data encryption key in the device on the transmission side. The ciphertext data and the first enciphered authenticator are deciphered using the data encryption key. The first authenticator formed by deciphering the first enciphered authenticator is enciphered using the management key, to form a second enciphered authenticator. The second enciphered authenticator is returned to the device on the transmission side.

The second enciphered authenticator is received by the device on the transmission side. On the transmission side, the received second enciphered authenticator is deciphered using the management key, to obtain a second authenticator.

The first authenticator is enciphered using the data encryption key and the management key, respectively, and is transmitted (or returned). Even if a third person monitors the first or second enciphered authenticator, therefore, he or she cannot know the contents thereof. If a fair device on the receiving side receives the first enciphered authenticator transmitted by the device on the transmission side, the second authenticator obtained by deciphering the second enciphered authenticator returned from the device on the receiving side should be the same as the first authenticator. According to the present invention, therefore, the device on the transmission side can confirm whether or not transmitted data is received by the fair device on the receiving side by examining whether or not the first authenticator and the second authenticator are the same. This makes it is possible to prevent such unfair authentication that a device other than the fair receiving device (receiving person) which has received data returns an authenticator, pretending to be a correct receiving person.

As a second mode, the enciphering/deciphering device comprises second transmitting means for transmitting the management key formed by the management key forming means. The enciphering/deciphering device comprises second receiving means for receiving the management key transmitted by the second transmitting means, first receiving means for receiving the ciphertext data, the enciphered key and the first enciphered authenticator transmitted by the first transmitting means, key deciphering means for deciphering the enciphered key received by the first receiving means using the management key received by the second receiving means to form a data encryption key, data deciphering means for deciphering ciphertext data received by the first receiving means using the data encryption key formed by the key deciphering means to form plaintext data, storage controlling means for storing the plaintext data formed by the data deciphering means in a storage medium, second authenticator deciphering means for deciphering the first enciphered authenticator received by the first receiving means using the data encryption key formed by the key deciphering means to form a first authenticator, second authenticator enciphering means for enciphering the first authenticator formed by the second authenticator deciphering means using the management key to form a second enciphered authenticator, and returning means for returning the second enciphered authenticator to the enciphering/deciphering device on the transmission side.

In the second mode, the management key is transmitted from the device on the transmission side to the device on the receiving side. In the device on the receiving side, the enciphered key is deciphered using the received management key, to form a data encryption key. Processing such as the decryption of the ciphertext data and the first enciphered authenticator and the return of the second enciphered authenticator from the device on the receiving side to the device on the transmission side is performed in the same manner as that in the above-mentioned first mode.

As a third mode, the enciphering/deciphering device comprises authenticator forming means for forming a first authenticator for confirming whether or not transmitted data is correctly received, first authenticator enciphering means for enciphering the first authenticator using the management key to form a first enciphered authenticator, the first transmitting means for transmitting the ciphertext data, the enciphered key and the first enciphered authenticator, authenticator receiving means for receiving a second enciphered authenticator transmitted from the enciphering/deciphering device which has received the ciphertext data, the enciphered key and the first enciphered authenticator transmitted by the first transmitting means, and first authenticator deciphering means for deciphering the second enciphered authenticator using the data encryption key to form a second authenticator.

Furthermore, in the third mode, the enciphering/deciphering device comprises first receiving means for receiving the ciphertext data, the enciphered key and the first enciphered authenticator transmitted by the first transmitting means, management key entering means for entering a management key used for deciphering the enciphered key received by the first receiving means, key deciphering means for deciphering the enciphered key received by the first receiving means using the management key entered by the management key entering means to form a data encryption key, data deciphering means for deciphering the ciphertext data received by the first receiving means using the data encryption key generated by the key deciphering means to form plaintext data, storage controlling means for storing the plaintext data formed by the data deciphering means in a first storage medium, second authenticator deciphering means for deciphering the first enciphered authenticator received by the first receiving means using the management key to form a first authenticator, second authenticator enciphering means for enciphering the first authenticator formed by the second authenticator deciphering means using the data encryption key to form a second enciphered authenticator, and returning means for returning the second enciphered authenticator to the enciphering/deciphering device on the transmission side.

The formation of the authenticator by the authenticator forming means and the entry of the management key by the management key entering means are performed in the same manner as that in the above-mentioned first mode.

In the third mode, on the transmission side, the first authenticator is enciphered using the management key, to form a first enciphered authenticator. On the receiving side, the first enciphered authenticator is deciphered using the management key, to obtain a first authenticator. The first authenticator is enciphered using the data encryption key, to form a second enciphered authenticator. In the device on the transmission side, the returned second enciphered authenticator is deciphered using the data encryption key, to form a second authenticator. The other processing is performed in the same manner as that in the above-mentioned first mode.

Also in the third mode, it is possible to prevent such unfair authentication that a device other than the fair receiving device (receiving person) which has received data returns an authenticator, pretending to be a correct receiving person.

As a fourth mode, the enciphering/deciphering device comprises second transmitting means for transmitting the management key formed by the management key forming means. The enciphering/deciphering device further comprises second receiving means for receiving the management key transmitted by the second transmitting means, first receiving means for receiving the ciphertext data, the enciphered key and the first enciphered authenticator transmitted by the first transmitting means, key deciphering means for deciphering the enciphered key received by the first receiving means using the management key received by the second receiving means to form a data encryption key, data deciphering means for deciphering the ciphertext data received by the first receiving means using the data encryption key formed by the key deciphering means to form plaintext data, storage controlling means for storing the plaintext data formed by the data deciphering means in a storage medium, second authenticator deciphering means for deciphering the first enciphered authenticator received by the first receiving means using the management key to form a first authenticator, second authenticator enciphering means for enciphering the first authenticator formed by the second authenticator deciphering means using the data encryption key to form a second enciphered authenticator, and returning means for returning the second enciphered authenticator to the enciphering/deciphering device on the transmission side.

Also in the fourth mode, on the transmission side, the first authenticator is enciphered using the management key, to form a first enciphered authenticator. On the receiving side, the first enciphered authenticator is deciphered using the management key, to obtain a first authenticator. The first authenticator is enciphered using the data encryption key, to form a second enciphered authenticator. In the device on the transmission side, the returned second enciphered authenticator is deciphered using the data encryption key, to form a second authenticator. The other processing is performed in the same manner as that in the above-mentioned second mode.

Also in the encryption/decryption communication system, when the management key entering means is stored in the storage medium externally given, there is preferably provided eliminating means for erasing the management key.

An encryption/decryption communication system according to a fifth invention is a system in which a plurality of enciphering/deciphering devices are connected to each other through communicating means, wherein the enciphering/deciphering device comprises first storage controlling means for storing a management key previously distributed in a first storage medium, receiving means for receiving ciphertext data and an enciphered key transmitted, key deciphering means for deciphering the enciphered key received by the receiving means using the management key stored in the first storage medium to form a data encryption key, data deciphering means for deciphering the ciphertext data received by the receiving means using the data encryption key formed by the key deciphering means to form plaintext data, and second storage controlling means for storing the plaintext data formed by the data deciphering means in a second storage medium.

The entry of the management key by the management key entering means is performed in the same manner as that in the above-mentioned fourth invention. The management key is the same as that used for enciphering the data encryption key in a case where the plaintext data is enciphered in the device on the transmission side. When the management key is entered from the second storage medium externally given, there is preferably provided eliminating means for erasing the management key from the second storage medium.

Examples of the first storage medium include an internal memory (for example, a RAM) and an internal disk storage in the enciphering/deciphering device, or a floppy disk, an IC card, an optical card, a magnetic card, and a transmission buffer.

According to the fifth invention, the ciphertext data and the enciphered key transmitted from the enciphering/deciphering device on the transmission side are received by the enciphering/deciphering device on the receiving side. The enciphered key is deciphered using the management key entered by the management key entering means, to obtain a data encryption key. The ciphertext data is deciphered using the data encryption key, to obtain plaintext data. The plaintext data is stored in the first storage medium. According to the present invention, in the enciphering/deciphering device which has received the ciphertext data and the enciphered key, the ciphertext data can be deciphered, and a receiving person can know the contents thereof. Since both the ciphertext data and the data encryption key (which is enciphered as an enciphered key) are received, the management of a correspondence therebetween becomes easy. Even if the ciphertext data and the data encryption key are transmitted and received, the data encryption key has been enciphered, whereby high security is obtained.

An encryption/decryption communication system according to a sixth embodiment of the invention is a system in which a plurality of enciphering/deciphering devices are connected to each other through communicating means, wherein the enciphering/deciphering device comprises first receiving means for receiving ciphertext data and an enciphered key transmitted, second receiving means for receiving a transmitted management key, key deciphering means for deciphering the enciphered key received by the first receiving means using the management key received by the second receiving means to form a data encryption key, data deciphering means for deciphering the ciphertext data received by the first receiving means using the data encryption key formed by the key deciphering means to form plaintext data, and storing means for storing the plaintext data formed by the data deciphering means in a storage medium.

Examples of the storage medium include a RAM and an internal disk storage in the enciphering/deciphering device, or a floppy disk, an IC card, an optical card, a magnetic card, and a transmission buffer.

The management key transmitted from the enciphering/deciphering device on the transmission side is received by the enciphering/deciphering device on the receiving side. The management key is the same as the management key used for enciphering the data encryption key when the device on the transmission side enciphers the plaintext data. The ciphertext data and the enciphered key transmitted from the enciphering/deciphering device on the transmission side are received. The enciphered key is deciphered using the received management key, to obtain a data encryption key. The ciphertext data is deciphered using the data encryption key, to obtain plaintext data. The plaintext data is stored in the storage medium. According to the present invention, in the enciphering/deciphering device which has received the ciphertext data and the enciphered key, it is possible to decipher the ciphertext data using the management key sent from the device on the transmission side, and know the contents thereof. Since both the ciphertext data and the data encryption key (which is enciphered as an enciphered key) are received, the management of a correspondence therebetween becomes easy. Further, even if the ciphertext data and the data encryption key are transmitted and received, since the management key is previously transmitted and received in secret and the data encryption key is enciphered, high security is obtained.

An enciphering/deciphering device according to the seventh invention is an enciphering/deciphering device using operation storage media each storing inherent supervisor identification data and inherent operation identification data and a supervisor storage medium storing the supervisor identification data, which is characterized by comprising data encryption key forming means for forming a data encryption key used for enciphering plaintext data, secret key forming means for forming a secret key used for enciphering the data encryption key formed by the data encryption key forming means, management key forming means for forming a management key used for enciphering the data encryption key formed by the data encryption key forming means, first storage controlling means for storing in the operation storage medium the secret key formed by the secret key forming means and the management key formed by the management key forming means, and second storage controlling means for storing the management key formed by the management key forming means in the supervisor storage medium.

An enciphering/deciphering method according to the seventh invention is an enciphering/deciphering method using operation storage media each storing inherent supervisor identification data and inherent operation identification data and a supervisor storage medium storing inherent supervisor identification data, which is characterized by comprising the steps of forming a data encryption key used for enciphering plaintext data, forming a secret key used for enciphering the formed data encryption key, forming a management key used for enciphering the formed data encryption key, storing in the operation storage medium the formed secret key and the formed management key, and storing the formed management key in the supervisor storage medium.

According to the seventh invention, the secret key and the management key are stored in the operation storage medium, and the management key is stored in the supervisor storage medium for managing the operation storage medium. All the management keys stored in the plurality of operation storage media are stored in the supervisor storage medium. The supervisor storage medium and the operation storage medium constitute one closed encryption/decryption system.

The data encryption key can be enciphered using the management key and the secret key.

In the seventh invention, there are preferably provided data enciphering means for enciphering the plaintext data using the data encryption key to form ciphertext data, first key enciphering means for enciphering the data encryption key using the secret key formed by the secret key forming means to form a first enciphered key, second key enciphering means for enciphering the data encryption key using the management key formed by the management key forming means to form a second enciphered key, and third storage controlling means for storing in a first storage medium the ciphertext data, the first enciphered key and the second enciphered key.

Consequently, the first enciphered key and the second enciphered key, together with the ciphertext data, are stored in the first storage medium. When the ciphertext data is deciphered, therefore, the first enciphered key or the second enciphered key which is stored in the first storage medium is read out, whereby a secret key is deciphered from the first enciphered key, and a management key is deciphered from the second enciphered key. The data encryption key is deciphered using the secret key or the management key, and the ciphertext data is deciphered using the deciphered data encryption key.

The ciphertext data can be deciphered by reading out the management key from the supervisor storage medium besides reading out the secret key or the management key from the operation storage medium. Consequently, the ciphertext data can be deciphered by handing over the supervisor storage medium to a manager, for example, and by reading out the management key from the supervisor storage medium besides handing over the operation storage medium to each of workers, for example, to encipher the plaintext data and the worker deciphering the ciphertext data. The use of the supervisor storage medium makes it possible to decipher the ciphertext data formed by each of the workers.

An enciphering/deciphering device according to the eighth invention is an enciphering/deciphering device using operation storage media each storing inherent supervisor identification data and inherent operation identification data and a supervisor storage medium storing the supervisor identification data, which is characterized by comprising data encryption key forming means for forming a data encryption key used for enciphering plaintext data, secret key forming means for forming a secret key used for enciphering the data encryption key formed by the data encryption key forming means, management key forming means for forming a management key used for enciphering the data encryption key formed by the data encryption key forming means, first storage controlling means for storing in the operation storage medium the secret key formed by the secret key forming means and the management key formed by the management key forming means, second storage controlling means for storing in the supervisor storage medium the management key formed by the management key forming means, data enciphering means for enciphering the plaintext data using the data encryption key to form ciphertext data, first key enciphering means for enciphering the data encryption key using the secret key formed by the secret key forming means to form a first enciphered key, second key enciphering means for enciphering the data encryption key using the management key formed by the management key forming means to form a second enciphered key, and third storage controlling means for storing in a first storage medium the ciphertext data, the first enciphered key and the second enciphered key.

An enciphering/deciphering method according to the eighth invention is an enciphering/deciphering device using operation storage media each storing inherent operation identification data and a supervisor storage medium storing inherent supervisor identification data, which is characterized by comprising the steps of forming a data encryption key used for enciphering plaintext data, forming a secret key used for enciphering the formed data encryption key, forming a management key used for enciphering the formed data encryption key, storing in the operation storage medium the formed secret key and the formed management key, storing the formed management key in the supervisor storage medium, enciphering the plaintext data using the data encryption key to form ciphertext data, enciphering the data encryption key using the formed secret key to form a first enciphered key, enciphering the data encryption key using the formed management key to form a second enciphered key, and storing in a first storage medium the ciphertext data, the first enciphered key and the second enciphered key.

According to the eighth invention, the secret key and the management key are stored in the operation storage medium, and the management key is stored in the supervisor storage medium. The management key and the secret key are stored in the operation storage medium. All the management keys stored in the plurality of operation storage media are stored in the supervisor storage medium.

The management key and the secret key are used for enciphering the data encryption key. The first enciphered key and the second enciphered key, together with the ciphertext data, are stored in the first storage medium.

When the ciphertext data is deciphered, the first enciphered key or the second enciphered key stored in the first storage medium is read out, whereby a secret key is deciphered from the first enciphered key, and a management key is deciphered from the second enciphered key. The data encryption key is deciphered using the secret key or the management key, and the ciphertext data is deciphered using the deciphered data encryption key.

The ciphertext data can be deciphered by reading out the management key from the supervisor storage medium besides reading out the secret key or the management key from the operation storage medium. Consequently, the ciphertext data can be deciphered by handing over the supervisor storage medium to a manager, for example, and by reading out the management key from the supervisor storage medium besides handing over the operation storage medium to each of workers, for example, to encipher the plaintext data and the worker deciphering the ciphertext data. The use of the supervisor storage medium makes it possible to decipher the ciphertext data formed by each of the workers.

In the foregoing, the management key stored in one of the operation storage media can be also stored as a low-order key in the other operation storage medium.

By reading out the low-order key stored in the other operation storage medium, the data encryption key can be deciphered using the low-order key. The ciphertext data is deciphered from the deciphered data encryption key.

In addition to a person having the one operation storage medium, a person having the other operation storage medium can also decipher the ciphertext data.

There may be provided operation identification name entering means for entering an operation identification name inherent to the operation storage medium for identifying the operation storage medium and supervisor identification name entering means for entering a supervisor identification name inherent to the supervisor storage medium for identifying the supervisor storage medium.

In this case, the first storage controlling means is so adapted as to store in the operation storage medium the supervisor identification name entered by the supervisor identification name entering means and the operation identification name entered by the operation identification name entering means, and the second storage controlling means is so adapted as to store in the supervisor storage medium the supervisor identification name entered by the supervisor identification name entering means.

Consequently, the supervisor storage medium and the operation storage medium can be identified using desired names.

All operation identification names inherent to the operation storage media which are stored in the supervisor storage medium can be also stored in the supervisor storage medium so that they can be displayed on a display.

By reading out all the operation identification names stored in the supervisor storage medium, the operation identification names are displayed on the display. Since all the management keys for each operation storage medium are stored in the supervisor storage medium, the operation identification names displayed on the display represent the types of operation storage media which can be deciphered using the management keys stored in the supervisor storage medium out of the operation storage media each storing the secret key for enciphering plaintext data and the management key. The operation storage media which are used for such encryption that the result of the encryption can be deciphered using the supervisor storage medium can be known by seeing the operation identification names displayed on the display device.

All the operation identification names stored in the operation storage media may be also stored in the supervisor storage medium so that they can be displayed on the display.

Also in this case, by reading out all the operation identification names stored in the operation storage media, the operation identification names are displayed on the display. The operation storage medium may, in some cases, store a management key in the other operation storage medium. The operation identification names displayed on the display represent the type of one of operation storage media which can be subjected to decryption using the management key stored in the other operation storage medium out of the operation storage media each storing the secret key for enciphering plaintext data and the management key. It can be known by seeing the operation identification names displayed on the display device which of the operation storage media is used for encryption and whether or not the result of the encryption can be deciphered using the one operation storage medium.

It is also possible to provide first selecting means for selecting the operation identification name of the operation storage medium which should transfer stored data out of the operation identification names displayed on the display, second selecting means for selecting the operation identification name of the operation storage medium to which the data should be transferred, and fifth storage controlling means for storing the data stored in the operation storage medium specified by the operation identification name selected using the first selecting means in the operation storage medium specified by the operation identification name selected using the second selecting means.

The data stored in the operation storage medium having the operation identification name selected by the first selecting means is transferred to the operation storage medium having the operation identification name selected by the second selecting means and is stored therein. The data stored in the operation storage medium can be preserved by transferring the data to the other operation storage medium and by storing the transferred data therein. Since a spare operation storage medium can be produced, it is possible to cope with a case where a storage medium is lost.

The second storage controlling means may be one for storing in the supervisor storage medium the operation identification name stored in the operation storage medium so that it can be displayed on the display.

The second storage controlling means may be one for storing in the supervisor storage medium the operation identification name stored in the operation storage medium and the operation identification name in the operation storage medium storing the management key as the low-order key so that they can be displayed on the display.

Management keys for deciphering data enciphered using the management keys or the secret keys stored in the operation storage media are stored in the supervisor storage medium. Therefore, the ciphertext data obtained using the operation storage medium can be deciphered using the supervisor storage medium. Since the operation identification names are displayed, such the operation storage medium can be known that is used for such encryption that the result of the encryption can be deciphered of the operation storage media used for encryption.

The first storage controlling means may be one for storing the operation identification name stored in one of the operation storage media in the other operation storage medium so that it can be displayed on the display.

The first storage controlling means may be one for storing in the above operation storage medium its own operation identification name and the operation identification name of the operation storage medium storing the management key registered as the low-order key so that they can be displayed on the display.

The operation storage medium may, in some cases, store the management key, as a low-order key, for deciphering data enciphered using the management key or the secret key stored in the other operation storage medium. Therefore, ciphertext data obtained using the other operation storage medium can be deciphered using the low-order key. Since the operation identification names are displayed, such the operation storage medium can be known that is used for such encryption that the result of the encryption can be deciphered of the operation storage media used for encryption.

There may be provided operation storage medium identifying means for reading the supervisor identification data and the supervisor identification names respectively stored in the plurality of operation storage media and identifying the operation storage media storing the same supervisor identification data and the supervisor identification names, and overlapped names judging means for judging whether or not the operation identification names stored in the plurality of operation storage media which are judged to store the same supervisor identification data and the supervisor identification names by the operation storage medium identifying means and the operation identification name entered from the operation identification name entering means are overlapped with each other, and the first storage controlling means may be one for storing, with respect to the operation identification name which is judged to be overlapped with the operation identification names by the overlapped names judging means and entered from the operation identification name entering means, a name obtained by adding an additive name to the entered operation identification name in the operation storage medium.

In the operation storage media storing the same supervisor identification data, only one type of operation identification name is stored in each of the operation storage media. However, the same operation identification name can be also erroneously repeatedly entered, or the same operation identification name is desired to be repeatedly entered. In this case, the same operation identification name is allowed to be repeatedly entered, and a name obtained by adding an additive name to the operation identification name is stored in the operation storage media.

Since the operation identification name to which the additive name is added is stored in the operation storage media, the operation storage media can be distinguished even if the same operation identification name is repeatedly entered.

There may be also provided secret key enciphering means for enciphering the secret key formed by the secret key forming means, and management key enciphering means for enciphering the management key formed by the management key forming means, the first storage controlling means may be for storing in the operation storage medium the secret key enciphered by the secret key enciphering means and the management key enciphered by the management key enciphering means, and the second storage controlling means may be one for storing in the supervisor storage medium the management key enciphered by the management key enciphering means.

Both the secret key and the management key can be used for deciphering the data encryption key, and the secret key and the management key are high in secrecy.

Since the secret key and the management key are enciphered and are stored in one of the operation storage media, and the management key is enciphered and is stored in the supervisor storage medium, only the enciphered secret key and the enciphered management key can be read out from the operation storage medium or the supervisor storage medium. Since the secret key and the management key are enciphered, a person who has read out the keys cannot know the contents of the keys even if the keys are read out. Consequently, the secrecy of the secret key and the management key is kept high.

There may be provided secret key enciphering means for enciphering the secret key formed by the secret key forming means using the management key formed by the management key forming means. In this case, the first storage controlling means stores in the operation storage medium the secret key enciphered by the secret key enciphering means and the management key formed by the management key forming means.

Also in this case, the secret key is enciphered and is stored in the operation storage medium, whereby the secret key has high secrecy. The management key for enciphering the secret key, together with the enciphered secret key, is stored in one of the operation storage media, whereby the keys are relatively easy to manage.

A password may be stored in the operation storage medium, and there may be provided password entering means for entering a password for password judgment, and password coincidence judging means for judging whether or not the password entered by the password entering means and the password stored in the operation storage medium coincide with each other. The first storage controlling means may be one for storing in the operation storage medium the secret key formed by the secret key forming means and the management key formed by the management key forming means when the password coincidence judging means judges that the passwords coincide with each other.

Further, a password may be stored in the supervisor storage medium, and there may be provided password entering means for entering a password for password judgment, and password coincidence judging means for judging whether or not the password entered by the password entering means and the password stored in the supervisor storage medium coincide with each other. The second storage controlling means may be one for storing in the supervisor storage medium the management key formed by the management key forming means when the password coincidence judging means judges that the passwords coincide with each other.

When the secret key and the management key may be altered upon assumption that everyone can operate the enciphering/deciphering device. Consequently, it is preferable that only reliable human beings can operate the enciphering/deciphering device.

In the foregoing, a password is registered, and it is assumed that the enciphering/deciphering device can be operated so long as an entered password coincides with the registered password. By teaching the password to only a reliable person, therefore, it is possible to prevent the enciphering/deciphering device from being erroneously operated by an unreliable person.

An enciphering/deciphering device according to the ninth invention is characterized by comprising first reading means for reading out from a first storage medium storing ciphertext data, a first enciphered key and a second enciphered key the ciphertext data, the first enciphered key and the second enciphered key, second reading means for reading out from an operation storage medium storing inherent operation identification data and a secret key for deciphering the first enciphered key read out from the first reading means the secret key, first key deciphering means for deciphering the first enciphered key using the secret key read out by the second reading means to form a data decryption key, third reading means for reading out from a supervisor storage medium storing the operation identification data, inherent supervisor identification data and a management key for deciphering the second enciphered key read out from the first reading means the management key, second key deciphering means for deciphering the second enciphered key using the management key read out by the third reading means to form a data decryption key, data deciphering means for deciphering the ciphertext data using the data decryption key formed by the first key deciphering means or the second key deciphering means to form plaintext data, and storage controlling means for storing in a second storage medium the plaintext data formed by the data deciphering means.

The ninth invention is characterized by comprising the steps of reading out from a first storage medium storing ciphertext data, a first enciphered key and a second enciphered key the ciphertext data, the first enciphered key and the second enciphered key, reading out from an operation storage medium storing an inherent operation identification name, inherent operation identification data and a secret key for deciphering the read-out first enciphered key the secret key, deciphering the first enciphered key using the secret key read out to form a data decryption key, reading out from a supervisor storage medium storing the operation identification name, the operation identification data, an inherent supervisor identification name, inherent supervisor identification data and a management key for deciphering the read-out second enciphered key the management key, deciphering the second enciphered key using the management key read out to form a data decryption key, deciphering the ciphertext data using the formed data decryption key to form plaintext data, and storing the formed plaintext data in a second storage medium.

According to the ninth invention, the secret key stored in the operation storage medium is read out, and the data encryption key is deciphered using the secret key, to form a data decryption key. The ciphertext data is deciphered using the data decryption key to obtain plaintext data. The management key stored in the supervisor storage medium is read out, and the data encryption key is deciphered using the management key, to form a data decryption key. The ciphertext data is deciphered using the data decryption key to obtain plaintext data.

According to the ninth invention, the ciphertext data can be deciphered using the secret key stored in the operation storage medium to obtain plaintext data, and the ciphertext data can be deciphered using the management key stored in the supervisor storage medium to obtain plaintext data.

Consequently, the ciphertext data can be deciphered by handing over the supervisor storage medium to a manager, for example, and reading out the management key from the supervisor storage medium besides handing over the operation storage medium to each of workers, for example, to encipher the plaintext data and the worker deciphering the ciphertext data. The use of the supervisor storage medium makes it possible to decipher using the supervisor storage medium the ciphertext data formed by each of the workers.

The second reading means may be one for reading out from an operation storage medium storing inherent operation identification data, a secret key for deciphering the first enciphered key read out from the first reading means, and a low-order key the low-order key, and the second key deciphering means may be one for deciphering the second enciphered key using the low-order key read out by the second reading means to form a data decryption key.

It is considered that the management key stored in the operation storage medium is stored as a low-order key in the other operation storage medium, the data encryption key enciphered using the management key stored in the operation storage medium is deciphered using the low-order key, to decipher the ciphertext data to obtain the plaintext data.

In the foregoing, the management key or the low-order key is stored in the supervisor storage medium or the operation storage medium, whereby it is possible to decipher the data encryption key using the management key or the low-order key to obtain a data decryption key, and decipher the ciphertext data to obtain the plaintext data.

There can be also provided secret key eliminating means for erasing the secret key stored in the operation storage medium.

The secret key is inherent to the operation storage medium. For example, when the operation storage medium is handed over to each of the workers, and the manager holds the supervisor storage medium, the ciphertext data obtained using the secret key stored in the operation storage medium can be deciphered by each of the workers having the operation storage medium. This may introduce problems on management of the ciphertext data.

Since in the foregoing, the secret key stored in the operation storage medium can be erased, it is possible to prevent the ciphertext data from being deciphered without permission by a person having an operation storage medium, for example, a worker.

The operation identification name stored in the operation storage medium from which the secret key is erased by the secret key eliminating means may be read out from the operation storage medium.

Consequently, the operation storage medium from which the secret key is erased can be known, whereby it is possible to previously know the operation storage medium which cannot decipher the ciphertext data.

There may be provided judging means for judging whether or not the second enciphered key is enciphered using the management key stored in the operation storage medium in which the low-order key read out by the second reading means is stored as the management key, and first enciphered key eliminating means for erasing the first enciphered key stored in the first storage medium in response to the fact that the judging means judges that the second enciphered key is enciphered.

Even in this case, the first enciphered key stored in the first storage medium can be erased, whereby it is possible to prevent the ciphertext data from being deciphered without permission by a person having an operation storage medium, for example, a worker.

There may be provided displaying means for displaying the operation identification name of the operation storage medium which is read out by the second reading means in response to the fact that the first enciphered key is erased by the first enciphered key eliminating means. Consequently, it is possible to confirm a person who has inhibited decryption.

The data stored in the supervisor storage medium may be read out and stored in the other storage medium.

Consequently, a spare supervisor storage medium can be produced, whereby it is possible to previously cope with loss and damage of the supervisor storage medium.

The data stored in the other storage medium may be reversely transferred to the original supervisor storage medium and stored therein.

The data stored in the other storage medium is inhibited from being read out when it is transferred in the reverse direction to the original supervisor storage medium, whereby unfair copying of the data in the supervisor storage medium can be also prevented, and the supervisor storage medium becomes relatively easy to manage.

There may be provided eliminating means for erasing the data in the supervisor storage medium which has been stored in the other storage medium.

Since unnecessary data in the supervisor storage medium which has been stored in the other storage medium can be erased, the data in the supervisor storage medium becomes relatively easy to manage.

There are preferably provided transfer judging means for judging whether or not the data stored in the operation storage medium or the supervisor storage medium is transferred to the other storage medium, and reading inhibition controlling means for inhibiting the data stored in the original operation storage medium or the supervisor storage medium from being read out by the fact that the transfer judging means judges that the data is transferred to the other storage medium.

When the data is transferred, therefore, the data stored in the original supervisor storage medium or the operation storage medium from which data is transferred can be inhibited from being read out. Consequently, unfair copying of data can be prevented, and only a person fairly having a supervisor storage medium or an operation storage medium can decipher ciphertext data. Consequently, the storage medium becomes relatively easy to manage.

There can be also provided first reading inhibition release controlling means for releasing the inhibition of the reading of the data in the operation storage medium by the reading inhibition controlling means.

Since the inhibition of the reading of the data is released, the data can be read out from the operation storage medium from which the reading out of data was inhibited.

The supervisor identification data or the operation identification data is random-number data or enciphered time data, for example.

The random-number data or the enciphered time data is difficult to presume, whereby the secrecy of the identification data can be kept high.

It is also possible to store a version code in the supervisor storage medium or the operation storage medium, and to store in the first storage medium the version code in addition to the ciphertext data, the first enciphered key and the second enciphered key.

When encryption processing is performed using the operation storage medium storing a low version code, it is necessary that decryption processing can be performed using the supervisor storage medium or the operation storage medium storing a higher version code than the version code.

Since the version code of the operation storage medium used for encryption is stored in the first storage medium, it is possible to know the operation storage medium or the supervisor storage medium which can be used for decryption.

Version codes are stored in the first storage medium, the operation storage medium and the supervisor storage medium, and there can be also provided comparing means for comparing the version code read out by the first reading means with the version code read out by the second reading means or the version code read out by the third reading means, and key formation controlling means for allowing the formation of the data decryption key by the first key deciphering means and the formation of the data decryption key by the second key deciphering means when the version code read out by the first reading means is not more than the version code read out by the second reading means or the version code read out by the third reading means as a result of the comparison by the comparing means.

When encryption processing is performed using the operation storage medium storing a low version code, decryption processing can be performed using the supervisor storage medium or the operation storage medium storing a higher version code than the version code.

The operation storage medium may be one storing an operation identification name inherent to the operation storage medium and a supervisor identification name inherent to the supervisor storage medium, and the supervisor storage medium may be one storing the supervisor identification name.

There can be also provided operation identification name changing means for changing the operation identification name stored in the operation storage medium.

Since the operation identification name can be changed into a desired operation identification name, the application of the enciphering/deciphering device is broadened.

The plaintext data or the deciphered plaintext data can be also displayed and scrolled.

There may be also provided displaying means for displaying and scrolling the plaintext data or the deciphered plaintext data.

Consequently, the supervisor identification data or the operation identification data can be prevented from being overlapped with each other, whereby it is also possible to keep high secrecy.

The enciphering/deciphering device, the enciphering/deciphering method or the encryption/decryption system may be constructed using an enciphering device, using time data as input data, an initial value or an encryption key fed to the enciphering device, and using enciphered data obtained from the enciphering device as the data encryption key, the secret key or the management key.

The time data is used as the input data, the initial value or the encryption key, to obtain the enciphered data. The obtained enciphered data is taken as the data encryption key, the secret key or the management key.

The data encryption key, the secret key or the management key is generated utilizing the time data. The time data is data which is generally difficult to presume by a third person. When the plaintext data is enciphered using the data encryption key formed utilizing the time data, therefore, it is difficult to presume the data encryption key, whereby it is also difficult to decipher the ciphertext data.

BRIEF DESCRIPTION OF THE DRAWINGS

FIG. 2a illustrates one example of an encryption algorithm, and FIG. 2b illustrates one example of an S box;

FIG. 25 illustrates a portion of a FD drive 5 and FDs 1 and 2 in an enciphering/deciphering device in a sixth embodiment;

FIG. 37 illustrates the contents of an enciphered file;

FIG. 38 illustrates the contents of a management key file 1 included in an SVFD;

FIG. 39 illustrates the contents of a registered name reading file included in the SVFD;

FIG. 40 illustrates the contents of a secret key file included in an OPFD;

FIG. 41 illustrates the contents of a management key file included in the OPFD;

FIG. 42 illustrates the contents of a program file included in the SVFD;

FIGS. 61a and 61b are flow charts showing the procedure for processing according to a control program stored in the OPFD;

BEST MODE FOR CARRYING OUT THE INVENTION

First Embodiment (1) Construction of enciphering/deciphering device

Figure 1:
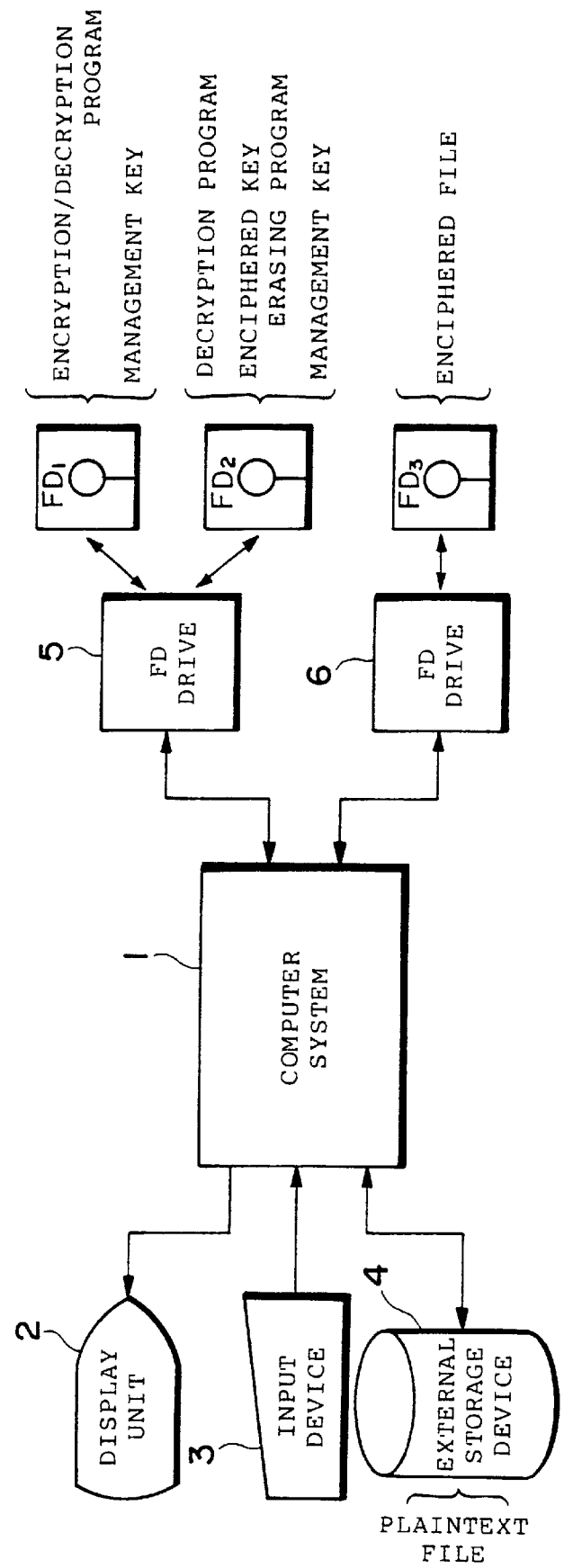
FIG. 1 is a block diagram showing the construction of an enciphering/deciphering device in a first embodiment.

FIG. 1 is a block diagram showing the construction of an enciphering/deciphering device in a first embodiment. The enciphering/deciphering device comprises a computer system 1, a display unit 2 (a CRT display device, a liquid crystal display device, etc.), an input device 3 (a keyboard, a pointing device, etc.), an external storage device 4 (a magnetic disk storage device, an optical disk storage device, etc.), and floppy disk drives (which are hereinafter simply referred to as FD drives) 5 and 6.

One or a plurality of files of plaintext (which are referred to as plaintext files) are stored in the external storage device 4. The files include various files such as a document file created by a word processor or the like, a data file obtained by filing statistical data, total data or the like, and a program file obtained by filing codes of computer programs. When an enciphered file is further enciphered, the plaintext files include the enciphered file.

A floppy disk FD1 (which is hereinafter simply referred to as an FD1) or a floppy disk FD2 (which is hereinafter simply referred to as an FD2) is set in or removed from the FD drive 5. A floppy disk FD3 (which is hereinafter simply referred to as an FD3) is set in or removed from the FD drive 6.

An encryption/decryption program and a management key as described in detail later are previously stored in the FD1. A decryption program, an enciphered key erasing program and a management key as described in detail later are previously stored in the FD2. The management key stored in the FD1 and the management key stored in the FD2 are the identical. When the FD1 and the FD2 are generated, the identical management keys are respectively stored in the FDs. The FD1 is previously distributed to a creator who creates an enciphered file from plaintext file. The FD2 is previously distributed to a manager who manages an enciphered file. The FD3 is for storing an enciphered file created by enciphering the plaintext file in the external storage device 4.

An operating system (OS) is stored in a ROM inside the computer system 1 or the external storage device 4. The computer system 1 reads and analyzes data inputted from the input device 3, controls the display on the display unit 2, controls the external storage device 4, and controls the FD devices 5 and 6, for example. Further, the computer system 1 reads in an internal memory (for example, a RAM) the encryption/decryption program stored in the FD1 and the decryption program and the enciphered key erasing program stored in the FD2, and executes the programs.

One example of encryption (decryption) algorithms respectively included in the encryption/decryption program and the decryption program is as shown in FIG. 2a. The example of the encryption algorithm is a modification of a DES (Data Encryption Standard) algorithm (which is referred to as a DES cipher). Specifically, 64-bit plaintext and a 56-bit key are generally used in the DES. In this example, the algorithm is so modified that 8-bit plaintext and a 12-bit key are used.

S boxes 21 to 24 convert input data into output data in accordance with a substitution (conversion) correspondence table shown in FIG. 2b. For example, when the input data is 1 (a decimal number), the output data becomes 14 (a decimal number). Each of operators 25 to 32 executes an exclusive-OR operation of inputted two data, and outputs the result thereof.

8-bit plaintext to be enciphered is divided into data L1 composed of the upper four bits (=0100) and data R1 composed of the lower four bits (=1101). The data L1 is inputted to the operator 25 and the data R1 (=L2) is inputted to the operators 29 and 26. A 12-bit key K (=001010000110) is divided into four blocks, that is, the first to fourth blocks each composed of three bits from the most significant bit. "1" in one-bit data is added to each of the first block (=001) and the third block (=000) as the most significant bit in the block. "0" in one-bit data is added to each of the second block (=010) and the fourth block (=110) as the most significant bit in the block. As a result, the key K is converted into data K1 (=1001), K2 (=0010), K3 (=1000), and K4 (=0110) each composed of four bits. The data K1, K2, K3 and K4 are respectively inputted to the operators 29, 30, 31 and 32.

In processing in the first stage, the exclusive OR of the data R1 and K1 is found in the operator 29. The result of the operation is converted (substituted) in the S box 21. The exclusive OR of data obtained by the conversion and the data L1 is found in the operator 25. Data representing the result R2 (=L3) is fed to the operators 30 and 27.

In the second stage, the same processing as that in the first stage is also performed with respect to the data R2, K2 and L2. Also in the third and fourth stages, the same processing as that in the first stage is performed with respect to the data R3, K3 and L3 and the data R4, K4 and L4.

8-bit ciphertext is generated by the processing in the first to fourth stages. Output data of the operator 28 becomes data L composed of the upper four bits (=1001) of the 8-bit ciphertext. Output data R4 of the operator 27 becomes data R composed of the lower four bits (=0111) of the 8-bit ciphertext. The plaintext is thus successively processed every eight bits, so that the ciphertext is successively generated every eight bits.

When the 8-bit ciphertext is deciphered to obtain 8-bit plaintext, the 8-bit ciphertext is divided into data composed of the upper four bits (L1) and data composed of the lower four bits (R1). The data composed of the upper four bits is inputted to the operator 25 and the data composed of the lower four bits is inputted to the operators 29 and 26. A decryption key (which is the same as the encryption key K) is divided every three bits as at the time of the encryption, whereby data K1 to K4 are generated. The data K4, K3, K2 and K1 are respectively inputted to the operators 29, 30, 31 and 32. The inputted data are respectively subjected to the processing in the first to fourth stages, whereby plaintext composed of eight bits is generated. At the time of the decryption, the ciphertext is thus successively processed every eight bits, so that the plaintext is successively generated every eight bits.

As an algorithm used for encryption and decryption, another algorithm such as FEAL (Fast Encryption Algorithm) can be also used in place of the DES algorithm. It does not matter which of a symmetric cryptosystem and an asymmetric cryptosystem (of a modulo exponentiation type, a knapsack type, etc.) is used as an algorithm and which of a block cipher and a stream cipher (a Vernam cipher, NFSR, etc.) is used.

The encryption/decryption processing can be realized by software (a program). When the encryption/decryption processing is realized according to a program, the program is incorporated as a part of the encryption/decryption program stored in the FD1 and the decryption program stored in the FD2. The encryption/decryption processing can be also realized by hardware. In this case, the hardware will be provided inside or outside the computer system 1. The encryption/decryption program stored in the FD1 and the decryption program stored in the FD2 cause the plaintext (or the ciphertext) read out from the external storage device 4, a key generated in the step 106 shown in FIG. 4 as described later, and the like to be inputted to the hardware to perform encryption or decryption processing.

(2) Encryption and decryption processing by creator of enciphered file

Figure 3A:
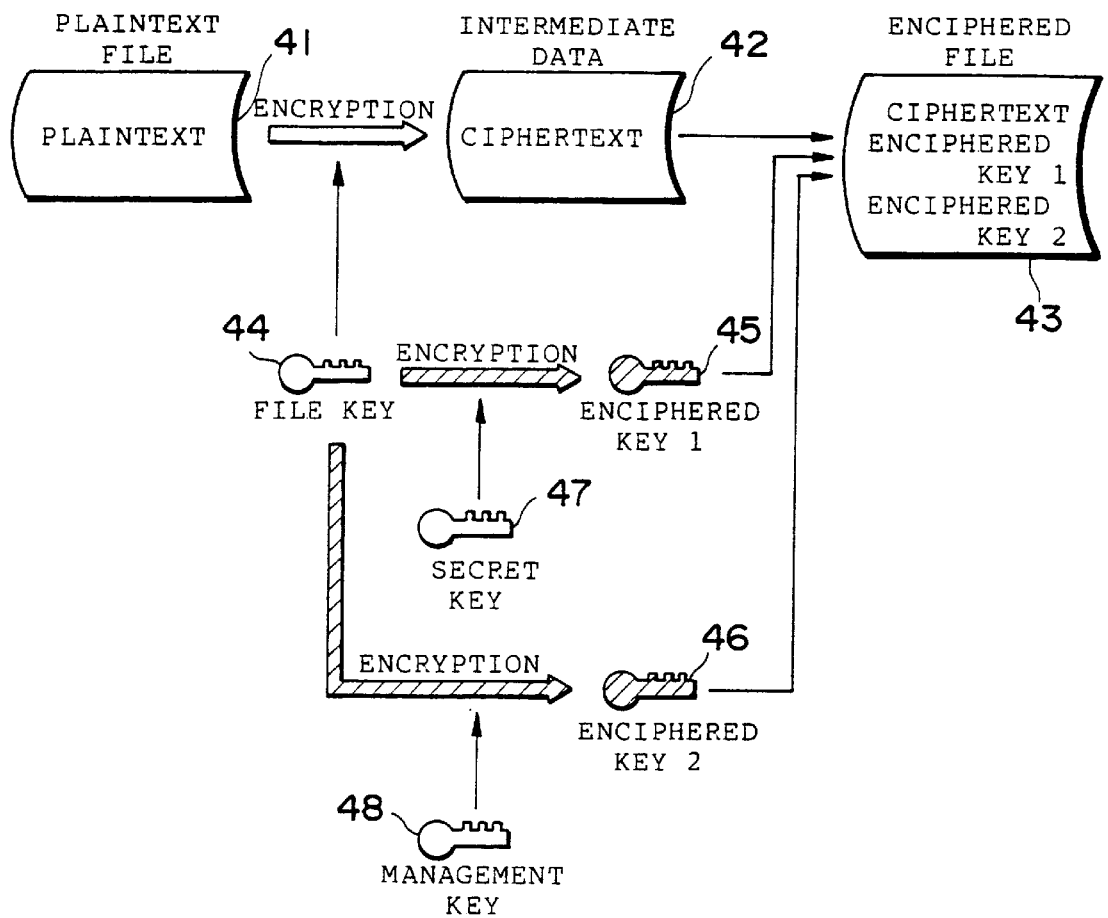
FIG. 3a shows how encryption processing of a file in an enciphering/deciphering device is performed.
Figure 3B:
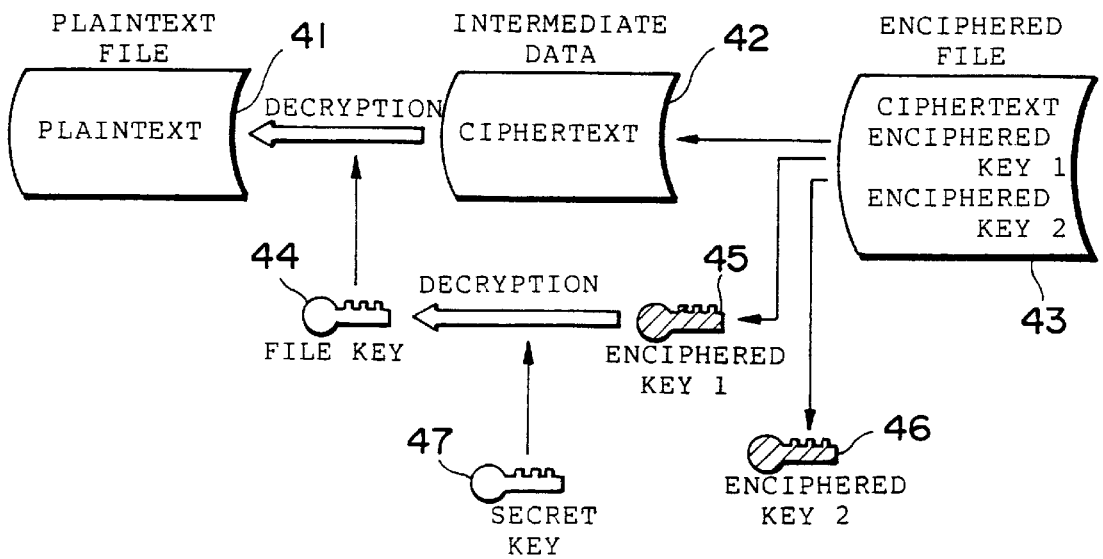
FIG. 3b shows how decryption processing in the enciphering/deciphering device is performed.
Figure 4:
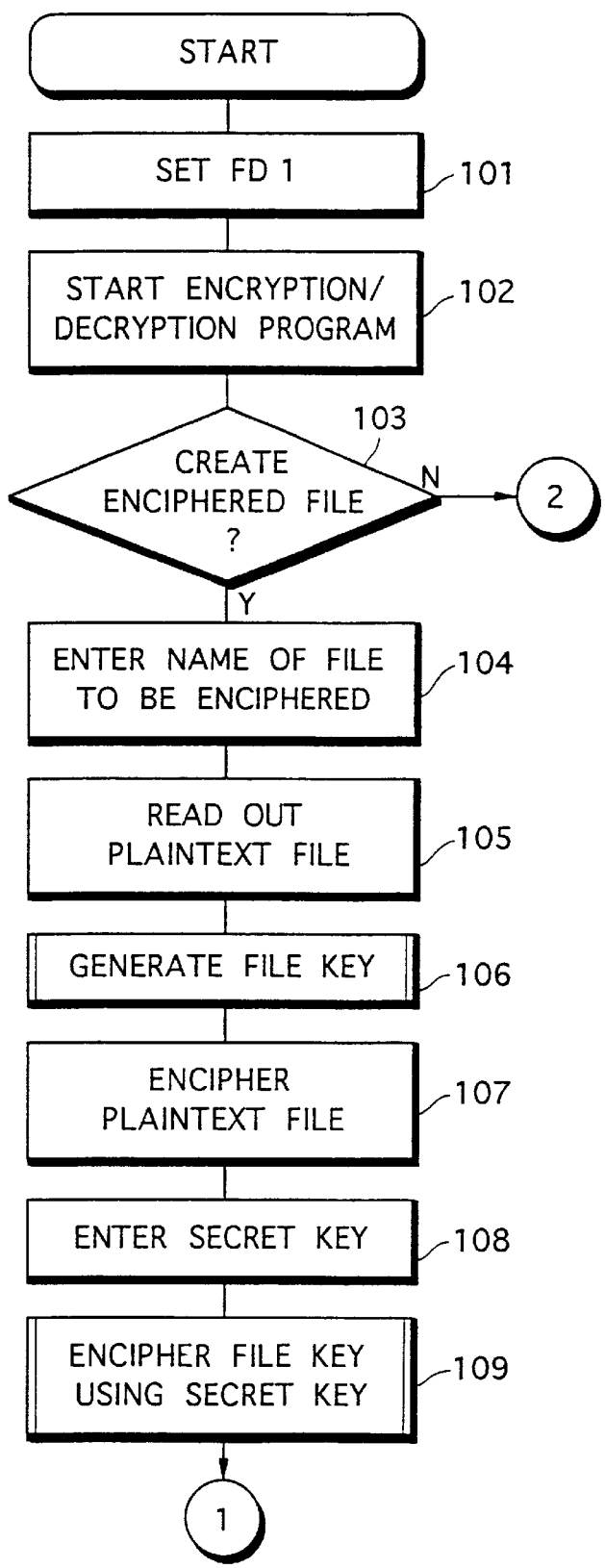
FIG. 4 is a flow chart showing the flow of encryption/decryption processing in the first embodiment.
Figure 5:
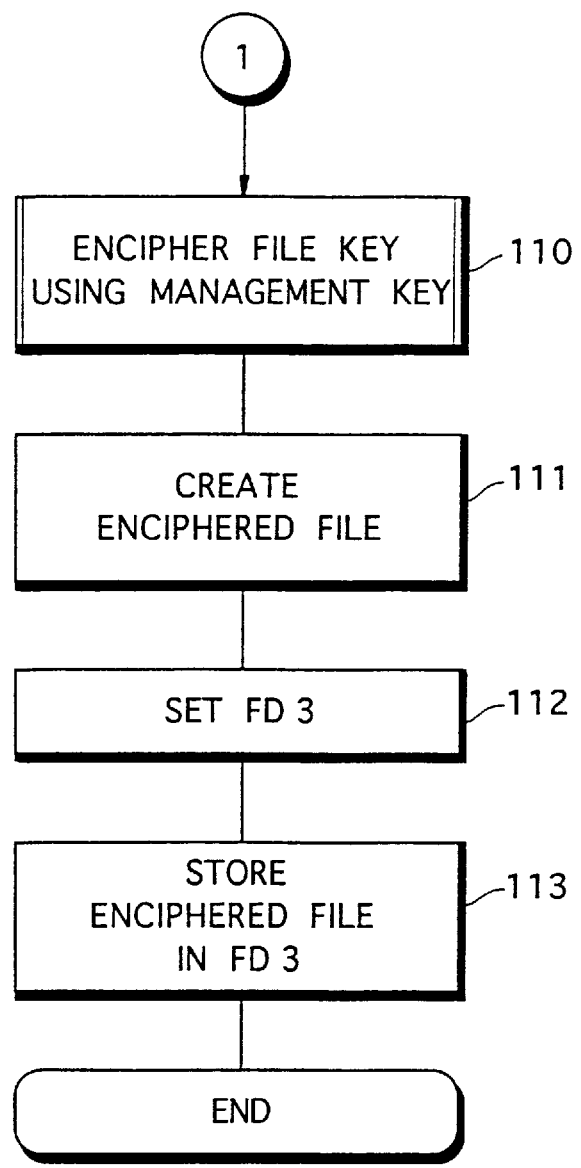
FIG. 5 is a flow chart showing the flow of encryption/decryption processing in the first embodiment.
Figure 6:
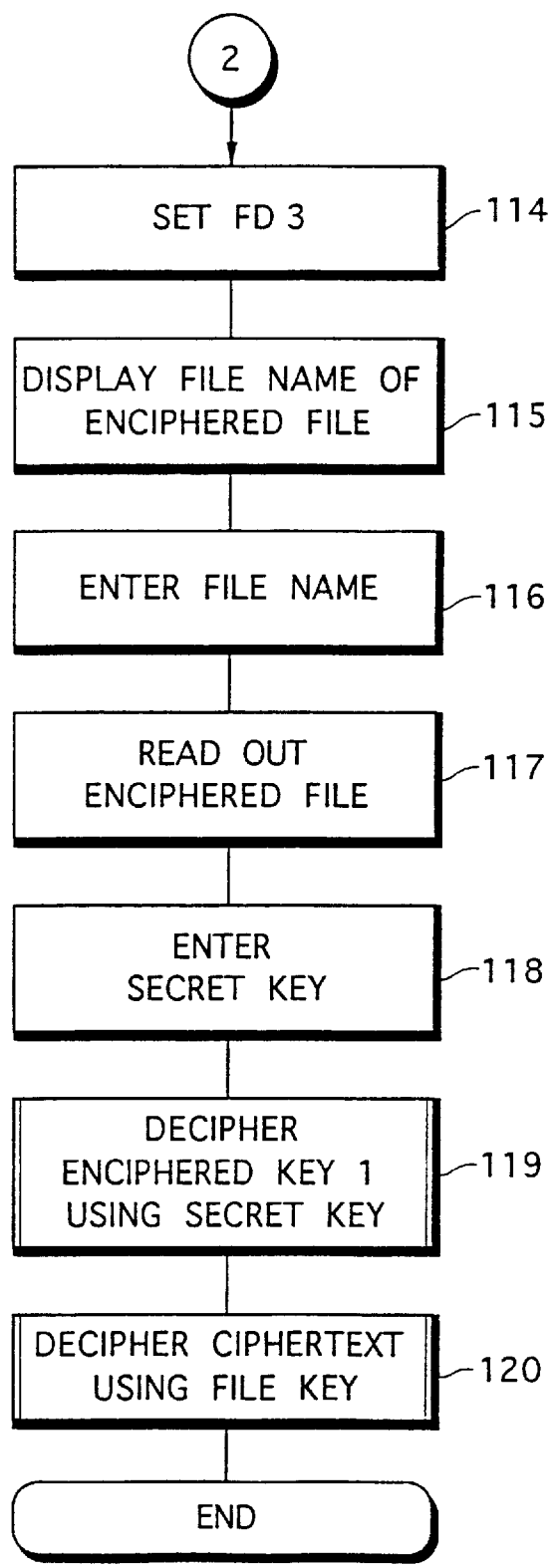
FIG. 6 is a flow chart showing the flow of encryption/decryption processing in the first embodiment.

FIG. 3a shows how encryption processing is performed by the encryption/decryption program stored in the FD1 which a creator of an enciphered file (hereinafter simply referred to as a creator) has. FIG. 3b shows how decryption processing is performed by the encryption/decryption program. FIGS. 4 to 6 are flow charts showing the flow of processing in a case where the encryption/decryption program is executed by the computer system 1.

The FD1 is set in the FD drive 5 by the creator (step 101). An instruction to start the encryption/decryption program stored in the FD1 is then entered into the computer system 1 from the input device 3 by the creator. Consequently, the encryption/decryption program is read out from the FD1, and is stored in an internal memory (for example, a RAM) in the computer system 1. The computer system 1 executes the program (step 102).

A guidance on which of encryption and decryption of a file is to be selected is displayed on a display screen of the display device 2. The creator selects either one of the encryption and the decryption, and enters its instruction into the computer system 1 from the input device 3.

When the encryption is selected (YES in step 103), the file name of a plaintext file to be enciphered is entered into the computer system 1 from the input device 3 by the creator (step 104). A plaintext file 41 corresponding the entered file name is read out from the external storage device 4, and is stored in the internal memory in the computer system 1 (step 105).

A key 44 used for enciphering the plaintext file (which is referred to as a file key) is then generated (step 106). A method of generating the file key 44 will be described in detail later. Plaintext in the plaintext file 41 is enciphered using the file key 44, whereby ciphertext is formed (step 107). One of the above-mentioned encryption algorithms is used for the encryption processing. The ciphertext generated by the encryption processing is stored as intermediate data 42 in the internal memory in the computer system 1.

A secret key 47 is then entered into the computer system 1 from the input device 3 by the creator (step 108) (FIG. 3b). The secret key 47 is arbitrarily determined by the creator, which can be considered to be a secret number (password). The secret key 47 is composed of an arbitrary string of numerals, characters, or the like.

The file key 44 is enciphered using the secret key 47 (step 109). A key 45 obtained by the encryption shall be referred to as an enciphered key 1. Further, the file key 44 is enciphered using a management key 48 stored in the FD1 (step 110). A key 46 obtained by the encryption shall be referred to as an enciphered key 2. One of the above-mentioned encryption algorithms is used for the encryption processing of the file key 44.

Figure 9:
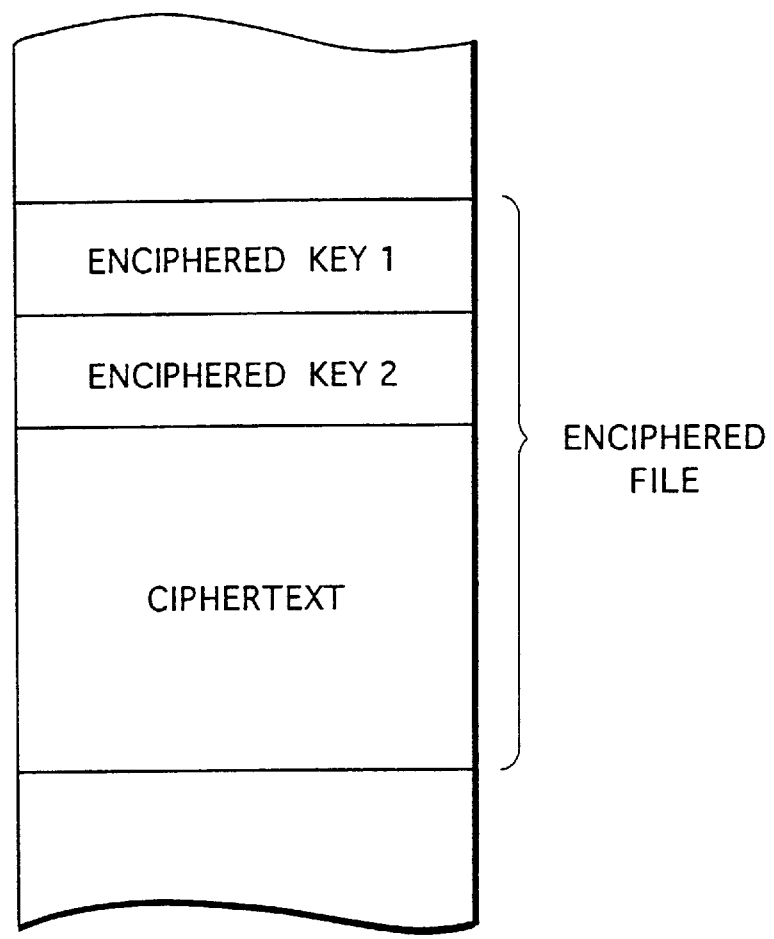
FIG. 9 illustrates a data structure of an enciphered file.

An enciphered file 43 is created from the enciphered keys 1 and 2 and the ciphertext of the intermediate data 42 (step 111). FIG. 9 illustrates a data structure of the enciphered file 43 on the internal memory in the computer system 1. The enciphered keys 1 and 2 are stored in an area at the head of the enciphered file. The ciphertext of the intermediate data 42 is stored in an area succeeding the area. When the enciphered file is created, the name of the enciphered file (a file name a part or the whole of which differs from the name of the plaintext file) is created. The name of the enciphered file may, in some cases, be also stored in the area succeeding the data area of the enciphered file.

Figure 10:
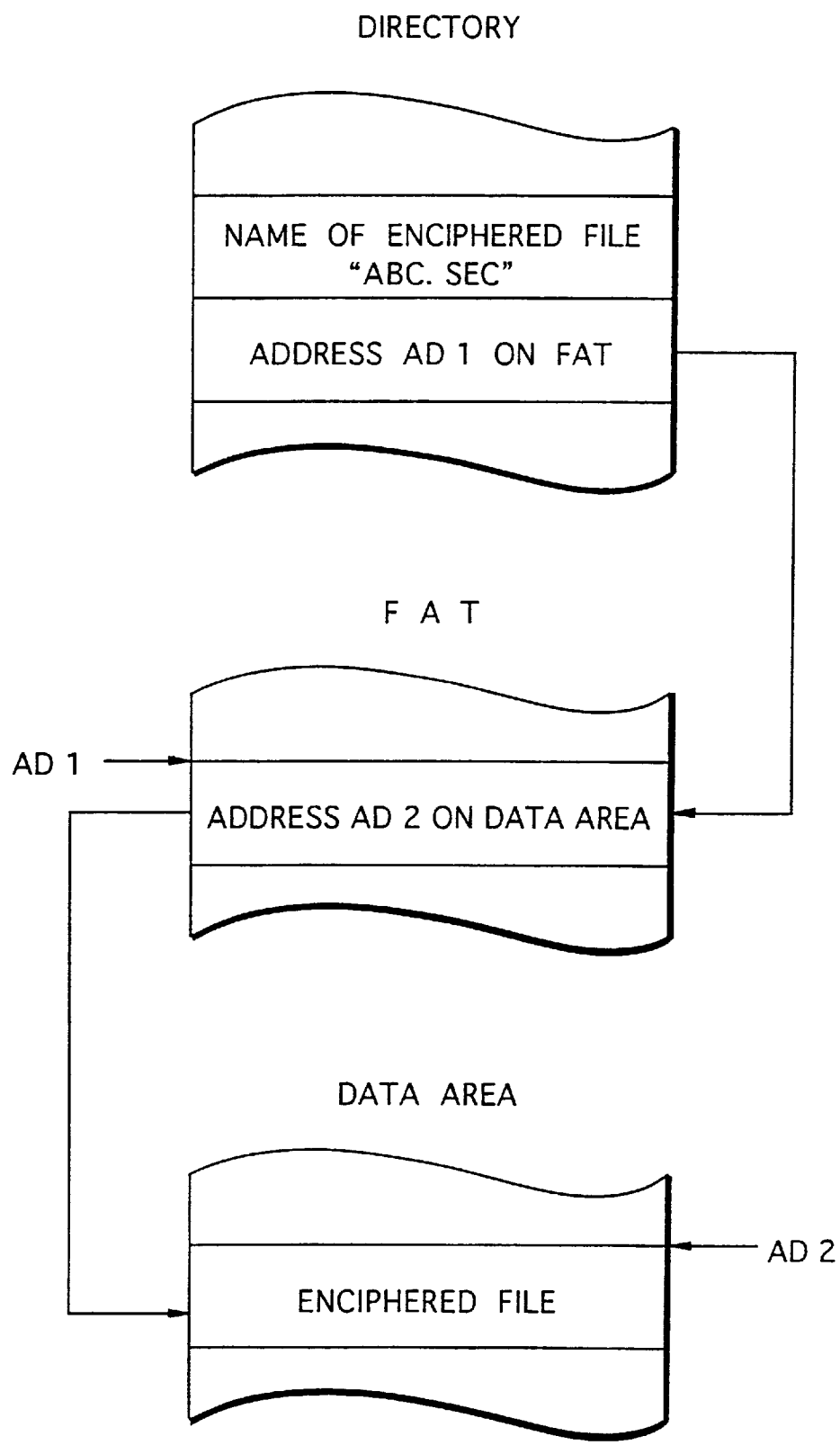
FIG. 10 illustrates a data structure in a floppy disk of an enciphered file.

The FD3 is then set in the FD drive 6 by the creator (step 112). A guidance for instructing the creator to set the FD3 in the FD drive 6 will be displayed on the display screen of the display device 2 prior to the setting if required. The enciphered file 43 and the name of the enciphered file are stored in the set FD3 (step 113). The encryption processing is then terminated. FIG. 10 illustrates a memory structure of the FD3. The FD3 includes three areas, that is, a directory, FAT (File Allocation Table), and a data area. The enciphered file (the enciphered keys 1 and 2 and the ciphertext) is stored at an address AD2 on the data area. The address AD2 of the data area is stored at an address AD1 on the FAT. The name of the enciphered file (the file name shall be "ABC.SEC" herein) and the address AD1 on the FAT are stored in the directory.

When the decryption is selected in the step 103 (NO in step 103), the FD3 is set in the FD drive 6 by the creator (step 114). A guidance for instructing the creator to set the FD3 in the FD drive 6 may, in some cases, be displayed on the display screen of the display device 2 prior to the setting. When the FD3 is set in the FD drive 6, the file name of the enciphered file ("ABC.SEC", for example) is read out from the directory in the FD3. The file name read out is displayed on the display screen of the display device 2 (step 115).

The file name of the enciphered file to be deciphered is then entered into the computer system 1 from the input device 3 by the creator (step 116). The file name can be also entered using a keyboard, or can be entered by designating the file name displayed on the display screen using a pointing device (for example, clicking).

The directory in the FD3 is searched on the basis of the entered file name, and the address AD1 on the FAT corresponding to the file name is read out (FIG. 10). The address AD2 on the FAT is read out on the basis of the address AD1 (FIG. 10). The enciphered file is read out from the data area in the FD3 on the basis of the address AD2 (step 117). The enciphered file read out is stored in the internal memory in the computer system 1.

The secret key 47 is then entered into the computer system 1 from the input device 3 by the creator (step 118) (FIG. 3b). The secret key 47 is used as a decryption key when the enciphered key 1 in the enciphered file is deciphered (step 119). Consequently, the entered secret key 47 is the same as that used when the file key 44 in the enciphered file is enciphered. The creator manages which file key is enciphered by which secret key. The creator enters the same key as the secret key used when the file key 44 is enciphered to generate the enciphered key 1.

The enciphered key 1 is deciphered using the secret key 47 (the decryption key), to obtain the file key 44 (step 119). In the decryption processing, it goes without saying that the same encryption (decryption) algorithm as that in a case where the file key 44 is enciphered is used. The ciphertext included in the enciphered file is then deciphered using the file key 44 (the decryption key), to obtain the plaintext file 41 (step 120). Even in this decryption processing, the same encryption (decryption) algorithm as that in a case where the plaintext file is enciphered is used. The plaintext file 41 is stored in the internal memory in the computer system 1. The decryption processing is then terminated. At this time, the enciphered key 2 is not used.

The plaintext file 41 stored in the internal memory in the computer system 1 can be also stored in the external storage device 4 or another floppy disk from the internal memory.

In this encryption processing, the file key is automatically generated, whereby the creator need not enter the file key or need not know the contents of the file key. Consequently, the data encryption key can be prevented from leaking out to a third person due to carelessness, for example, of the creator of the ciphertext data. Since the ciphertext and the file key for deciphering the ciphertext (the enciphered keys 1 and 2) are stored in the FD3, the management of a correspondence therebetween is easy. Further, the file key is enciphered by the secret key and the management key, respectively. Even if the ciphertext and the file key for deciphering the ciphertext are stored in one FD3, therefore, it is possible to maintain high security.

In the steps 108 and 118, it is also possible to previously store the secret key 47 in a magnetic card, an IC card (for example, a memory card), an optical card, or the like and enter the secret key 47 into the computer system 1 from a card reader. If an enciphering/deciphering device is given to each of creators and is employed as a device dedicated to the creator, it is also possible to previously store a plurality of secret keys in the external storage device 4, the internal ROM, or the like, display the secret keys on the display screen of the display device 2, and select one of the displayed secret keys. Further, a key obtained by further enciphering the entered secret key 47 can be also used for enciphering the file key.

(3) Description processing by manager of enciphered file

Figure 7:
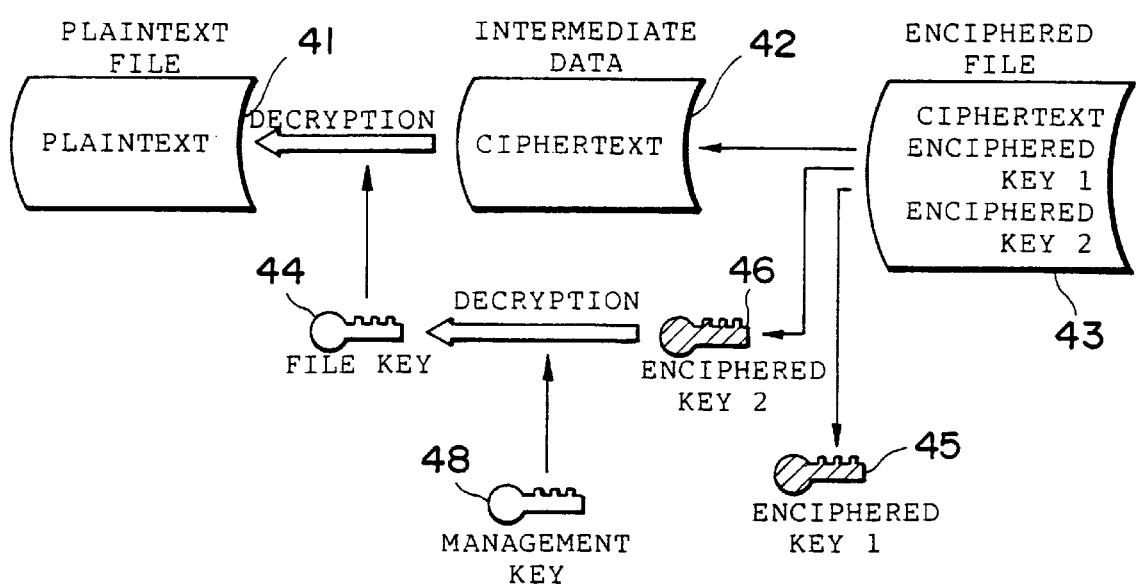
FIG. 7 shows how decryption processing in the enciphering/deciphering device in the first embodiment is performed.
Figure 8:
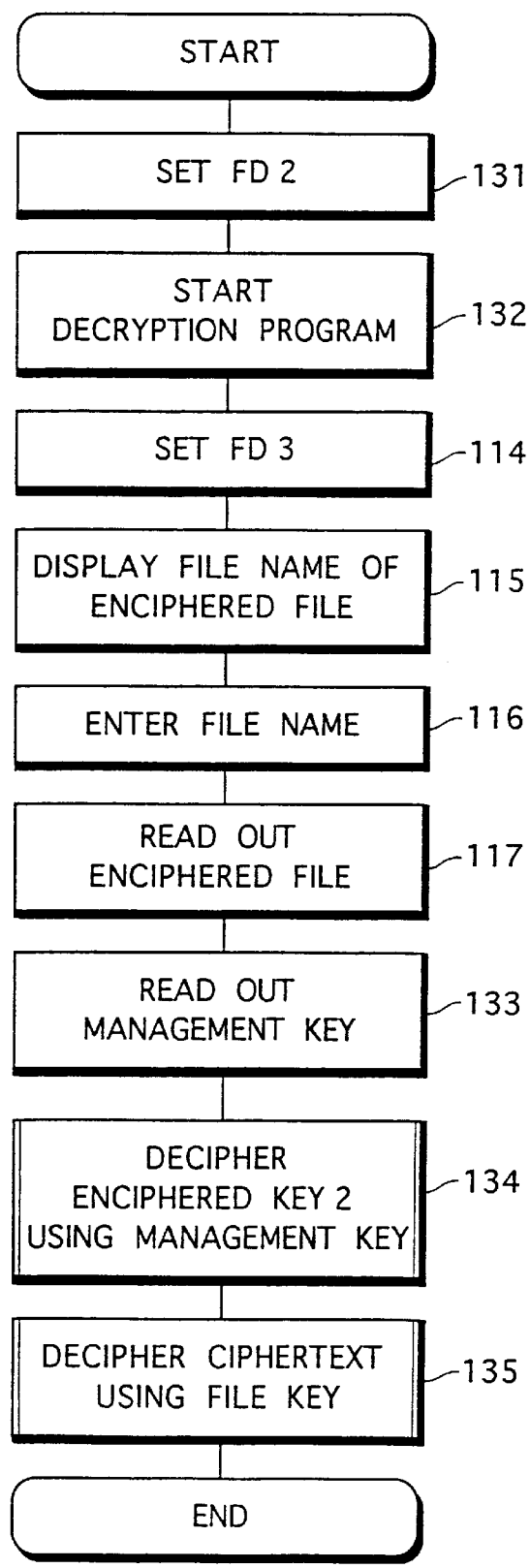
FIG. 8 is a flow chart showing the flow of decryption processing in the first embodiment.

FIG. 7 shows how processing in a case where a manager of an enciphered file (which is hereinafter simply referred to as a manager) deciphers an enciphered file is performed. The FD3 storing the enciphered file is handed over to the manager from the creator. The manager deciphers the enciphered file using the decryption program and the management key stored in the FD2 which himself or herself has. FIG. 8 is a flow chart showing the flow of processing in a case where the decryption program is executed by the computer system 1.

The FD2 is set in the FD drive 5 by the manager (step 131). An instruction to start the decryption program stored in the FD2 is then entered into the computer system 1 from the input device 3 by the manager. Consequently, the decryption program is read out from the FD2, and is stored in the internal memory in the computer system 1. The computer system 1 executes the decryption program (step 132).

The FD3 is then set in the FD drive 6 by the manager (step 114). The processing in the step 114 and the subsequent steps 115 to 117 is entirely the same as the processing in the foregoing steps 114 to 117 shown in FIG. 6 and hence, the description thereof is not repeated.

The management key 48 stored in the FD2 is then read out, and is stored in the internal memory in the computer system 1 (step 133) (see FIG. 7). This readout is automatically performed according to the program. The management key 48 is stored in a particular location of the FD2. The decryption program includes an address representing the particular location. Consequently, the computer system 1 can read out the management key 48 from the particular location of the FD2. The management key 48 is used as a decryption key when the enciphered key 2 is deciphered (step 134). Consequently, the management key 48 is the same as the management key used when the file key 44 of the enciphered file is enciphered to generate the enciphered key 2. As described above, the same management key is previously stored in the FD1 and the FD2, whereby there is no problem.

The enciphered key 2 included in the enciphered file 43 is deciphered using the management key 48 (the decryption key), to obtain the file key 44 (step 134). In this decryption processing, the same encryption (decryption) algorithm as that in a case where the file key 44 is enciphered is used. The ciphertext 42 is then deciphered using the file key 44 (the decryption key), to obtain the plaintext file 41 (step 135). Also in this decryption processing, the same encryption (decryption) algorithm as that in a case where the plaintext file is enciphered is used. The plaintext file 41 is stored in the internal memory in the computer system 1. The decryption processing is then terminated. At this time, the enciphered key 1 is not used.

The plaintext file 41 stored in the internal memory in the computer system 1 can be also stored in the external storage device 4 or another floppy disk from the internal memory.

In this decryption processing, the manager can decipher the enciphered file by only having the FD2, without receiving any information from the creator. The creator is released from trouble in managing for each creation of an enciphered file the enciphered file with a correspondence established between the enciphered file and the management key. Since the creator need not know the management key, and need not inform the manager of the management key, there is no possibility that the management key leaks out to a third person due to carelessness, for example, of the creator. Similarly, the manager need not know the management key, and need not input or output the management key. The management key can be thus prevented from leaking out, whereby the secrecy of the contents of the file can be further enhanced.

The FD drives 5 and 6 can be also realized by one floppy disk drive. In this case, in the step 112 (FIG. 5) and the step 114 (FIG. 8), the FD1 or the FD2 is taken out from the floppy disk drive, after which the FD3 will be set in the floppy disk drive. The floppy disk can be replaced with an IC card (for example, a memory card), a cassette type hard disk, a mini disk (MD), a magnetic card, or the like. In this case, the floppy disk drive can be replaced with a card reader/writer, a cassette type hard disk interface device, a mini disk interface device, or the like.

Furthermore, the enciphered file may be stored in the external storage device 4. In this case, the creator and the manager read out the enciphered file from the external storage device 4, to perform decryption processing.

(4) Enciphered key elimination processing by manager

Figure 11:
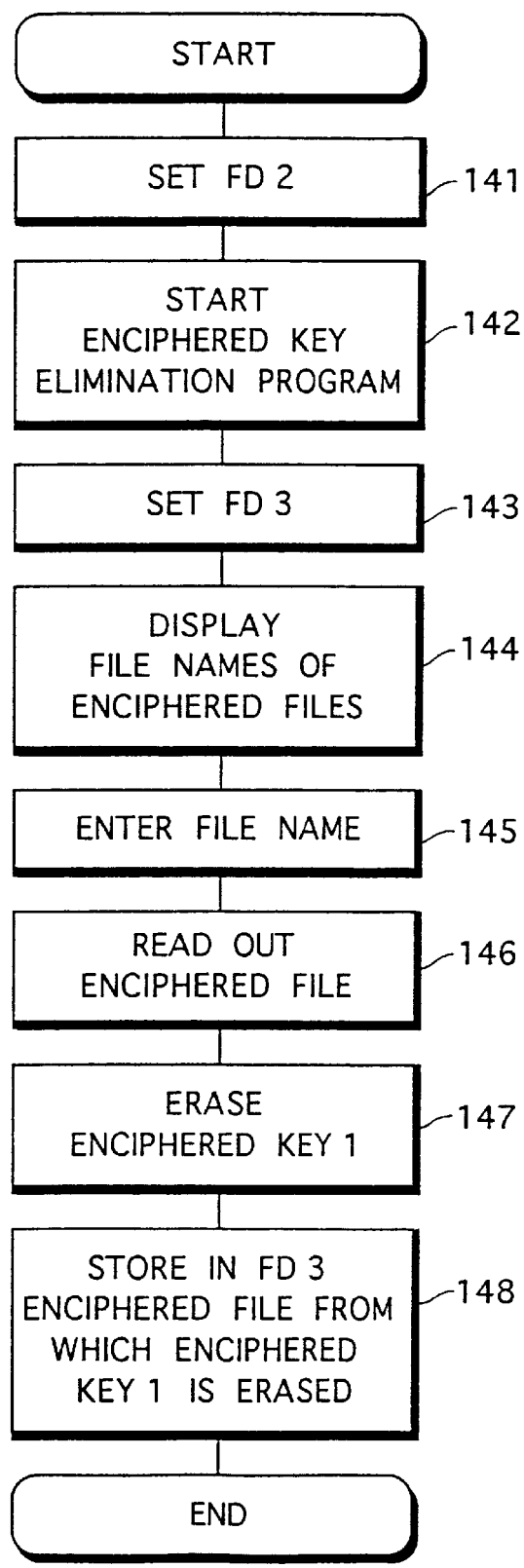
FIG. 11 is a flow chart showing the flow of erasure processing of an enciphered key 1 in the first embodiment.

FIG. 11 is a flow chart showing the flow of elimination processing of the enciphered key 1 by the manager.

The FD2 is set in the FD drive 5 by the manager (step 141). An instruction to start the enciphered key elimination program stored in the FD2 is entered into the computer system 1 from the input device 3 by the manager. Consequently, the enciphered key elimination program is read out from the FD2, and is stored in the internal memory in the computer system 1. The computer system 1 executes this program (step 142).

The FD3 is then set in the FD drive 6 by the manager (step 143). The file names of enciphered files are read out from the directory in the FD3, and are displayed on the display screen of the display device 2 (step 144). The file name selected by the manager out of the displayed file names is entered into the computer system 1 from the input device 3 (step 145). The computer system 1 reads out the enciphered file from the FD3 in accordance with the entered file name, and stores the enciphered file read out in the internal memory (step 146). The enciphered key 1 included in the enciphered file is erased (step 147). The erasure is made by writing data different from the enciphered key 1 in an area of the enciphered key 1 (FIG. 9). Since the different data is written, the original file key is not obtained even if the enciphered key 1 is deciphered using the management key. The enciphered file from which the enciphered key 1 is erased is stored in the FD3 again (step 148). The processing is then terminated.

By thus eliminating the enciphered key 1, the creator becomes incapable of deciphering the enciphered file. Consequently, the contents of plaintext file which will be obtained by deciphering the enciphered file can be prevented from leaking out due to carelessness, for example, of the creator. The manager can intensively manage the secrecy of the enciphered file.

Furthermore, the manager can also eliminate the enciphered key 2 in the same manner as that in the elimination of the enciphered key 1. The creator can also eliminate the management key by storing the enciphered key elimination program in the FD1.

(5) Key Generation Processing

Figure 12:
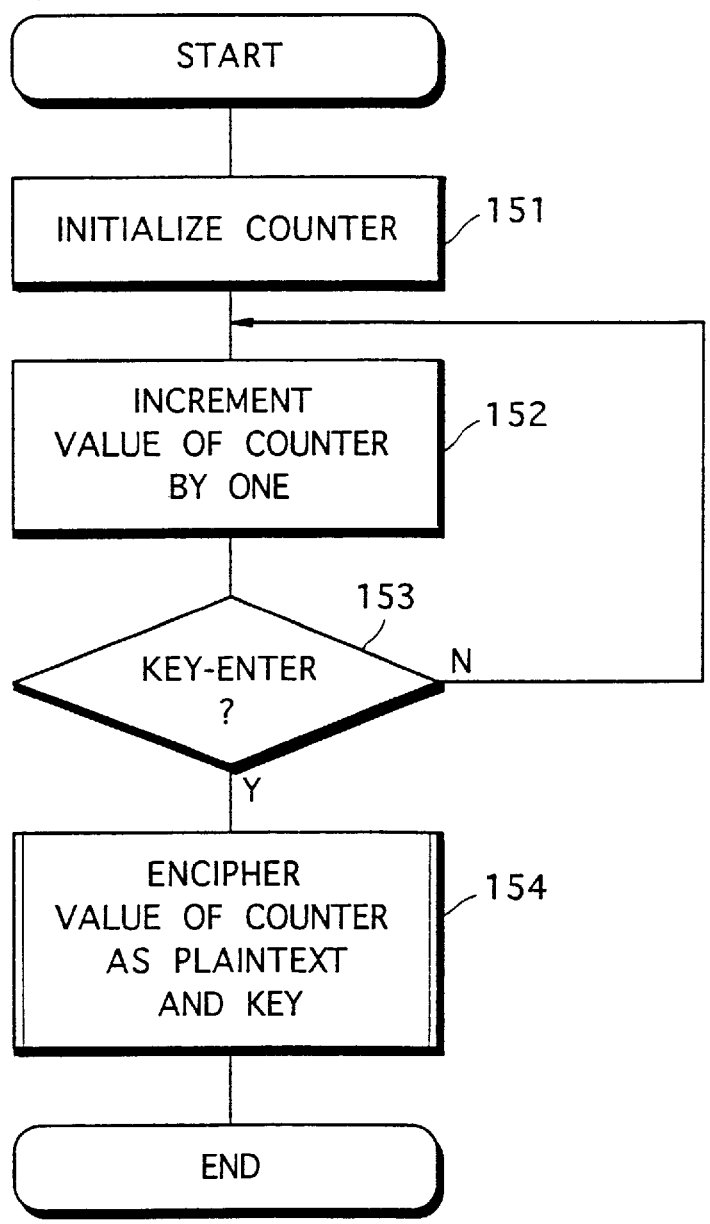
FIG. 12 is a flow chart showing the flow of key generation processing.

FIG. 12 is a flow chart showing the flow of processing in a case where the key generation in the step 106 shown in FIG. 4 is realized by software (a program). The processing program is started when the file name is entered from the input device 3 (which shall be a keyboard herein) in the step 104, for example.

When the creator key-enters the file name into the input device 3 (the keyboard), the value of a counter (a variable provided in the program) is initialized to a previously determined value (for example, zero) by the first key entry (step 151). Loop processing is repeated until the subsequent key entry is made, and the value of the counter is incremented by one every time the loop is repeated (steps 152 and 153). For example, the loop processing is realized by a "for" statement, a "while" statement, or the like in a program language (for example, a C language).

When the subsequent key entry is made (YES in step 153), encryption processing is performed using the value of the counter at that time as plaintext and as a key (step 154). Data obtained by the encryption is used as a file key in the step 107.

An interval between key entries from the keyboard becomes a random value depending on the occasion. Since the random value is further enciphered to generate a key, it can be very difficult for a third person to presume the key.

Figure 13:
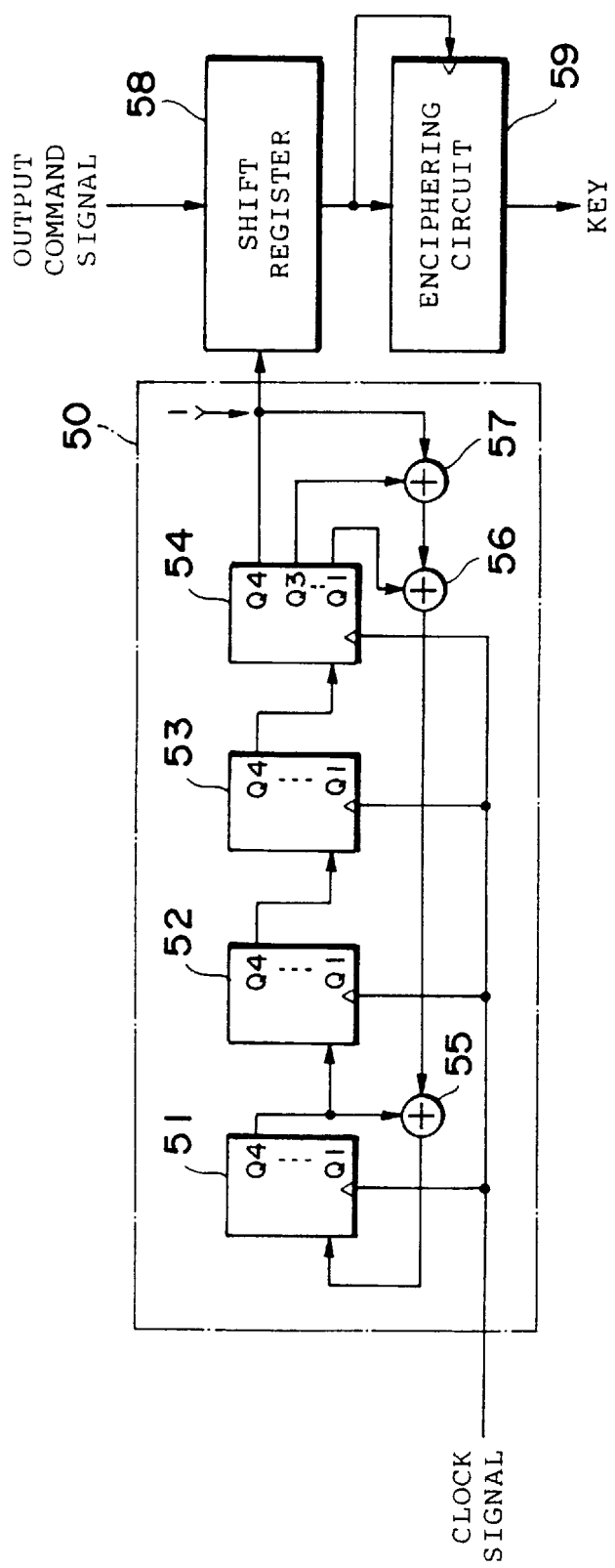
FIG. 13 is a block diagram showing the construction of a key generating circuit.

A key can be also generated by a hardware circuit (a key generating circuit). In this case, the key generating circuit is provided inside or outside the computer system 1. The key generating circuit generates a key by receiving an instruction to generate a key from the encryption/decryption program (step 106). FIG. 13 is a block diagram showing one example of the construction of the key generating circuit. The key generating circuit comprises a pseudo-random number generating circuit 50, a shift register 58, and an enciphering circuit 59. The pseudo-random number generating circuit 50 comprises 4-bit counters 51 to 54 and gates 55 to 57 for executing an exclusive-OR operation.

An output Q4 of the counter 51 is inputted to the counter 52 and the gate 55, an output Q4 of the counter 52 is inputted to the counter 53, and an output Q4 of the counter 53 is inputted to the counter 54. An output Q4, an output Q3, and an output Q1 of the counter 54 are respectively inputted to the shift register 58, the gate 57, and the gate 56. An output of the gate 57, an output of the gate 56, and an output of the gate 55 are respectively inputted to the gate 56, the gate 55, and the counter 51.

An initial value "one" is given to the gate 57 at the time of rising (at the time of turning the power supply on or at the time of resetting) in order to prevent all output values of the counters 51 to 54 from being zero at the time of rising. A clock signal is fed to the counters 51 to 54. Consequently, the pseudo-random number generating circuit 50 generates a pseudo-random number based on a primitive polynomial F $(x)=x^p+x^q+1$ (p and q are integers) from the output Q4 of the counter 54.

One-bit output data (a pseudo-random number) from the output Q4 of the counter 54 is fed to the shift register 58. The shift register 58 is composed of arbitrary bits corresponding to the length of a key. For example, if the key is composed of n bits (n is a positive integer), the shift register 58 is composed of n or more bits. Further, an output signal is fed to the shift register 58. The output signal corresponds to an instruction to generate a key in the step 106. When the output signal is fed, the shift register 58 outputs stored data to the enciphering circuit 59.

Data from the shift register 58 is entered as plaintext and a key into the enciphering circuit 59. The enciphering circuit 59 performs encryption processing on the basis of the plaintext and the key, to output ciphertext. The ciphertext becomes a file key used in the step 107. Various algorithms such as the above-mentioned DES cipher can be used as an encryption algorithm. A part of the data stored in the shift register 58 can be also entered as plaintext into the enciphering circuit 59. A part of the data entered as plaintext can be also entered as a key into the enciphering circuit 59. Further, a part of the data in the shift register 58 and another part thereof can be also respectively entered as plaintext and as a key in the enciphering circuit 59. For example, when the shift register 58 is composed of 12 bits, the 12-bit data can be also used for the plaintext and the key. When the shift register 58 is composed of 24 bits, the upper 12 bits and the lower 12 bits can be also used for the plaintext and the key, respectively. When the shift register 58 is composed of 18 bits, the upper 12 bits from the most significant digit and the lower 12 bits from the least significant digit can be also used for the plaintext and the key, respectively. The bit lengths of the plaintext and the key may be different from each other.

Furthermore, the pseudo-random number generating circuit 50 and the enciphering circuit 59 can be also realized by software (a program).

By thus using data obtained by further enciphering the pseudo-random number as a key (a file key), it can be more difficult for a third person to presume the key.

Second Embodiment

Figure 14:
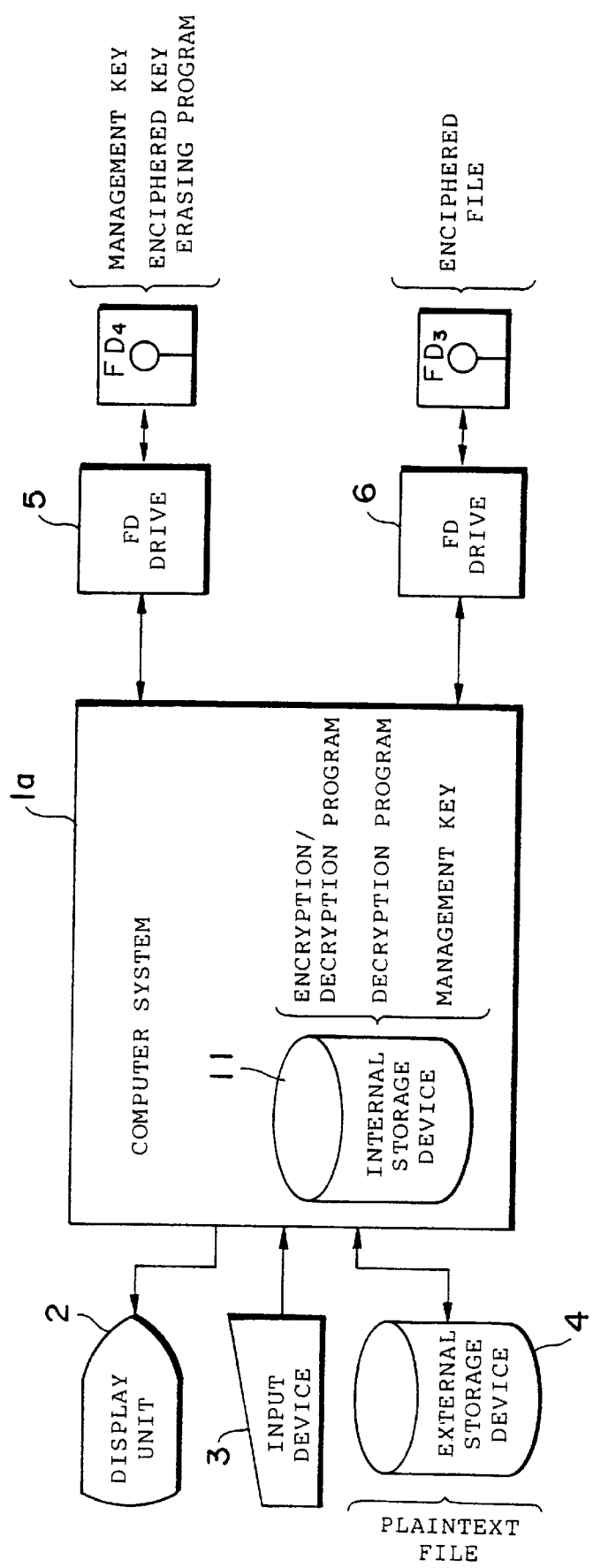
FIG. 14 is a block diagram showing the construction of an enciphering/deciphering device in a second embodiment.

FIG. 14 is a block diagram showing the construction of an enciphering/deciphering device according to a second embodiment. The same units as those in the enciphering/deciphering device according to the first embodiment (see FIG. 1) are assigned the same reference numerals. The second embodiment differs from the first embodiment in that an internal storage device 11 (a ROM, a magnetic disk storage device, an optical disk storage device, etc.) is contained in a computer system 1a. The encryption/decryption program and the management key stored in the FD1 and the decryption program stored in the FD2 in the first embodiment are previously stored in the internal storage device 11. A floppy disk FD4 (which is hereinafter simply referred to as an FD4) storing a management key and an enciphered key elimination program is set in or removed from an FD drive 5. The management key stored in the internal storage 11 and the management key stored in the FD4 are the identical. The FD4 is previously distributed to a manager.

A creator enciphers and deciphers a file using the encryption/decryption program and the management key stored in the internal storage device 11. The manager deciphers using the management key in the FD4 and the decryption program in the internal storage device 11, and eliminates an enciphered key 1 or 2 using the enciphered key elimination program.

A flow chart showing the flow of file encryption processing, file decryption processing, and enciphered key elimination processing in the second embodiment is the same as that shown in FIGS. 4 to 6, FIG. 8 and FIG. 11 in the first embodiment except for the following. Specifically, the setting of the FD1 in the step 101 is not required, and the encryption/decryption program is read out from the internal storage device 11 and is started in the step 102. In the step 110, the management key is read out from the internal storage device 11. In the steps 131 and 141, the FD4 is set in the FD drive 5. In the step 132, the decryption program is read out from the internal storage device 11 and is started.

As a modified example of the second embodiment, a decryption program is previously stored in not the internal storage device 11 but the FD4, as in the first embodiment.

Third Embodiment

Figure 15:
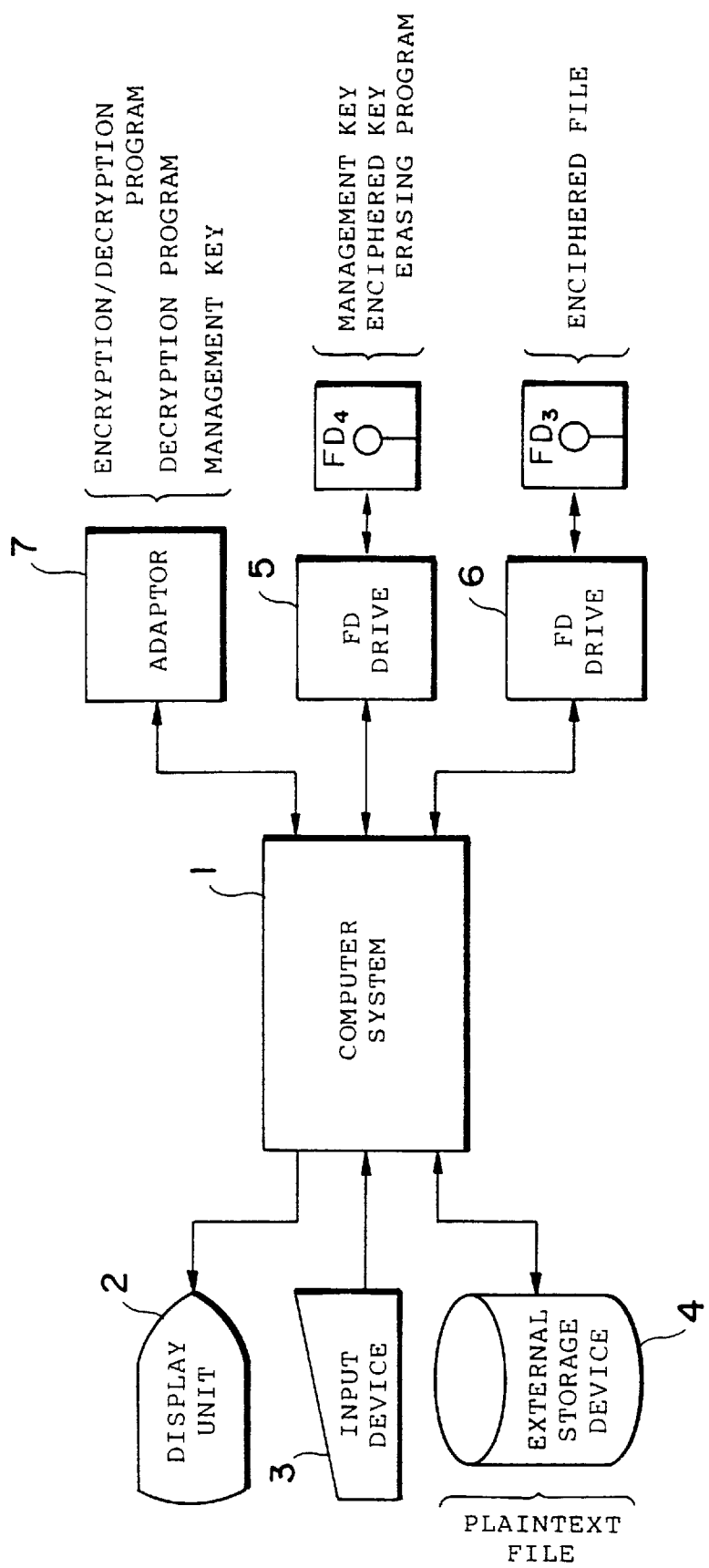
FIG. 15 is a block diagram showing the construction of an enciphering/deciphering device in a third embodiment.

FIG. 15 is a block diagram showing the construction of an enciphering/deciphering device in a third embodiment. The same units as those in the first embodiment (FIG. 1) are assigned the same reference numerals.

The enciphering/deciphering device differs from the first embodiment in that an adaptor 7 is connected to a computer system 1. The adaptor 7 is a device comprising a storage device storing an encryption/decryption program, a decryption program and a management key and a device for executing the program (a processor, a microcomputer, etc.).

Encryption/decryption processing in the third embodiment is the same as that in the second embodiment except that the adaptor 7 executes a program in file encryption processing, decryption processing, and enciphered key elimination processing in the third embodiment, and the encryption/decryption program and the decryption program are read out from the storage device inside the adaptor 7 and hence, the description thereof is not repeated.

The adaptor 7 can also comprise a floppy disk drive. An FD1 storing the encryption/decryption program and the management key is set in the floppy disk drive, whereby the adaptor 7 can also execute the encryption/decryption program in the FD1 to perform encryption and decryption processing.

Fourth Embodiment

In a fourth embodiment, the secret key in the first embodiment is not entered by a creator (step 108 in FIG. 4) but automatically generated by the above-mentioned key generation processing (FIG. 12 or 13). The hardware in the first to third embodiments can be employed as hardware of an enciphering/deciphering device.

Figure 16:
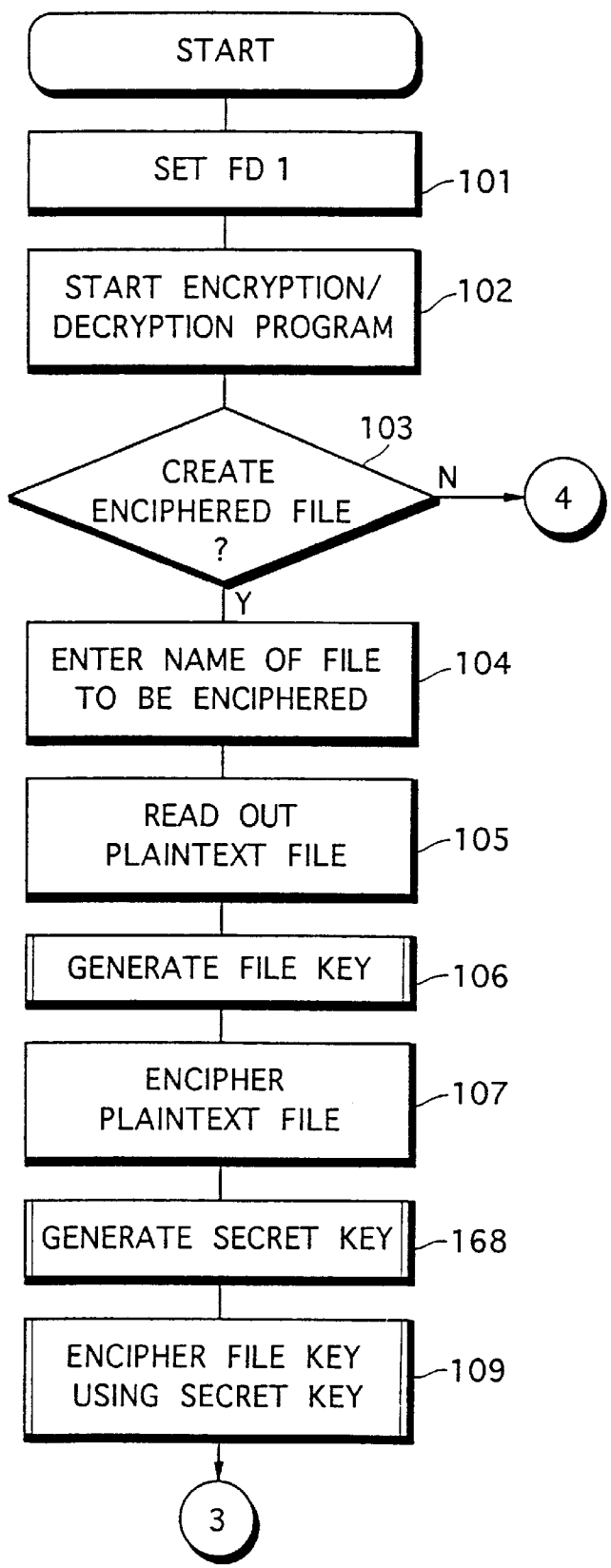
FIG. 16 is a flow chart showing the flow of encryption/decryption processing in a fourth embodiment.
Figure 17:
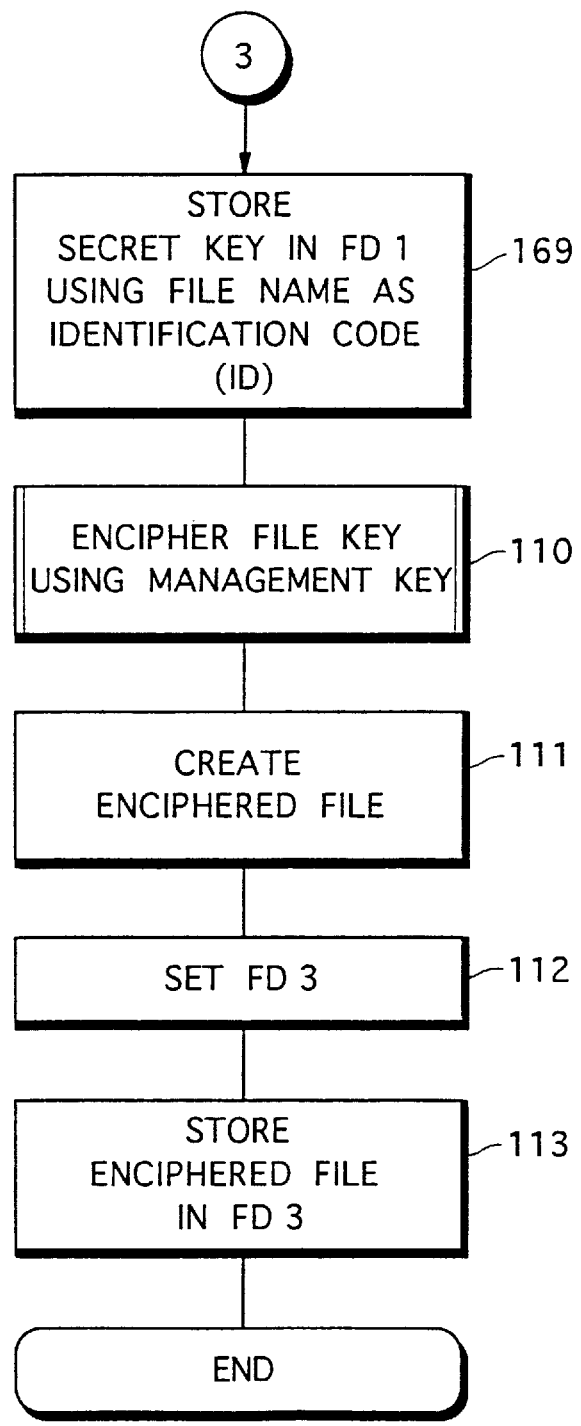
FIG. 17 is a flow chart showing the flow of encryption/decryption processing in the fourth embodiment.
Figure 18:
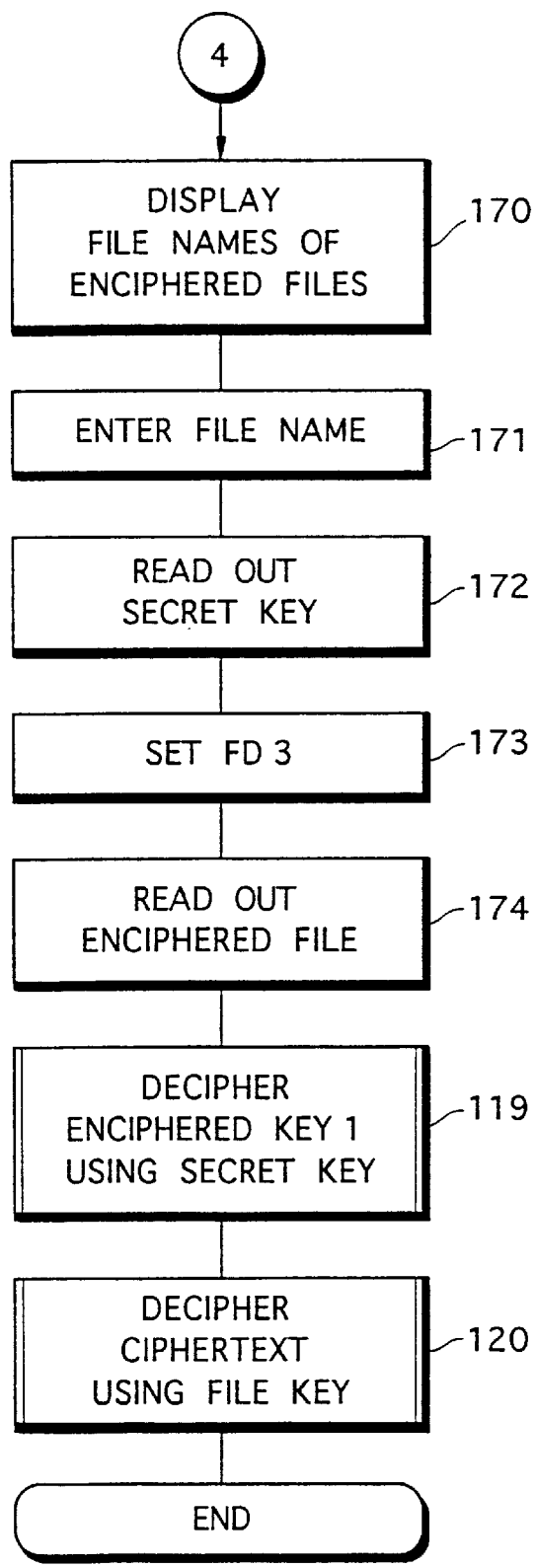
FIG. 18 is a flow chart showing the flow of encryption/decryption processing in the fourth embodiment.

FIGS. 16 to 18 are flow charts showing the flow of processing in a case where the enciphering/deciphering device according to the first embodiment is used. Processing in the steps 101 to 107 is the same as that in the first embodiment (FIG. 4) and hence, the description thereof is not repeated. In the step 168, a secret key is automatically generated by the above-mentioned key generation processing (FIG. 12 or 13). The generated secret key is used for enciphering a file key (step 109), and is then stored in an FD1 by establishing a correspondence with the file name of an enciphered file (step 169). The file name of the enciphered file becomes an identification code (ID) of the secret key. Processing in the steps 110 to 113 (which is the same as that in the first embodiment) is performed.

At the time of deciphering the enciphered file (NO in step 103), the file name of the enciphered file (the ID of the secret key) stored in the FD1 in the step 169 is read out from the FD1, and is displayed on a display screen of a display device 2 (step 170). Subsequently, the file name of the enciphered file (the ID of the secret key) to be deciphered is entered into a computer system 1 from an input device 3 by a creator. The secret key stored by establishing a correspondence with the entered file name is read out from the FD1 (step 172), and is stored in an internal memory in a computer system 1.

An FD3 is then set in an FD drive 6 (step 173). The enciphered file having the file name entered in the step 171 is read out from the FD3 (step 174), and is stored in the internal memory in the computer system 1. Decryption processing is performed on the basis of the secret key and the enciphered file read out (steps 119 and 120).

Processing by a decryption program and an enciphered key elimination program in an FD2 is entirely the same as the processing in the flow charts respectively shown in FIG. 8 and 11 and hence, the description thereof is not repeated.

Since in the fourth embodiment, the secret key is automatically generated and is stored in the FD1 by establishing a correspondence with the file name of the enciphered file, the creator need not manage the secret key.

Fifth Embodiment

Figure 19:
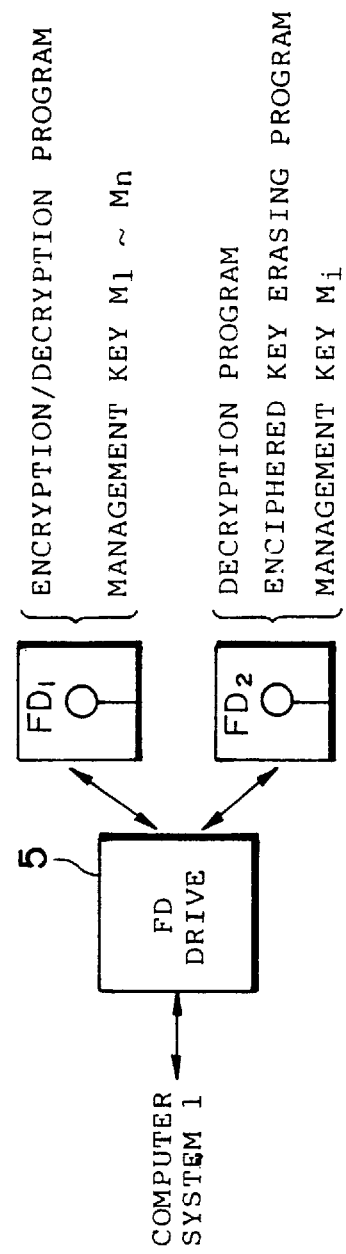
FIG. 19 illustrates a portion of an FD drive 5 and FDs 1 and 2 in an enciphering/deciphering device in a fifth embodiment.

In a fifth embodiment, a plurality of different management keys are previously stored in an FD1. FIG. 19 illustrates a portion of an FD drive 5 of an enciphering/deciphering device and an FD1 and an FD2. The other units are the same as those in the first embodiment (FIG. 1).

n management keys (which are taken as M1 to Mn) are previously stored in the FD1. Identification codes are previously assigned to the management keys M1 to Mn, respectively. The management keys and the identification codes are stored in the FD1 and FD2 with a correspondence established therebetween. One management key Mi (i=1 to n) out of the management keys M1 to Mn is previously stored in the FD2. It is possible to take such a form of distribution that the FD2 storing the management key Mi is distributed to a certain manager and the FD2 storing a management key Mj (i≠j) is distributed to the other manager.

Figure 20:
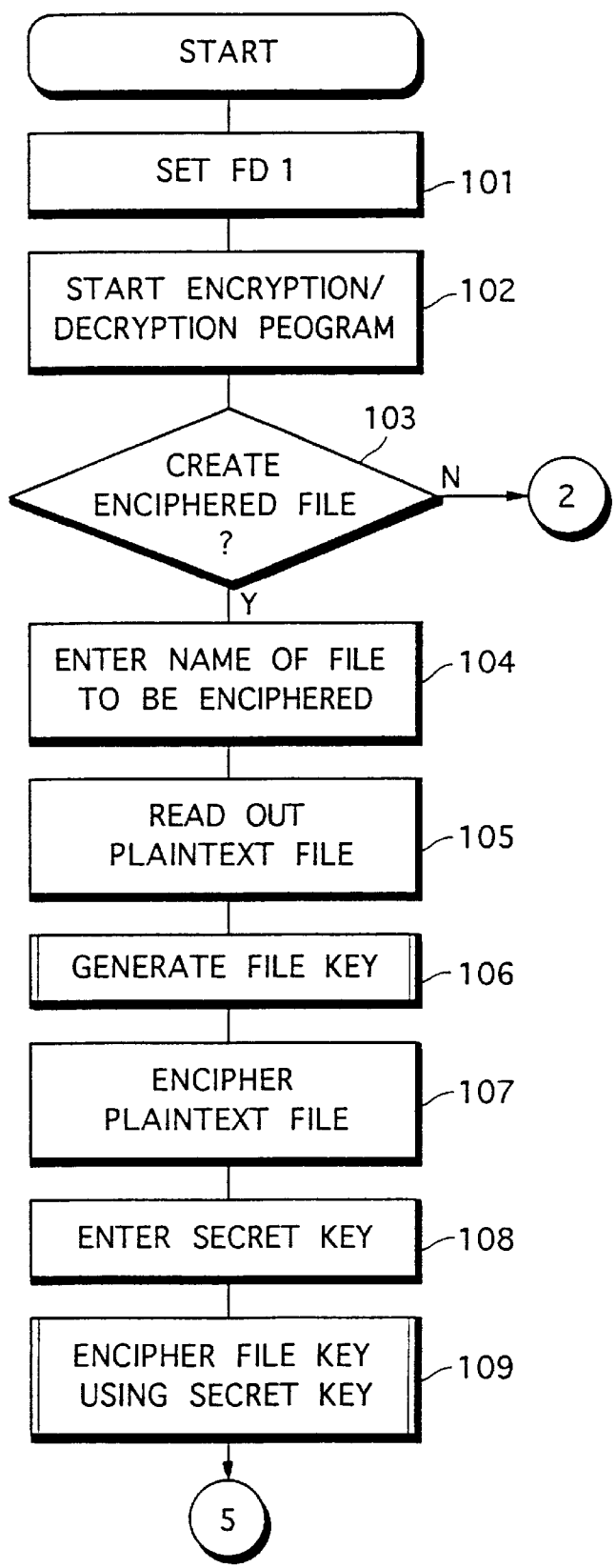
FIG. 20 is a flow chart showing the flow of encryption processing in the fifth embodiment.
Figure 21:
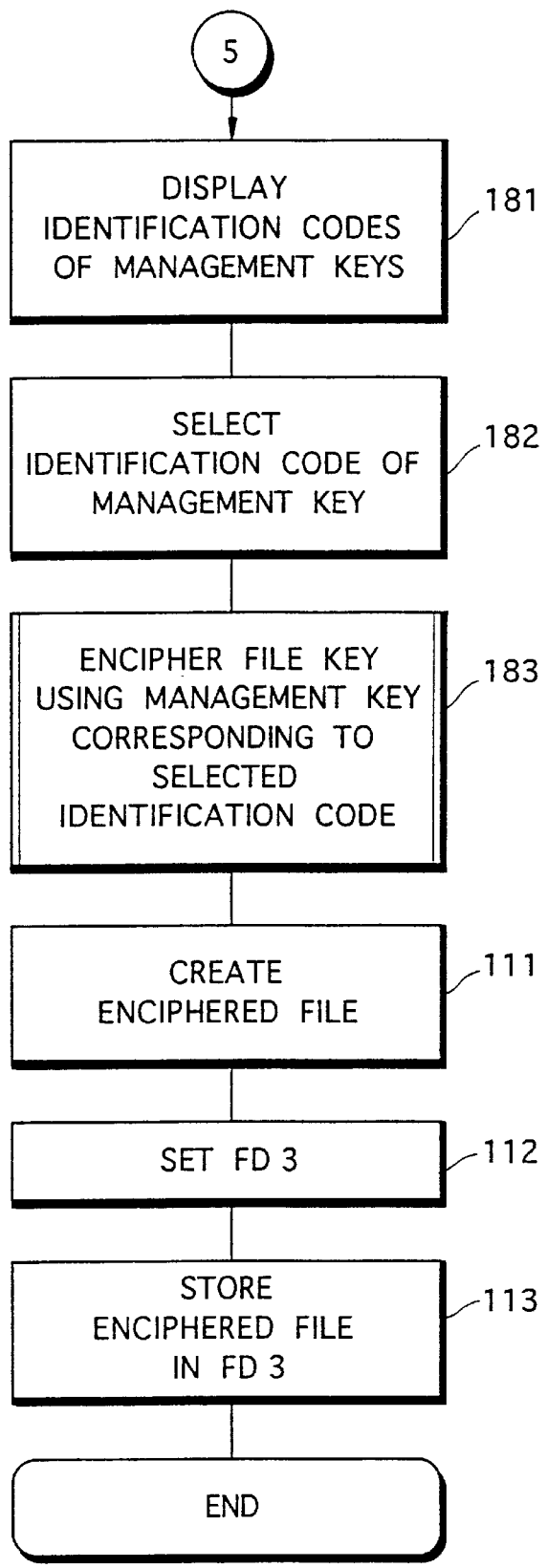
FIG. 21 is a flow chart showing the flow of encryption processing in the fifth embodiment.

FIGS. 20 and 21 are flow charts showing the flow of processing in a case where a creator enciphers a file using an encryption/decryption program in the FD1. Since the steps 101 to 109 are the same as those in the processing according to the first embodiment (see FIG. 4) and hence, the description thereof is not repeated.

After a file key is enciphered using a secret key (step 109), the identification codes of the management keys are read out from the FD1, and are displayed on a display screen of a display device 2 (step 181). The contents of the management keys are not displayed. The creator selects one of the displayed identification codes (step 182). The management key corresponding to the selected identification code is read out. The file key is enciphered using the management key, to generate an enciphered key 2 (step 183). An enciphered file is then created (step 111), and is stored in an FD3 (steps 112 and 113).

Figure 22:
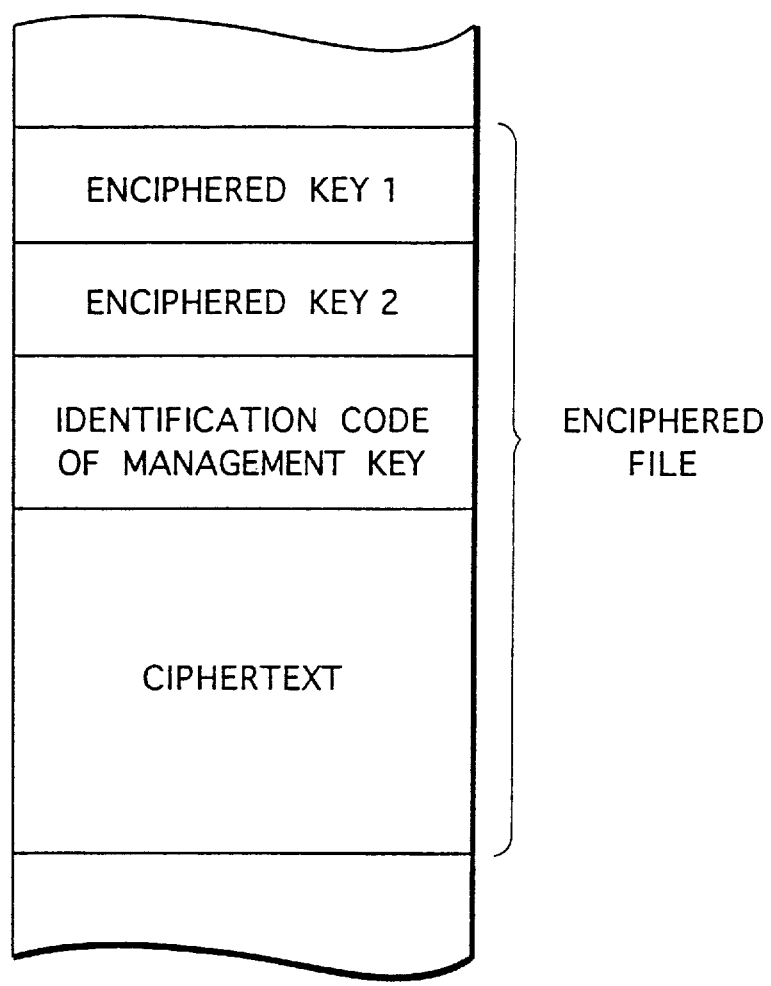
FIG. 22 illustrates a data structure of an enciphered file.
Figure 23:
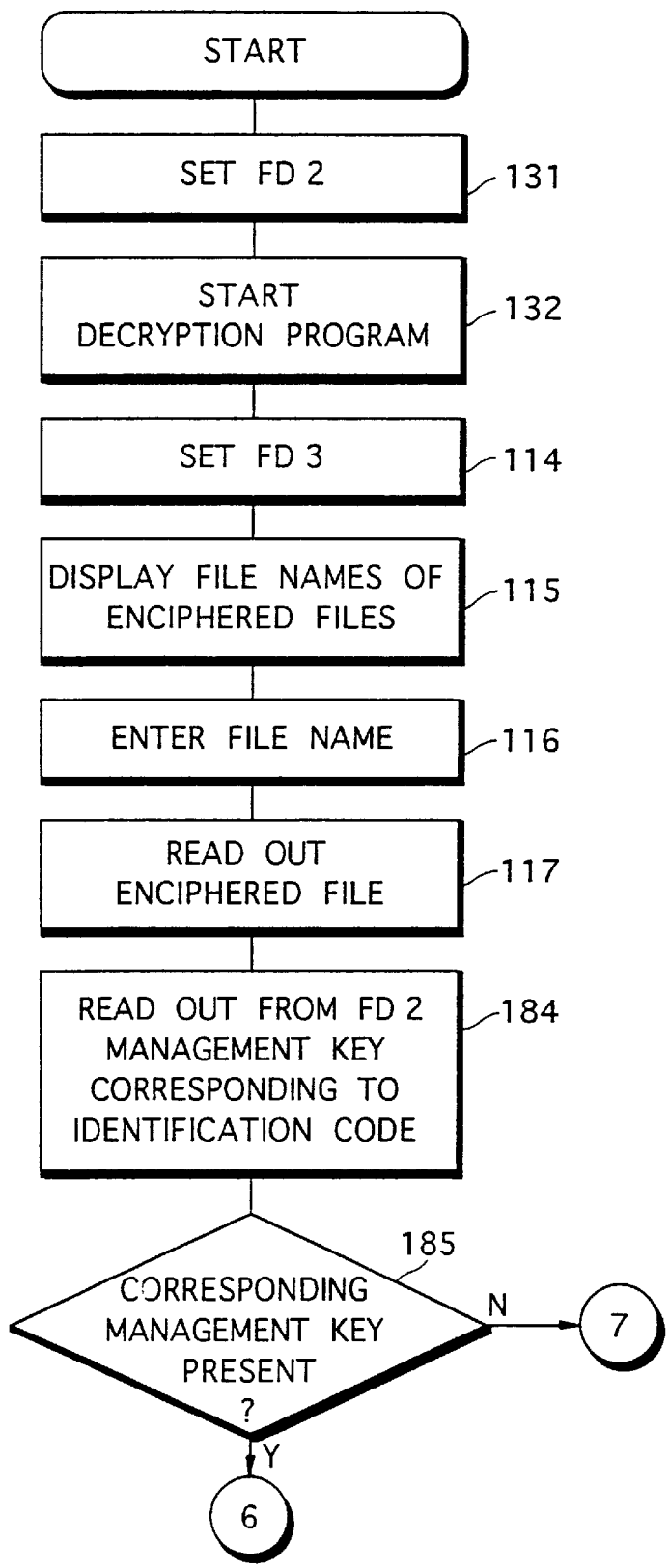
FIG. 23 is a flow chart showing the flow of decryption processing in the fifth embodiment.
Figure 24A:
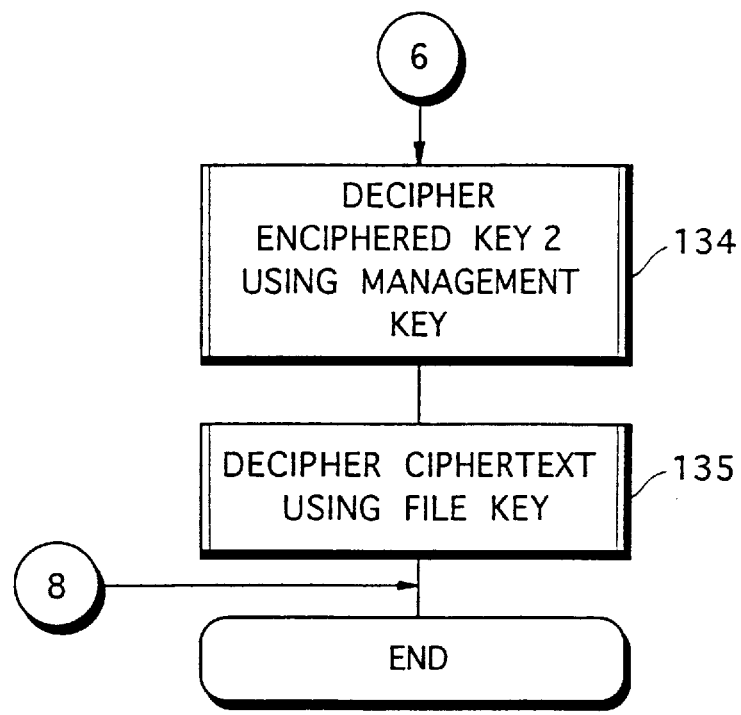
FIGS. 24a and 24b are a flow chart showing the flow of decryption processing in the fifth embodiment.
Figure 24B:
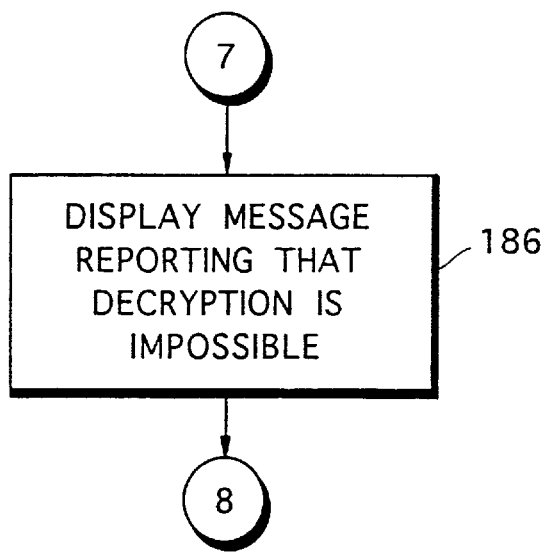

The enciphered file has a data structure illustrated in FIG. 22. Specifically, the identification code of the management key used for enciphering the file key to generate the enciphered key 2 is placed between the enciphered key 2 and ciphertext. The identification code of the management key is used when a manager deciphers the enciphered file using a decryption program in the FD2. FIGS. 23 and 24 are flow charts showing the flow of processing in a case where the manager deciphers the enciphered file using the decryption program in the FD2.

Processing in the steps 131 to 117 is the same as that in the first embodiment (FIG. 8) and hence, the description thereof is not repeated. When the enciphered file is read out from the FD3 (step 117), the identification code of the management key included in the enciphered file is read out. The management key corresponding to the identification code is read out from the FD2. If the management key corresponding to the identification code is stored in the FD2 (YES in step 185), processing in the steps 134 and 135 (which is the same as that shown in FIG. 8) is performed. If the management key corresponding to the identification code is not stored in the FD2 (NO in step 185), a message reporting that decryption is impossible is displayed on the display screen of the display device 2 (step 186), whereby the processing is terminated.

Processing in a case where the creator deciphers the enciphered file (NO in step 103) is entirely the same as that in FIG. 6 (the first embodiment) and hence, the description thereof is not repeated. Further, elimination processing of the enciphered key 1 using an enciphered key elimination program in the FD2 is the same as that in the flow chart shown in FIG. 11 (the first embodiment) and hence, the description thereof is not repeated.

In the fifth embodiment, the creator can select, when a plaintext file is enciphered, a management key which a manager of the enciphered file has. That is, the creator can properly use the management key for each enciphered file.

Modified examples of the fifth embodiment include one comprising an internal storage device 11 as in the second embodiment, one comprising an adaptor 7 as in the third embodiment, and one automatically generating a secret key as in the fourth embodiment.

Sixth Embodiment

In a sixth embodiment, a plurality of different management keys and all or parts of the plurality of management keys are respectively stored in an FD1 and an FD2. FIG. 25 illustrates a portion of an FD drive 5 in an enciphering/deciphering device and an FD1 and an FD2. The other units are the same as those in the first embodiment (FIG. 1). n management keys M1 to Mn are previously stored in the FD1. Three management keys Mi, Mj and Mk (i, j, k=1 to n, i≠j≠k) out of the management keys M1 to Mn are previously stored as one example in the FD2. Identification codes are previously assigned to the management keys M1 to Mn, respectively. The management keys and the identification codes are stored in the FD1 and the FD2 with a correspondence established therebetween.

Processing in a case where a creator enciphers and deciphers a file using an encryption/decryption program in the FD1 is the same as that in the fifth embodiment. Processing in a case where a manager deciphers a file using a decryption program in the FD3 and processing in a case where a manager eliminates an enciphered key 1 using an enciphered key elimination program are also the same as those in the fifth embodiment (the first embodiment) and hence, the description thereof is not repeated herein.

Modified examples of the sixth embodiment include one comprising an internal storage device 11 as in the second embodiment, one comprising an adaptor 7 as in the third embodiment, and one automatically generating a secret key as in the fourth embodiment.

Seventh Embodiment

In a seventh embodiment, a management key is newly generated. The hardware in the fifth embodiment or the sixth embodiment can be employed as hardware of an enciphering/deciphering device.

Figure 26:
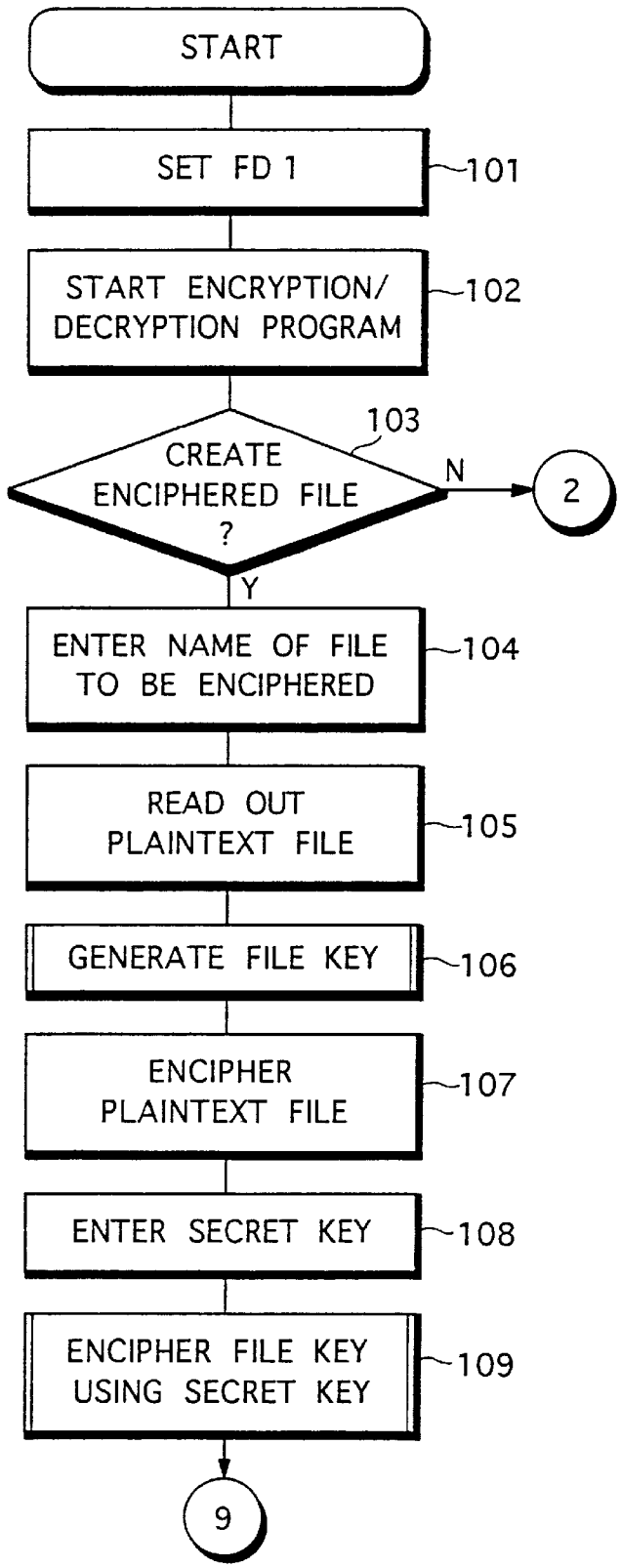
FIG. 26 is a flow chart showing the flow of encryption processing in a seventh embodiment.
Figure 27:
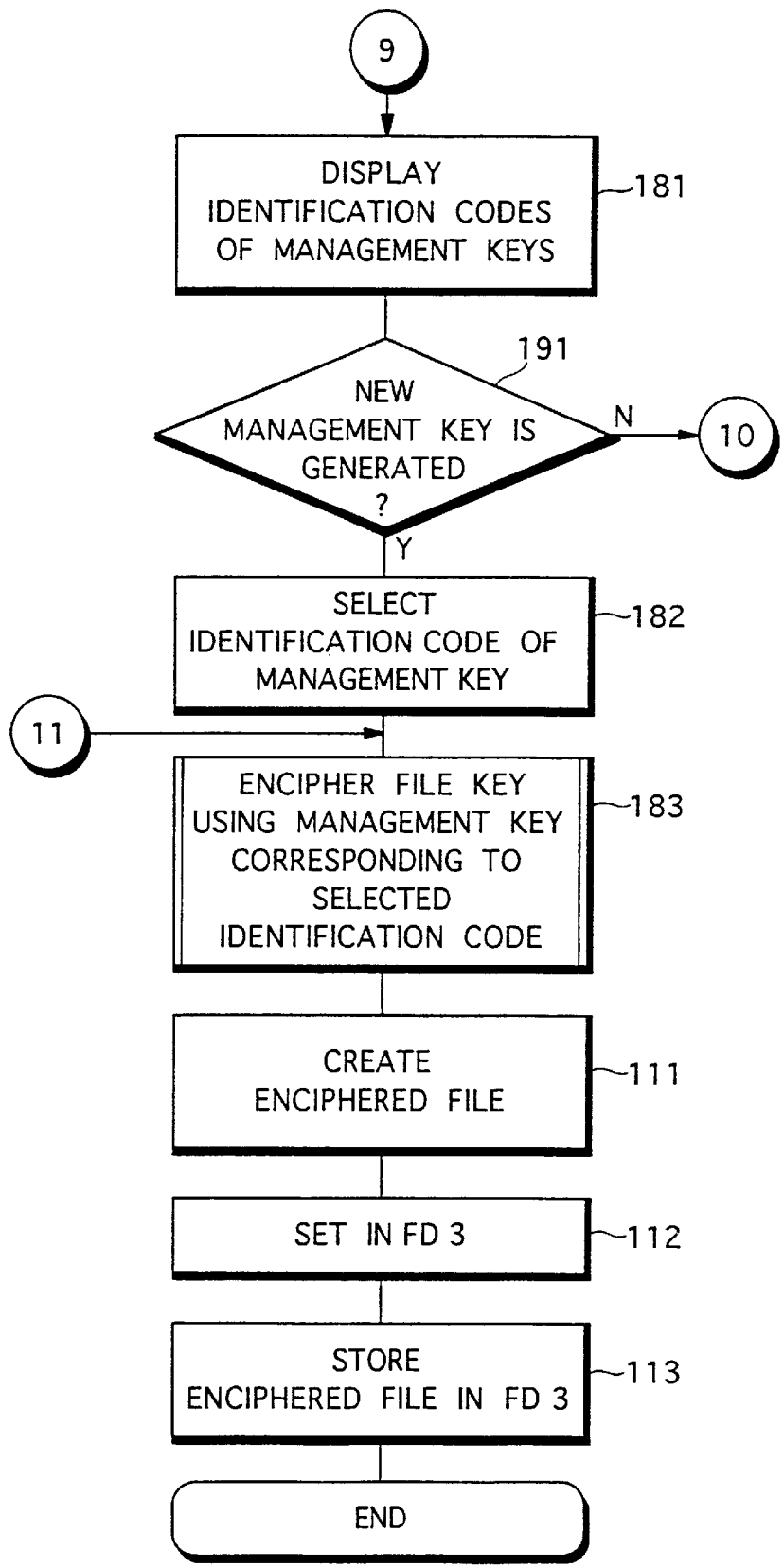
FIG. 27 is a flow chart showing the flow of encryption processing in the seventh embodiment.
Figure 28:
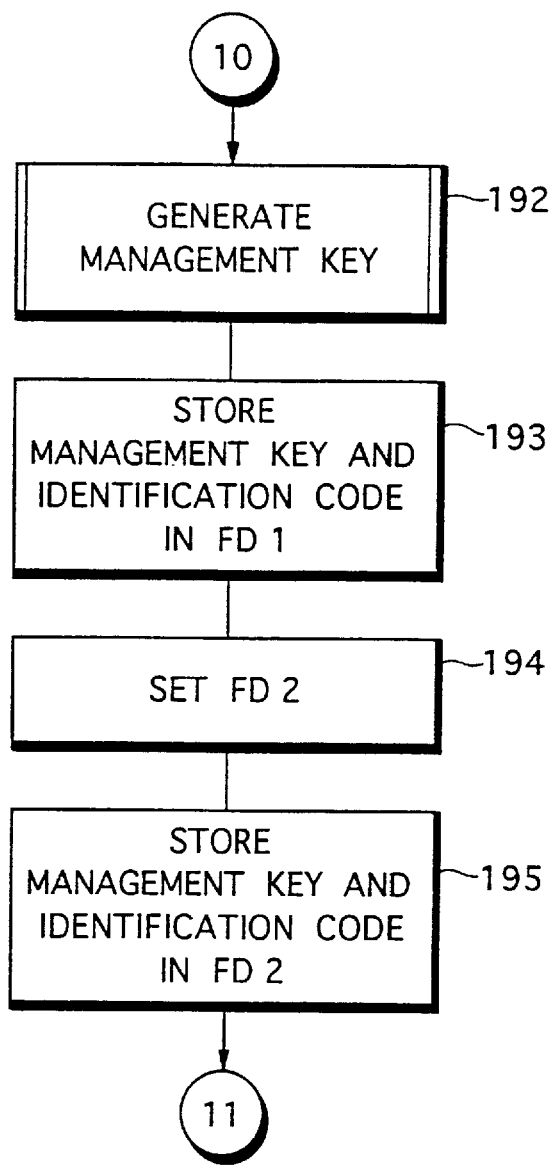
FIG. 28 is a flow chart showing the flow of encryption processing in the seventh embodiment.

FIGS. 26 to 28 are flow charts showing the flow of processing in a case where a creator enciphers a file using an encryption/decryption program in an FD1. Processing in the steps 101 to 109 and 181 is the same as that in the fifth embodiment (FIGS. 20 and 21) and hence, the description thereof is not repeated. The creator chooses whether or not a file key is to be enciphered using a management key corresponding to any one of displayed identification codes of management keys (step 191). If any one of the management keys corresponding to the displayed identification codes is used (NO in step 191), one of the displayed identification codes is selected (step 182). The file key is enciphered using the management key corresponding to the selected identification code, to generate an enciphered key 2 (step 183). Processing in the steps 111 to 113 is performed in the same manner as that shown in FIG. 21.

When a new management key is generated without using the management key stored in the FD1 (YES in step 191), the new management key (which is taken as $M_{n+1}$) is generated by the above-mentioned key generation processing (FIG. 12 or FIG. 13) (step 192). An identification code is generated to have a correspondence with the generated management key $M_{n+1}$. The management key $M_{n+1}$ and the identification code are stored in the FD1 (step 193). An FD2 is then set in an FD drive 5 by the creator (step 194). If there are a plurality of FD2s, one arbitrary FD2 can be set. The management key $M_{n+1}$ and the identification code are stored in the set FD2 (step 195). Processing in the step 183 and the subsequent steps is then performed.

Processing in a case where the creator performs decryption processing using an encryption/decryption program in the FD1 (NO in step 103) is entirely the same as that shown in FIG. 6 and hence, the description thereof is not repeated. Decryption processing performed by a manager using a decryption program in the FD2 is entirely the same as that in the fifth embodiment (FIGS. 23 and 24) and hence, the description thereof is not repeated. Elimination processing of an enciphered key 1 using an enciphered key elimination program in the FD2 is also the same as that in the flow chart shown in FIG. 11 and hence, the description thereof is not repeated.

By storing the generated new management key $M_{n+1}$ in the FD, a new FD2 having the management key $M_{n+1}$ can be generated.

Modified examples of the seventh embodiment include one comprising an internal storage device 11 as in the second embodiment, one comprising an adaptor 7 as in the third embodiment, and one automatically generating a secret key as in the fourth embodiment.

Figure 29:
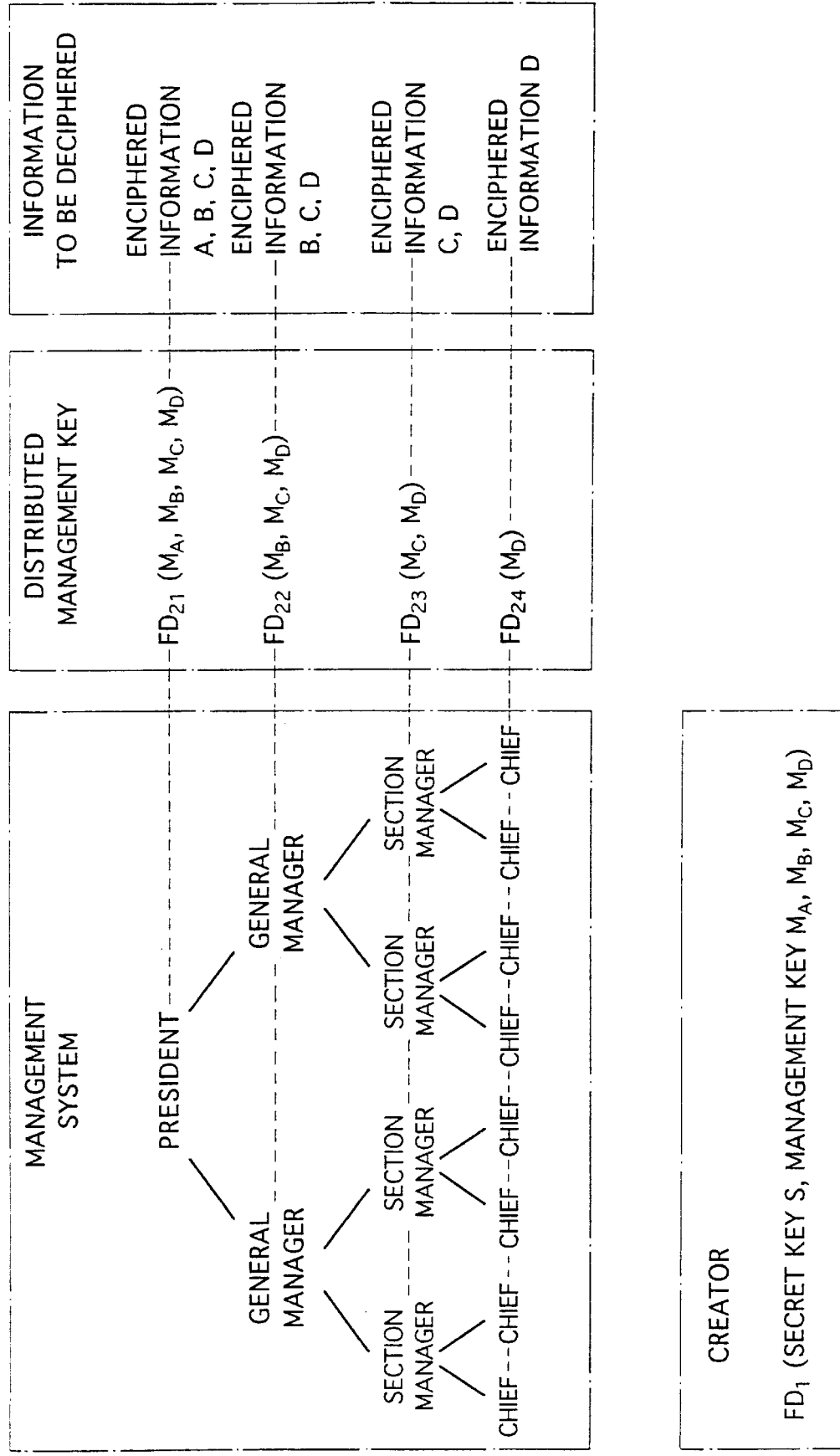
FIG. 29 shows how management keys corresponding to a management system in a company or the like are distributed.

Applied Examples (1) Distribution of management key corresponding to management system in company or the like FIG. 29 illustrates one applied example using an enciphering/deciphering device. In a company or the like, such a hierarchical management system that there are a general manager, a section manager and a chief under a president.

An FD21 storing management keys MA, MB, MC and MD is previously distributed to the president. An FD22 storing the management keys MB, MC and MD is previously distributed to the general manager. An FD23 storing the management keys MC and MD is previously distributed to the section manager. An FD24 storing the management key MD is previously distributed to the chief. The decryption program in the fifth or sixth embodiment is stored in each of the FD21 to FD24. An FD1 storing a secret key S and the management keys MA to MD (and an encryption/decryption program) is given to a creator. The creator may, in some cases, a mere staff member or a manager such as a president. The hardware and the software in the sixth or seventh embodiment can be employed as hardware and software of the enciphering/deciphering device used by the creator and the manager.

An enciphered key 2 included in enciphered information A (an enciphered file) and an enciphered key 2 included in enciphered information B can be respectively deciphered to obtain file keys using the management key MA and the management key MB. An enciphered key 2 included in enciphered information C and an enciphered key 2 included in enciphered information D can be respectively deciphered using the management key MC and the management key MD. Further, the enciphered information A is taken as information having the highest secrecy which only the president can see by decryption, and the enciphered information B is taken as information which persons who are not lower in position than the general manager can see. The enciphered information C is taken as information which persons who are not lower in position than the section manager can see, and the enciphered information D is taken as information which persons who are not lower in position than the chief can see.

The creator selects a management key to perform encryption processing depending on the secrecy of the generated information. For example, in the case of the information which only the president can see, the information is enciphered using the management key MA. The management and the production of enciphered information corresponding to the level of the secrecy (the importance) of information can be carried out by distributing one or a plurality of management keys to the manager and properly using the management keys depending on the level of the secrecy of the information.

(2) Network data base system

Figure 30:
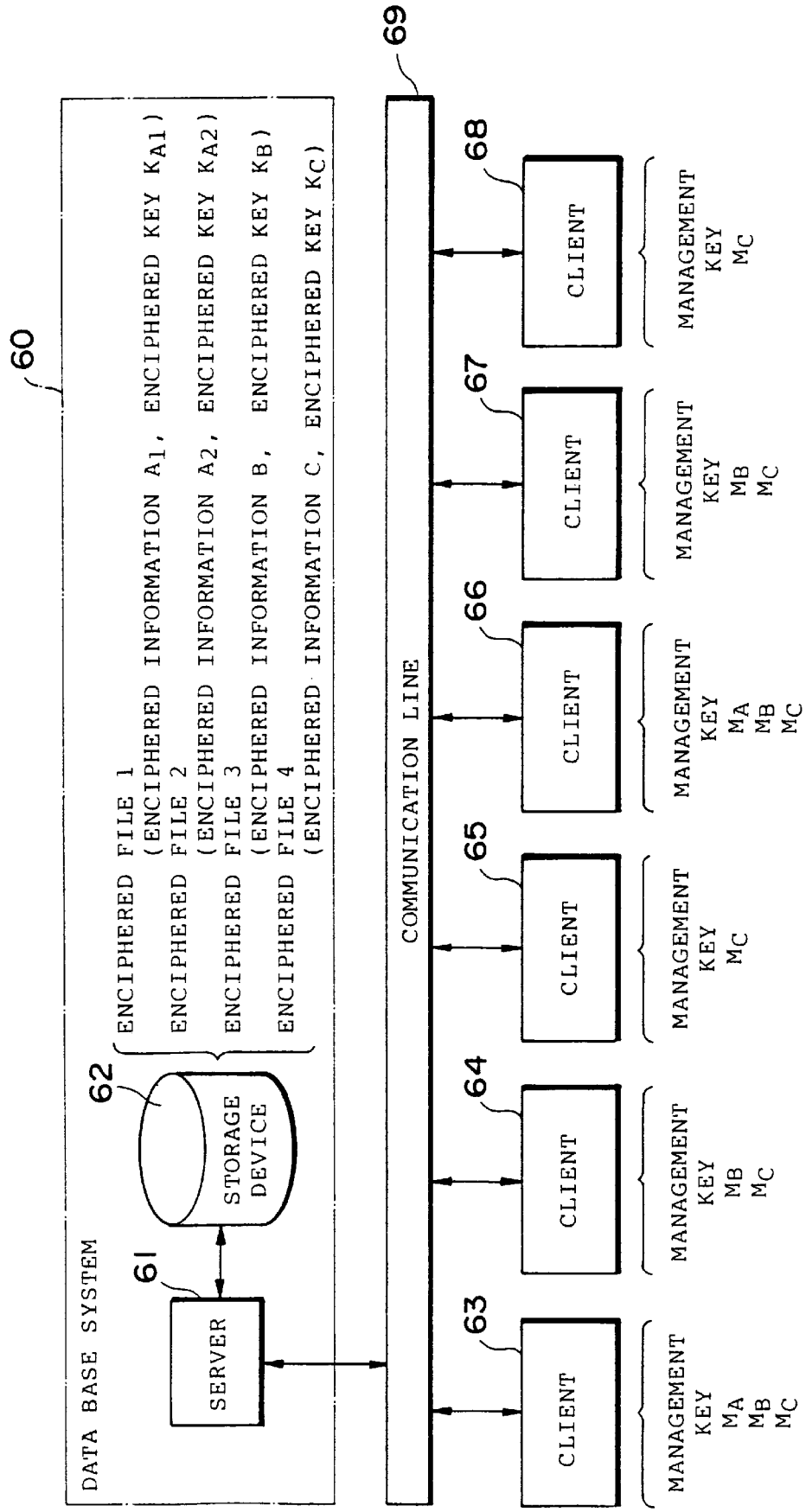
FIG. 30 is a block diagram showing the construction of a network data base system.

FIG. 30 is a block diagram showing the construction of a network data base system. The network data base system comprises a data base system 60, clients 63 to 68 (for example, a computer system comprising a communication device), and a communication line 69 connecting the data base system 60 and the clients 63 to 68. The data base system 60 comprises a server 61 (a communication device, a computer system comprising a communication circuit, etc.) and a storage device 62 (a magnetic disk storage device, an optical disk storage device, etc.). The server 61 includes a device for retrieving information (a file) stored in the storage device 62.

The hardware and the software shown in the fifth or sixth embodiment can be employed as hardware and software of the clients 63 to 68. The hardware is provided with a communication device for communicating with the communication line 69. Enciphered files 1 to 4 are stored in the storage device 62. The enciphered file 1 includes enciphered information A1 and an enciphered key KA1. The enciphered file 2, the enciphered file 3, and the enciphered file 3 respectively include enciphered information A2 and an enciphered key KA2, enciphered information B and an enciphered key KB, and enciphered information C and an enciphered key KC. The enciphered keys KA1 to KC correspond to the above-mentioned enciphered key 2. A key corresponding to the enciphered key 1 is also included in each of the files, if required.

The enciphered key KA1 is a key obtained by enciphering a file key used when the enciphered information A1 is generated (plaintext is enciphered to generate the enciphered information A1) using a management key MA. The enciphered key KA2 is a key obtained by enciphering a file key used when the enciphered information A2 is generated using the management key MA. The enciphered key KB is a key obtained by enciphering a file key used when the enciphered information B is generated using a management key MB. The enciphered key KC is a key obtained by enciphering a file key used when the enciphered information C is generated using a management key MC.

The management key MA is previously distributed to only the clients 63 to 66. The management key MB is previously distributed to only the clients 63, 64, 66 and 67. The management key MC is previously distributed to all the clients 63 to 68.

The server 61 and each of the clients 63 to 68 communicate with each other through the communication line 69. Each of the clients 63 to 68 designates an enciphered file to be referred to (read) and transmits a reference request to the server 61. The server 61 receives the request and retrieves the designated enciphered file in the storage device 62. The retrieved enciphered file is transmitted to the client on the side of the reference request via the communication line 69 from the server 61. The clients 63 and 66 each having the management keys MA to MC can decipher and refer to (read) all the enciphered files 1 to 4. The clients 64 and 67 each having only the management keys MB and MC can decipher and refer to only the enciphered files 3 and 4. The clients 65 and 68 each having only the management key MC can decipher and refer to only the enciphered file 4.

By thus respectively enciphering the file keys for the enciphered information using the different management keys, to make the management keys distributed to the respective clients different from each other, the files (information) which can be referred to by the respective clients can be made different from each other and can be discriminatingly read.

(3) Electronic mail system

Figure 31:
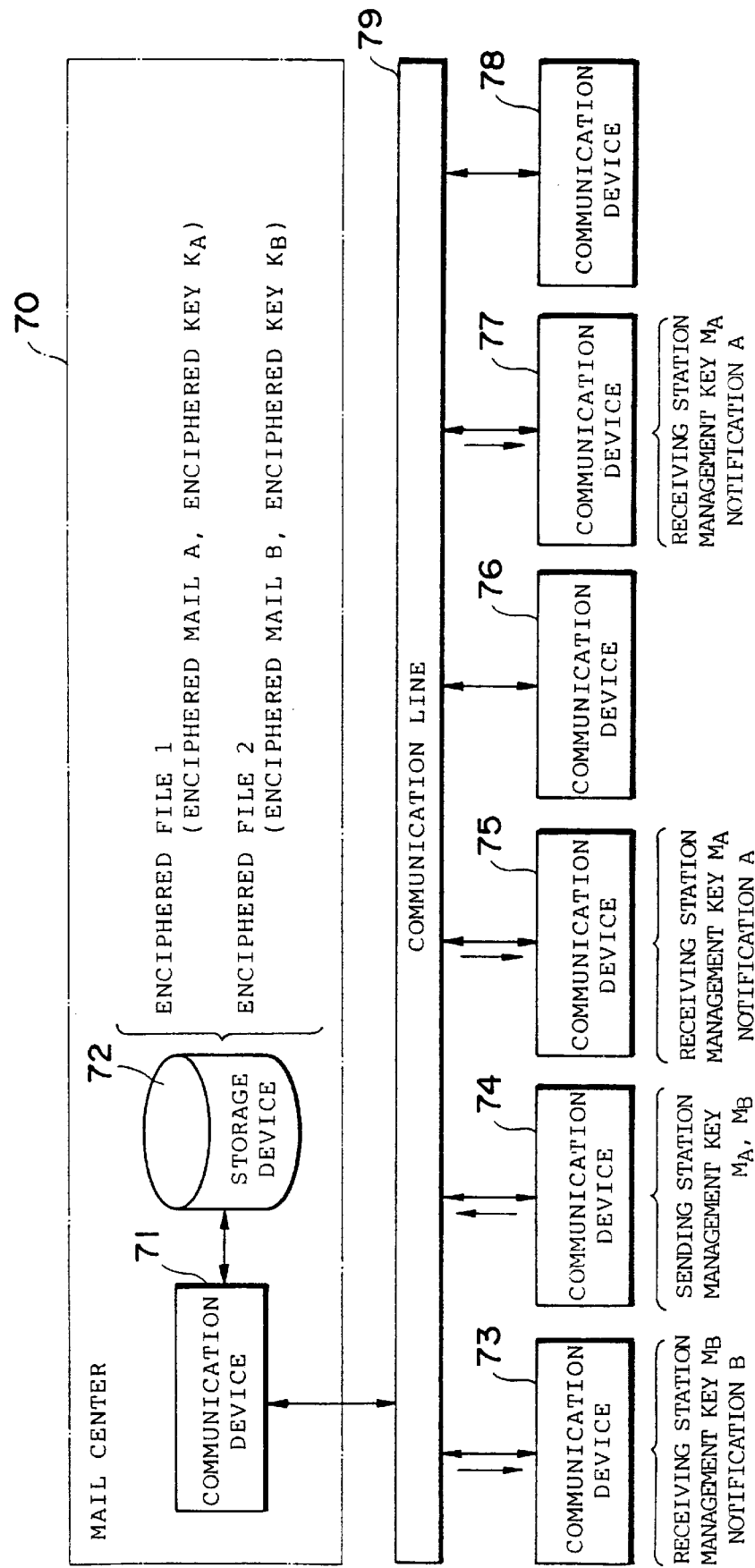
FIG. 31 is a block diagram showing the construction of an electronic mail system.

FIG. 31 is a block diagram showing the construction of an electronic mail system. The electronic mail system comprises a mail center 70, communication devices 73 to 78, and a communication line 79 connecting the mail center 70 and the communication devices 73 to 78. The mail center 70 comprises a communication device 71 (including a computer system comprising a communication circuit) and a storage device 72 (a magnetic disk storage device, an optical disk storage device, etc.). All the communication devices 73 to 78 can be sending stations or receiving stations of mail. The hardware and the software in the fifth to seventh embodiments can be employed as hardware and software of the communication devices 73 to 78. The hardware is provided with a communication device for communicating with the communication line 79.

Consider a case where the communication device 74 (the sending station) transmits mail (which is taken as mail a) to the communication devices 75 and 77 (the receiving stations). The sending station 74 generates a management key MA, and distributes (transmits) the key MA to the receiving stations 75 and 77. In the sending station 74, a key kA is generated, and the mail a is enciphered using the key kA, to create enciphered mail A. The key kA is enciphered using the management key MA, to generate an enciphered key KA. An enciphered file 1 is created by the enciphered mail A and the enciphered key KA. The enciphered file 1 is transmitted to the mail center 70, and is stored in the storage device 72. At the same time, the sending station 74 transmits a notification (which is taken as a notification A) that it has transmitted the mail a (or the enciphered mail A) to the receiving stations 75 and 77. The notification A includes an identification code for identifying the enciphered file 1 from a plurality of files (mail) stored in the mail center 70.

The receiving stations 75 and 77 which have received the notification A read out the enciphered file 1 from the mail center 70 on the basis of the identification code included in the notification A. The receiving stations 75 and 77 decipher the enciphered key KA included in the enciphered file 1 using the management key MA to generate a key kA, and deciphers the enciphered mail A using the key kA, to obtain mail a.

The sending station 74 may not transmit the management key MA to the receiving stations 75 and 77 prior to the notification A, but transmit the management key MA with it contained in the notification A.

Processing is similarly performed with respect to a case where the sending station 74 transmits mail different from the mail a (which is taken as mail b) to the communication device 73 (the receiving station). Specifically, a management key MB generated in the sending station 74 is sent to the receiving station 73. The mail b is enciphered using a generated key kB, to create enciphered mail B. The key kB is enciphered using the management key MB, to generate an enciphered key KB. An enciphered file 2 is created from the enciphered mail B and the enciphered key KB, and the enciphered file 2 is stored in the mail center 70. A notification B is then transmitted to the receiving station 73. The receiving station 73 reads out the enciphered file 2 from the mail center 70. In the receiving station 73, the enciphered key KB included in the enciphered file 2 is deciphered using the management key MB, to obtain a key kB, and the enciphered mail B is further deciphered using the key kB, to obtain mail b.

In the electronic mail system, even when mail is transmitted to a plurality of receiving stations from a sending station, the mail may be only transmitted to one mail center, whereby the communication cost on the side of the sending station can be reduced. Even if a third person who is not a receiving person of mail can read the mail stored in the mail center or the mail on the communication line, he or she cannot know the contents thereof, whereby the secrecy of the mail can be achieved.

Other examples of the electronic mail system include one in which communication devices 73 to 78 respectively comprise storage devices each storing an enciphered file (enciphered mail and an enciphered key). In a sending station, an enciphered file to be transmitted is stored in a storage device provided in the sending station. A receiving station reads out the enciphered file from the storage device in the sending station. In this case, the necessity of providing a mail center is eliminated.

(4) Electronic bulletin board system

Figure 32:
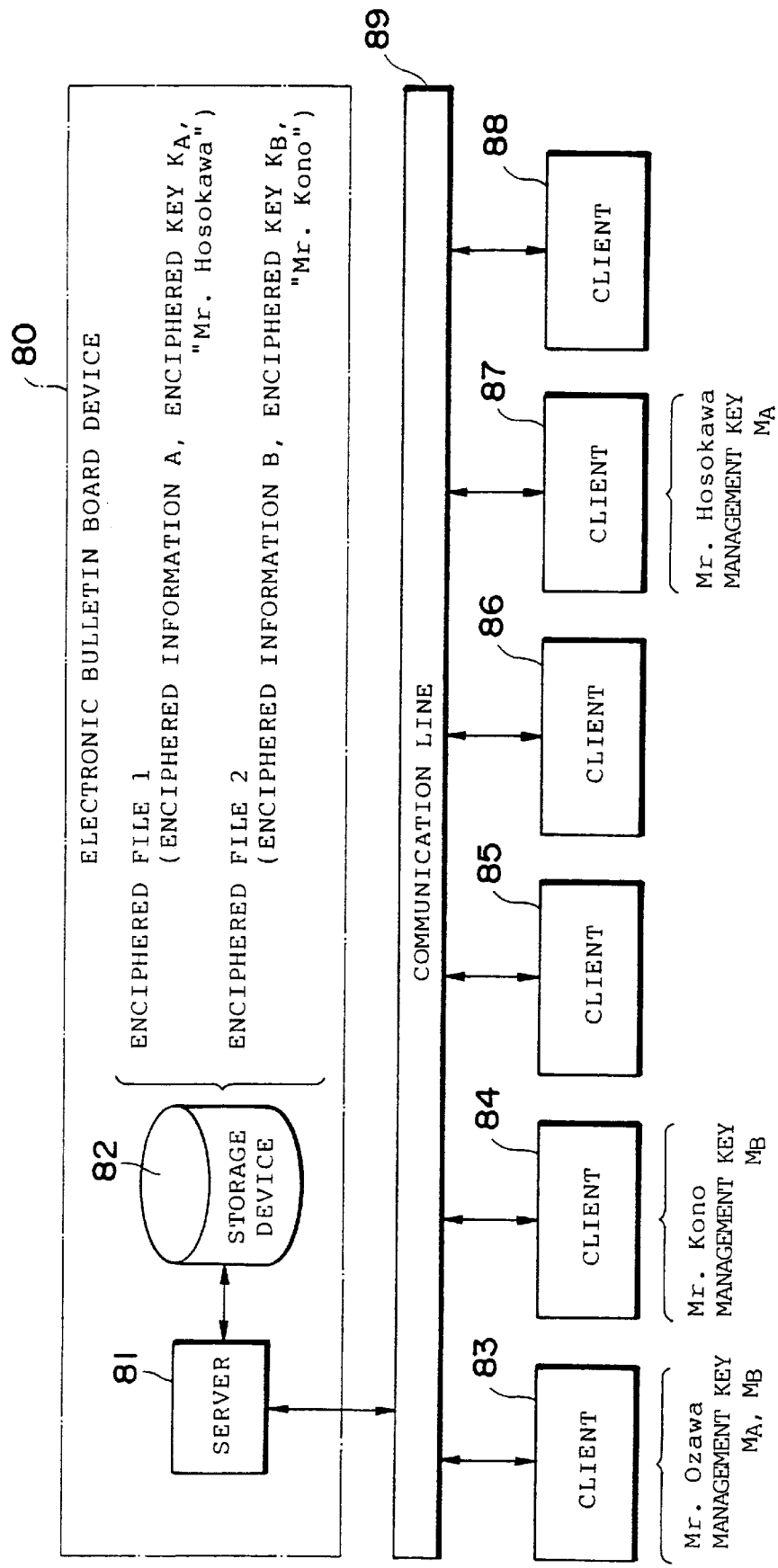
FIG. 32 is a block diagram showing the construction of an electronic bulletin board system.

FIG. 32 is a block diagram showing the construction of an electronic bulletin board system. The electronic bulletin board system comprises an electronic bulletin board device 80, clients 83 to 88 (a communication device, a computer system comprising a communication circuit, etc.), and a communication line 89 connecting the electronic bulletin board device 80 and the clients 83 to 88. The electronic bulletin board device 80 comprises a server 81 (a communication device, a computer system comprising a communication circuit, etc.) and a storage device 82 (a magnetic disk storage device, an optical disk storage device, etc.).

The electronic bulletin board device 80 is one obtained by electronically implementing a bulletin board. The clients 83 to 88 store information to be put up in the storage device 82 via the server 81. All the clients 83 to 88 can refer to the information to be put up which is stored in the storage device 82, similarly to information stuck on the bulletin board.

The server 81 includes an encryption/decryption program (or an enciphering (deciphering) circuit) and a key generation program (or a key generating circuit). When each of the clients 83 to 89 issues a request to generate a management key to the server 81, the server 81 generates a management key. The generated management key is transmitted to the client who has issued the request to generate a management key. The client distributes the generated management key to the other client who is desired to see information put up on the bulletin board, and the client itself also holds the management key. The client to which the management key is distributed also holds the distributed management key.

Consider a case where information (which is taken as information a) which the client 83 (Mr. Ozawa) desires only the client 87 (Mr. Hosokawa) to refer to (read) is put up on an electronic bulletin board by way of example. The client 83 issues a request to generate a management key to the server 81. A management key (which is taken as MA) generated by the server 81 is sent to the client 83. The client 83 transmits (distributes) the management key MA to the client 87, and the client 83 itself also holds the management key MA. The client 83 transmits the information a to be put up on the electronic bulletin board and the management key MA to the server 81. The server 81 generates a key kA by a key generation program (or a key generating circuit). The server 81 enciphers the information a to be put up using the key kA, to generate enciphered information A. The server 81 enciphers the key kA using the management key MA, to generate an enciphered key KA. An enciphered file 1 is created from the enciphered information A, the enciphered key KA and a message "Mr. Hosokawa" reporting that information to be put up is directed to Mr. Hosokawa. The enciphered file 1 is stored in the storage device 82, and is put up. The message "Mr. Hosokawa" is put up as it is without being enciphered.

The information to be put up can be referred to by all the clients 83 to 88. Only the client 87 who has the management key MA (Mr. Hosokawa) and the client 83 who has put up the information (Mr. Ozawa) can decipher and refer to the enciphered information A. The client 87 sees the message "Mr. Hosokawa" to confirm that the information to be put up is directed to itself. The client 87 transmits a request to decipher the enciphered information A and the management key MA to the server 81. The server 81 deciphers the key KA using the management key MA to obtain a key kA, and deciphers the enciphered information A using the key kA to obtain information a. The information a is transmitted to the client 87. Consequently, the client 87 can know the contents of the information a to be put up.

The same processing is also performed in a case where there is information (an enciphered file 2) which the client 83 makes only the client 84 (Mr. Kono) refer to.

By thus applying encryption processing using a management key to an electronic bulletin board system, it is possible to realize an electronic bulletin board system in which information can be referred to (read) only by a particular person.

Each of the clients 83 to 88 can also comprise both or one of a key generation program (or a key generating circuit) and an encryption/decryption program (or an enciphering (deciphering) circuit) to perform both or one of key generation made by the server 81 and encryption processing of information to be put up and a key.

(5) Encryption/decryption of authenticator

Figure 33:
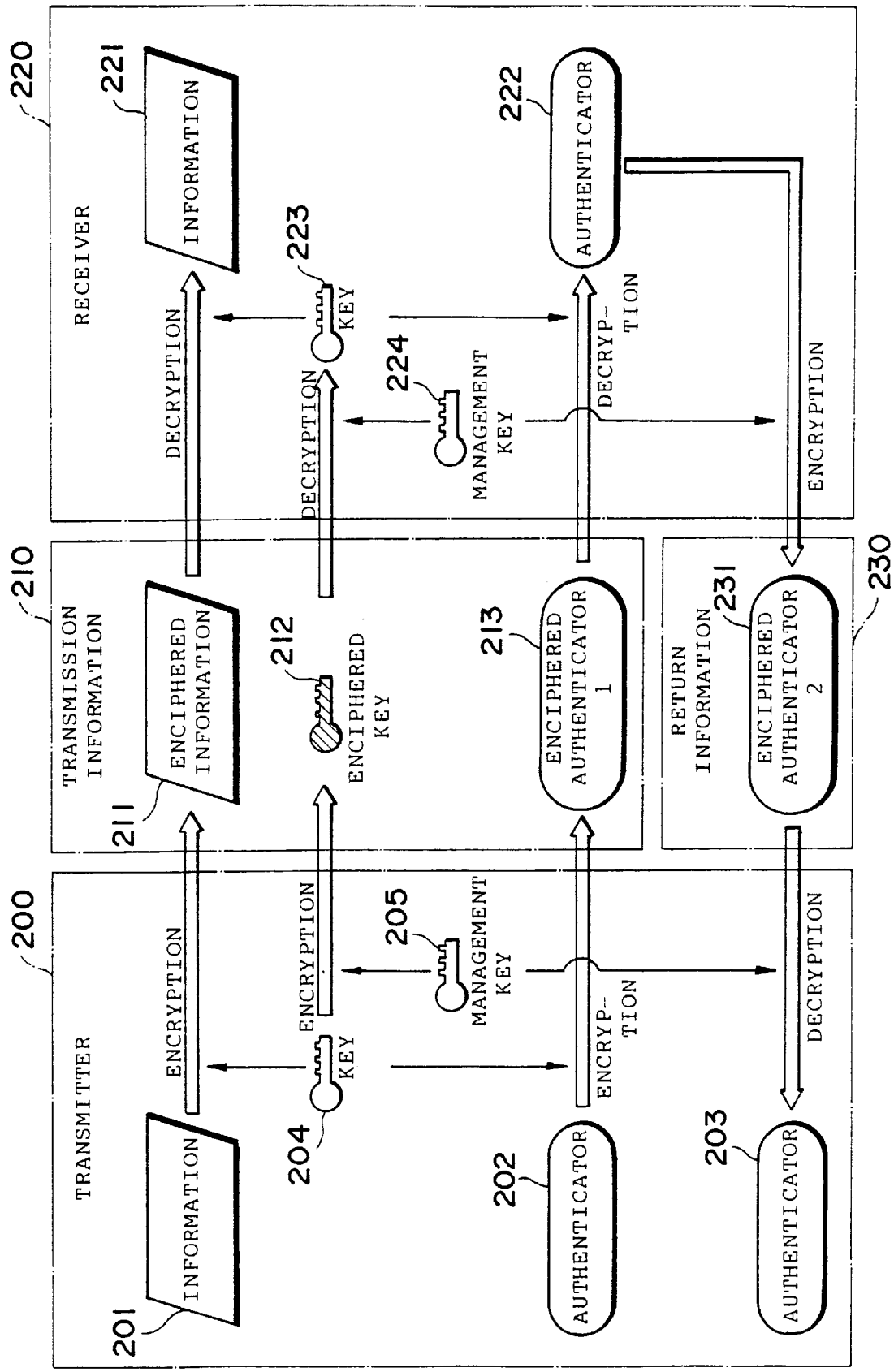
FIG. 33 shows how encryption/decryption processing of transmitted and received information including an authenticator is performed.

FIG. 33 illustrates an example in which encryption/decryption processing is applied to an authenticator used in a case where authentication (judgment whether or not transmitted information is reliably received) is performed in transmission and receiving of information in the electronic mail system and the electronic bulletin board system as mentioned above. The hardware in the electronic mail system and the electronic bulletin board system can be employed as hardware of a communication system. As hardware of a transmitter 200 and a receiver 220, the hardware in the first to seventh embodiments which is provided with a communication device can be used. Further, as software or hardware of the transmitter 200 and the receiver 220, software or hardware for enciphering and deciphering an authenticator as described later is added to the software or hardware in the first to seventh embodiments.

The same management keys 205 and 224 are previously given to the transmitter 200 and the receiver 220, respectively.

In the transmitter 200, a key 204 is generated (or inputted by an operator). Transmission information 201 (the above-mentioned information to be put up or mail, for example) to the receiver 220 is enciphered using the key 204, to generate enciphered information 211. The key 204 is enciphered using a management key 205, to generate an enciphered key 212. An authenticator 202 for confirming whether or not the receiver 220 reliably has received information is also enciphered using the key 204, to generate an enciphered authenticator 213 (an enciphered authenticator 1). The authenticator 202 is composed of signs (for example, a string of characters), sentences, or the like which are arbitrarily determined by a sending person. Transmission information 210 including the enciphered information 211, the enciphered key 212, and the enciphered authenticator 213 is transmitted to the receiver 220.

In the receiver 220, the enciphered key 212 included in the transmission information 210 is deciphered using the management key 224, to obtain a key 223. The key 223 is, of course, the same as the key 204. The enciphered information 211 included in the transmission information 210 is deciphered using the key 223, to obtain information 221 (which is the same as the information 201). The enciphered authenticator 213 included in the transmission information 210 is also deciphered using the key 223, to obtain an authenticator 222 (which is the same as the authenticator 202). Further, in the receiver 220, the authenticator 222 is enciphered using the management key 224, to generate an enciphered authenticator 231 (an enciphered authenticator 2). Return information 230 including the enciphered authenticator 231 is transmitted (returned) to the transmitter 200 from the receiver 220.

In the transmitter 200, the enciphered authenticator 231 included in the return information 230 is deciphered using the management key 205, to obtain an authenticator 203. It is confirmed whether or not the authenticator 203 is the same as the authenticator 202. If the authenticator 202 and 203 are the same, it is confirmed that the transmission information 210 is received by the correct receiver 220 (receiving person). This makes it possible to prevent such unfair authentication that a receiver other than the correct receiver which has received information returns an authenticator, pretending to be a correct receiving person.

In the transmitter 200, the authenticator 202 can be also enciphered using the management key 205 and transmitted to the receiver 220. In the receiver 220, the received authenticator 222 may be enciphered using the key 223 and returned to the transmitter 200. The management key can be also previously transmitted in secret to the receiver 220 from the transmitter 200.

Eighth Embodiment (1) System Configuration, Encryption/decryption processing

Figure 34:
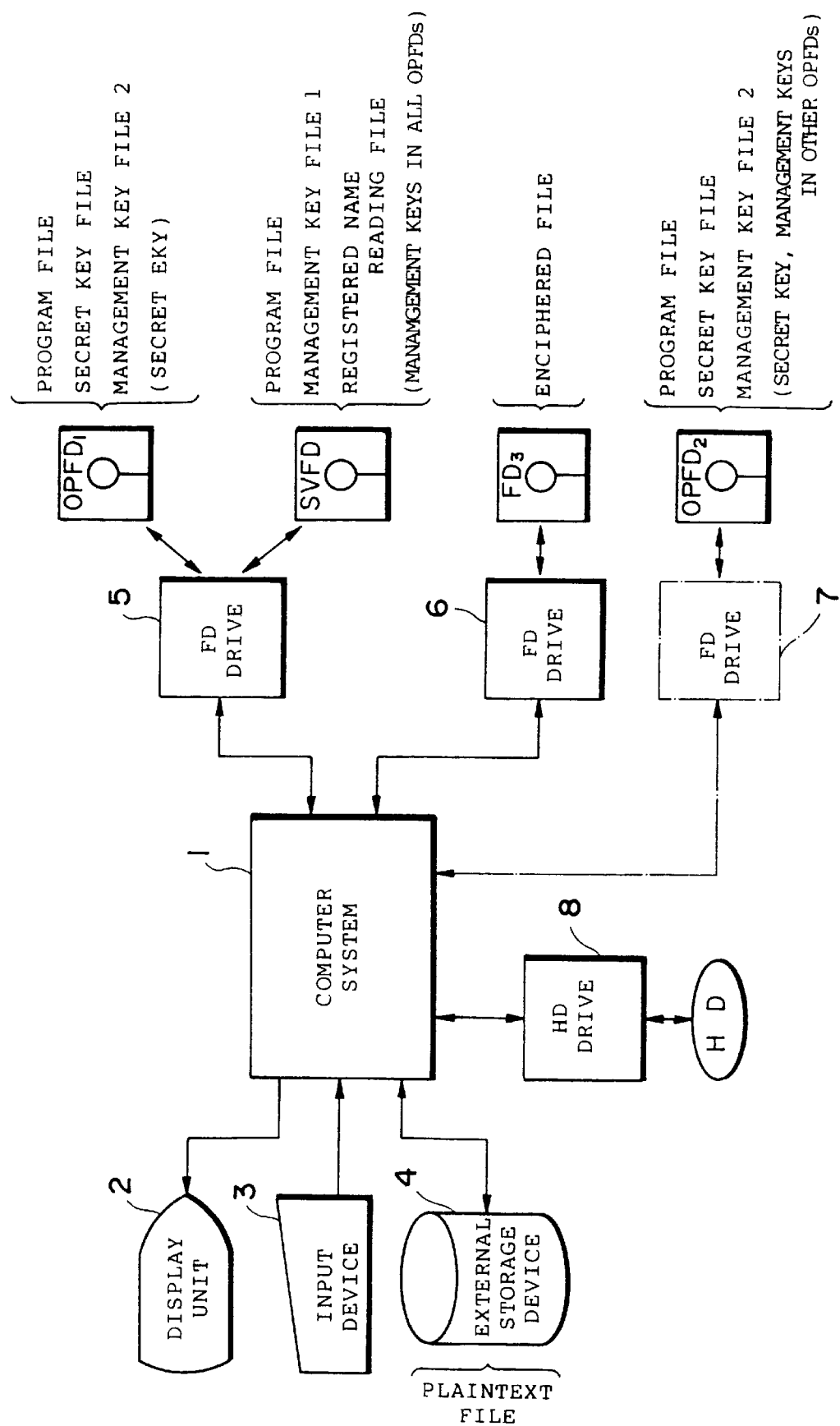
FIG. 34 illustrates the construction of an enciphering/deciphering device.

FIG. 34 is a block diagram showing the construction of an enciphering/deciphering device in an eighth embodiment. In FIG. 34, the same units as those shown in FIG. 1 are assigned the same reference numerals and hence, the description thereof is not repeated.

In the enciphering/deciphering device shown in FIG. 34, one supervisor floppy disk (hereinafter referred to as an SVFD) and a plurality of operation floppy disks (hereinafter referred to as OPFDs) managed by the SVFD are determined. The plurality of OPFDs are managed by the one SVFD, and is distinguished from a plurality of OPFDs managed by the other SVFD.

In the enciphering/deciphering device shown in FIG. 34, an FD drive 7 and a hard disk drive (hereinafter referred to as an HD drive) 8 are added to the construction of the enciphering/deciphering device shown in FIG. 1. An FD drive 5 or an FD drive 6 can, of course, also serve as the FD drive 7.

In the enciphering/deciphering device shown in FIG. 34, the first OPFD1 or the SVFD is set in or removed from the FD drive 5. The second OPFD2 is set in or removed from the FD drive 7.

The HD drive 8 is for reproducing data recorded on a hard disk (hereinafter referred to as an HD) and recording data on the HD.

The first OPFD1 stores a program file, a secret key file, a management key file, a secret key, and the like, as described in detail later. The SVFD stores a program file, a management key file, a registered name reading file, and management keys in all the OPFDs put under its own management. The second OPFD2 stores a program file, a secret key file, a management key file, a secret key, management keys in the other OPFDs put under the management of the SVFD, and the like.

In the enciphering/deciphering device shown in FIG. 34, it is possible to transfer data between the OPFD1 and the OPFD2, transfer data between the OPFD1 or the OPFD2 and the HD, and transfer data between the SVFD and the HD.

Figure 35A:
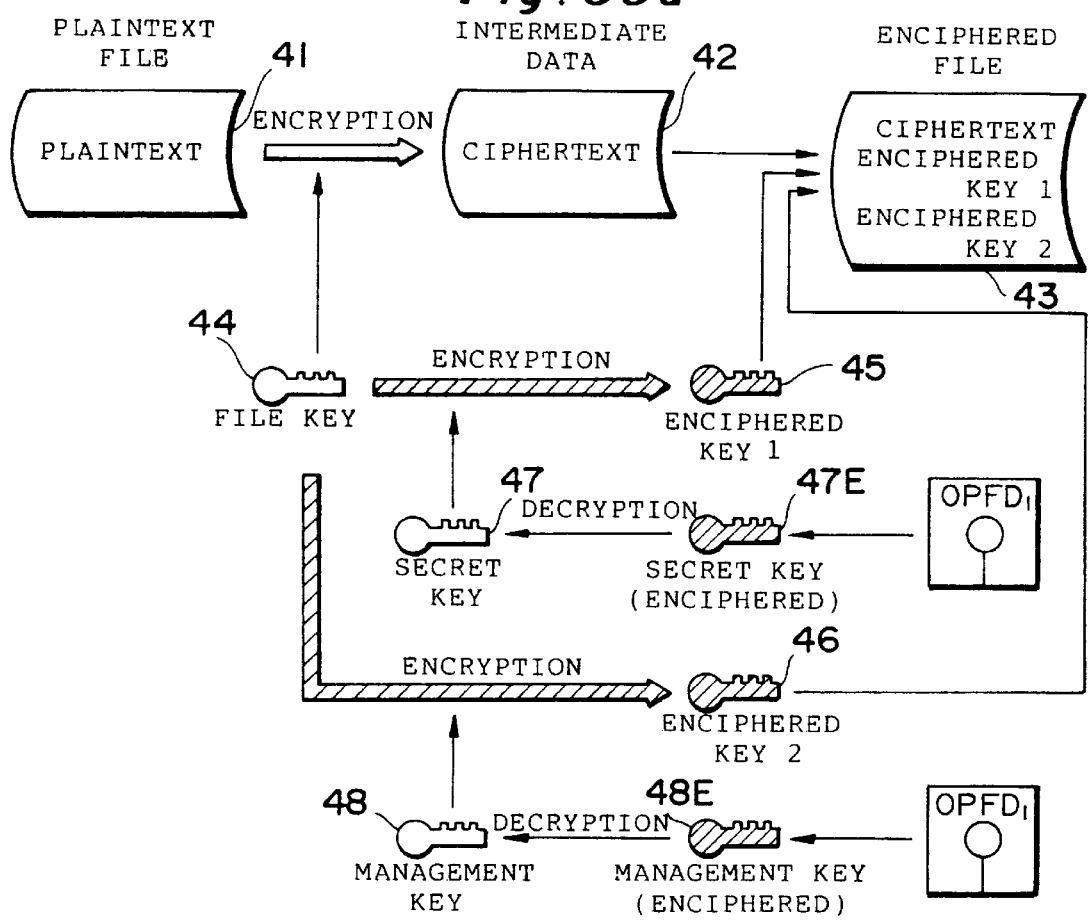
FIG. 35a illustrates encryption processing.
Figure 35B:
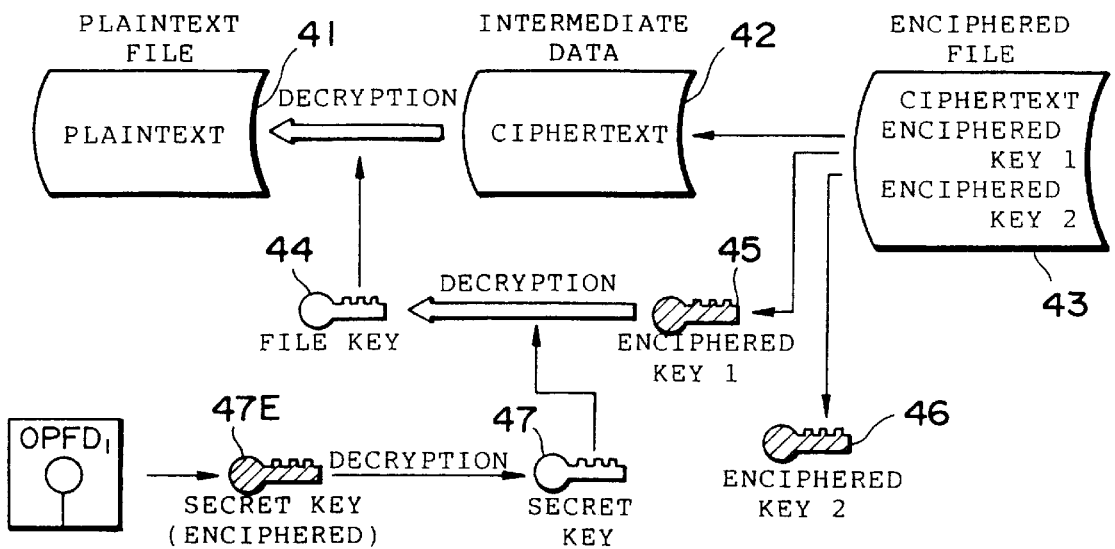
FIG. 35b illustrates decryption processing by a creator of ciphertext.

FIG. 35a shows how encryption processing is performed according to an encryption/decryption program stored in the OPFD1 which a worker has. FIG. 35b shows how decryption processing is performed according to the encryption/decryption program. The processing shown in FIGS. 35a and 35b are substantially the same as the processing shown in FIGS. 3a and 3b.

In the encryption processing shown in FIG. 35a, a secret key 47 and a management key 48 used for the encryption processing are enciphered and are stored in the OPFD1 (although the first OPFD1 is illustrated in FIGS. 35a and 35b, any OPFD may be used, provided that it is managed by the SVFD, similarly to the first OPFD1). The secret key 47 and the management key 48 which are enciphered and are stored are deciphered and are read out from the OPFD1. The OPFD1 has this decryption program. An enciphered key 1 is generated using the deciphered secret key 47, and an enciphered key 2 is generated using the deciphered management key 48. The generated enciphered keys 1 and 2 are stored in an enciphered file 43, which processing is the same as the processing shown in FIG. 3a.

In the decryption processing shown in FIG. 35b, the enciphered secret key 47 is read out from the OPFD1, to obtain a deciphered secret key. The enciphered key 1 is read out from the enciphered file 43, and the enciphered key 1 is deciphered using the deciphered secret key 47. Consequently, a file key 44 is obtained, and plaintext data is obtained from ciphertext data, which processing is the same as the processing shown in FIG. 3b.

The enciphering/deciphering device shown in FIG. 34 can perform decryption processing using the OPFD other than the OPFD1 used for the encryption processing (although the second OPFD2 is illustrated herein, the other OPFD may be used, provided that it is managed by the SVFD) or the SVFD managing the OPFD1.

Figure 36:
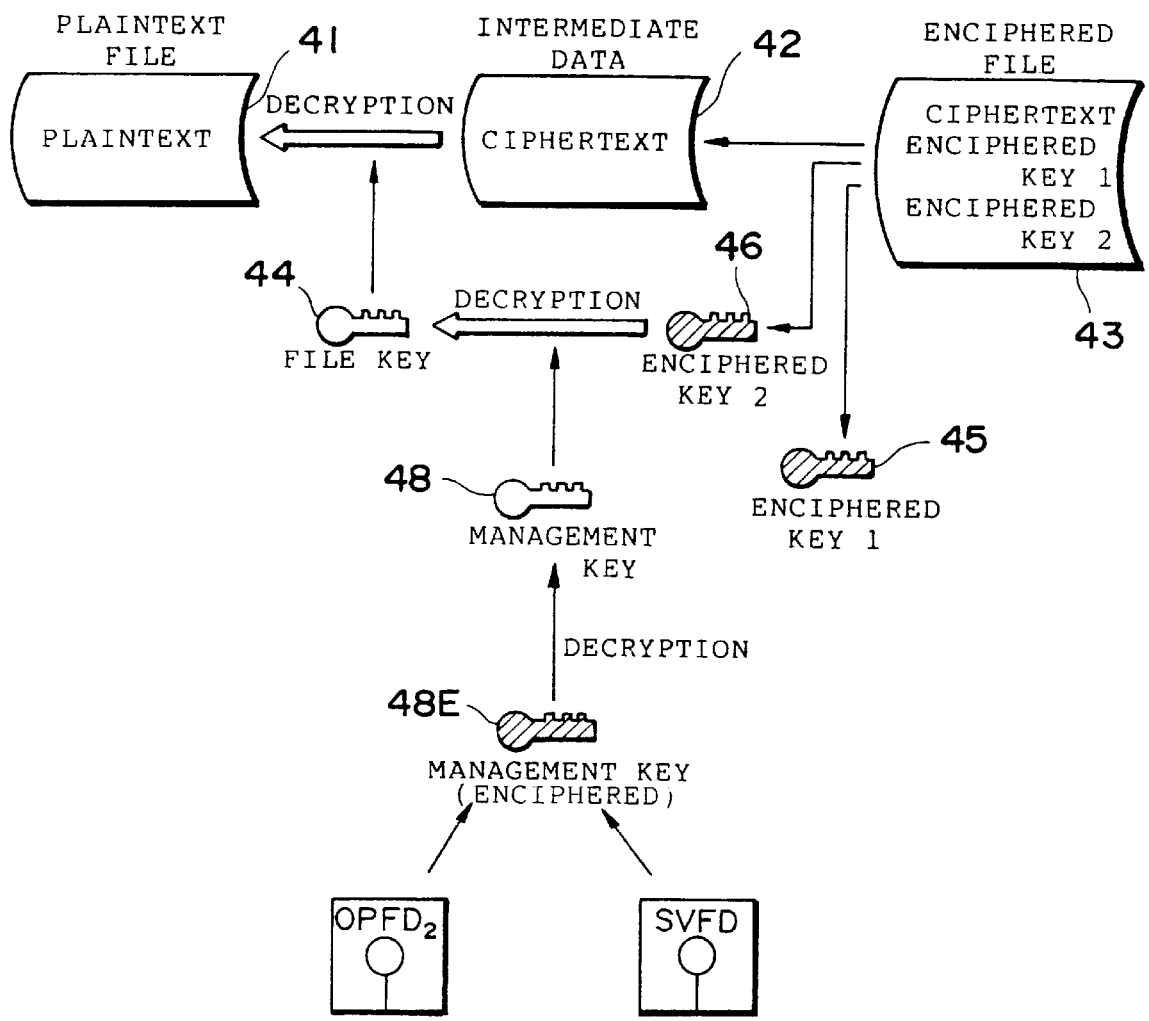
FIG. 36 illustrates decryption processing by a manager or a worker other than the creator of ciphertext.

FIG. 36 shows processing for deciphering using the second OPFD2 or the SVFD plaintext data which is subjected to encryption processing using the first OPFD1, which processing is substantially the same as the processing shown in FIG. 7.

The management key in the first OPFD1 is enciphered and is stored in the second OPFD2 and the SVFD. When the second OPFD2 or the SVFD is set in the FD drive 6 or 7, the enciphered management key 48 is deciphered and is read out. The decryption program is also stored in the OPFD2 and the SVFD. The enciphered key 2 stored in the enciphered file 43 is deciphered using the deciphered management key 48, to obtain a file key 44. The ciphertext data is deciphered using the file key 44, to obtain plaintext data, which processing is the same as the processing shown in FIG. 7.

(2) Contents of File

FIG. 37 illustrates the contents of the enciphered file 43.

The enciphered file 43 stores a version number of an OPFD for ciphertext creation storing a secret key 47 and a management key 48 used for generating enciphered keys 1 and 2 as shown in FIG. 35, creator decryption inhibition information indicating whether or not inhibition of decryption by a ciphertext creator is set as described later, IDs stored in the OPFD for ciphertext creation (the IDs is constituted by an inherent name given to the SVFD and identification data inherent to the SVFD, as described later), IDm stored in the OPFD for ciphertext creation (the IDm is constituted by an inherent name given to the OPFD and identification data inherent to the OPFD, as described later), a file number IDf inherent to the enciphered file 43, the file name of plaintext data, the enciphered key 1, the enciphered key 2, the size of ciphertext, and ciphertext data.

FIGS. 38 and 39 illustrate the contents of registration files in the SVFD. The registration files in the SVFD include a management key file 1 as shown in FIG. 38 and a registered name reading file as shown in FIG. 39.

Referring to FIG. 38, the management key file 1 stores an enciphered password obtained by enciphering a password for confirming a user of the SVFD, a version number indicating the version of the SVFD (the version number is registered before shipment of the SVFD), and IDs for the SVFD. The management key file 1 further stores IDms for OPFDs put under its own management, enciphered management keys obtained by enciphering management keys stored in the OPFDs, and customization flags (a name constituting the IDm is given to the OPFD as described later, a case where the name is given is referred to as "customized", and a case where the name is not given is referred to as "not-customized"), the number of which corresponds to the number of OPFDs managed by the SVFD.

Referring to FIG. 39, the registered name reading file stores IDs for the SVFD, the names of all OPFDs managed by the SVFD, and the names of OPFDs storing management keys which can be deciphered by the OPFDs managed by the SVFD.

FIGS. 40 and 41 illustrate the contents of registration files in an OPFD. The registration files in the OPFD include a secret key file as shown in FIG. 40 and a management key file 2 as shown in FIG. 41.

Referring to FIG. 40, the secret key file stores a version number indicating the version of the OPFD, an enciphered password obtained by enciphering a password for confirming a user of the OPFD, IDs for the SVFD managing the OPFD, IDm for its own, and an enciphered management key obtained by enciphering its own management key.

The secret key file further stores enciphered secret keys each obtained by enciphering a secret key for enciphering a file key and file numbers each inherent to the enciphered file 43, the number of which corresponds to the number of generated ciphertext data.

The OPFD has a program for deciphering the enciphered secret key, but does not have a program for deciphering its own enciphered management key. In the OPFD, therefore, the secret key can be deciphered, so that the ciphertext data can be deciphered.

Referring to FIG. 41, the management key file 2 stores enciphered management keys obtained by enciphering management keys in the other OPFDs and IDms for the other OPFDs. The management key file 2 in the OPFD stores the enciphered management keys and the IDms, whereby the enciphered key 2 generated using the management key stored in the other OPFD can be deciphered, so that decryption processing is made possible.

(3) Contents of Program in SVFD

FIG. 42 illustrates the contents of the program file stored in the SVFD. FIGS. 43 to 58 are flow charts corresponding to programs stored in the program file.

Figure 43A:
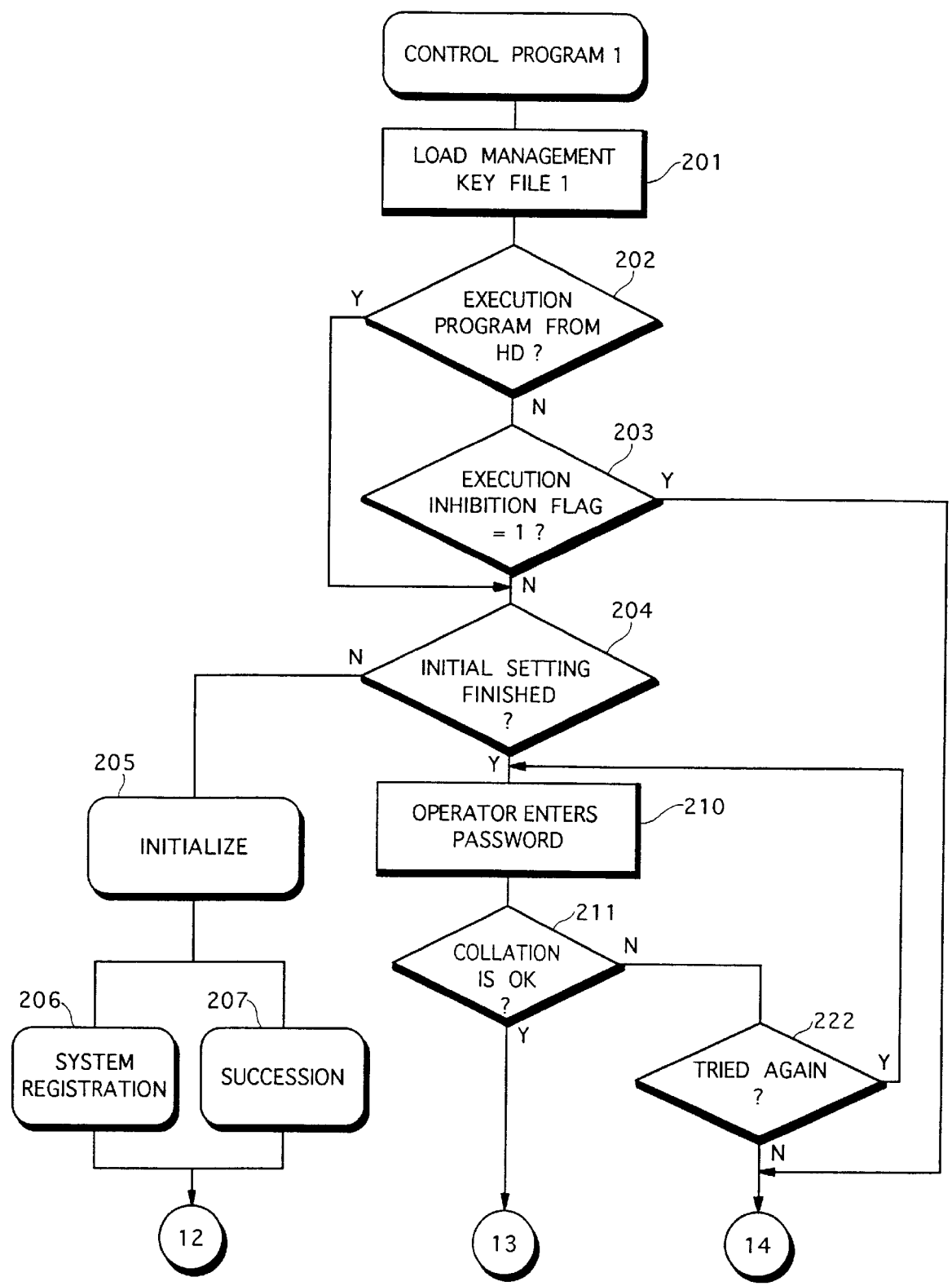
FIGS. 43a and 43b are flow charts showing the procedure for processing according to a control program stored in the SVFD.
Figure 43B:
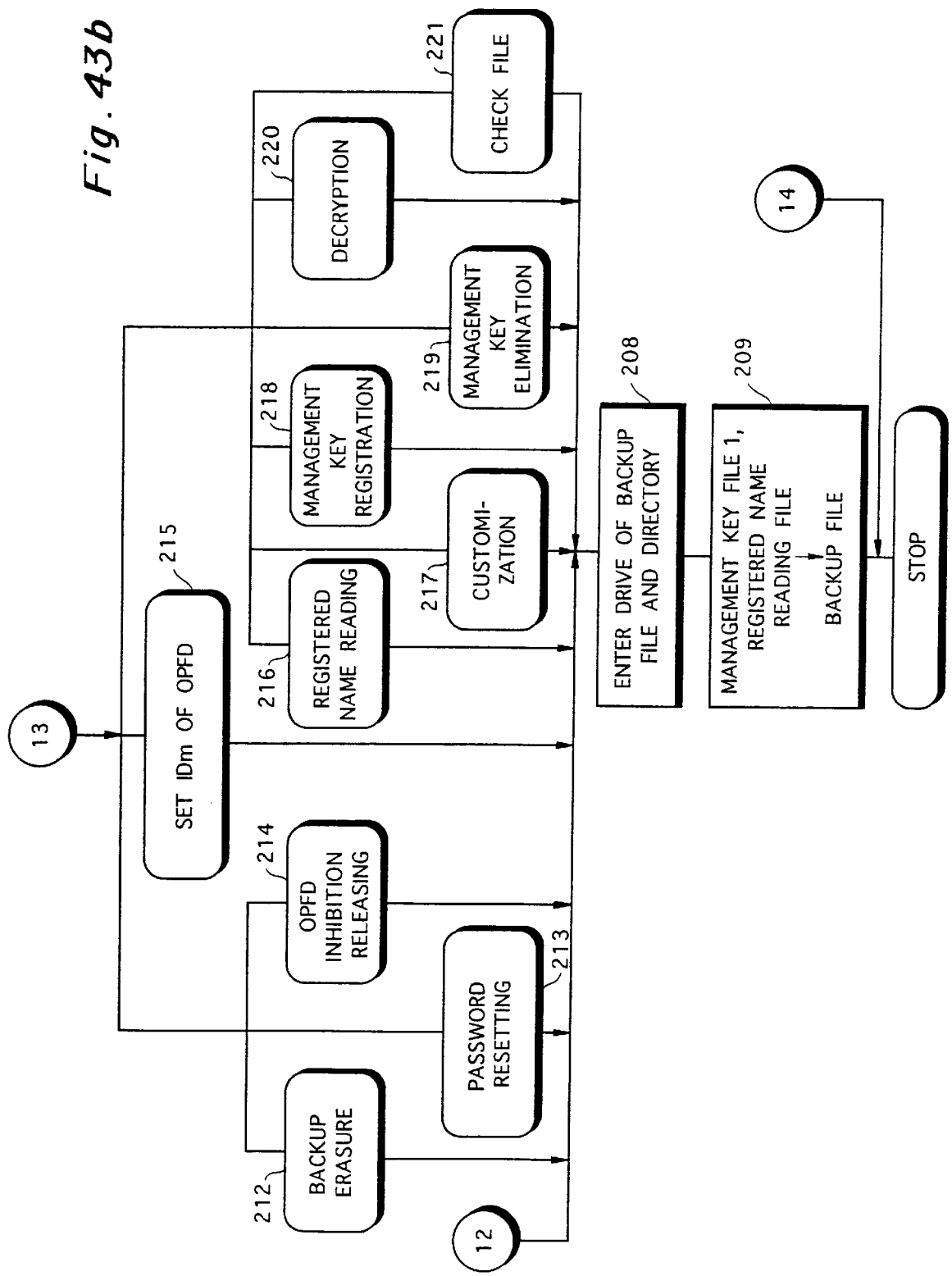

FIGS. 43a and 43b are flow charts of a control program 1, mainly showing the procedure for processing for displaying a menu panel on the display unit 2.

The SVFD is set in the FD drive 5 by a manager having the SVFD. Data representing the contents of the program file stored in the SVFD are read out by the FD drive 5, and the contents of the program file are displayed on the display unit 2 in a form as shown in FIG. 42.

When a command to operate the control program 1 in the contents of the program file displayed on the display unit 2 is given from the input device 3, the operation of the control program 1 is started.

In FIG. 43a, when the operation of the control program 1 is started, the contents of data in the management key file 1 stored in the SVFD are read out by the FD drive 5, and are stored in the internal memory in the computer system 1 (step 201).

In the enciphering/deciphering shown in FIG. 34, the contents of the data stored in the SVFD are loaded into the HD, and the data are read out from the HD, so that encryption processing or decryption processing can be performed. Therefore, it is judged which of the data in the SVFD and the data in the HD into which the data in the SVFD is loaded is to be read out (step 202). The judgment of the data reading is made depending on which of a command to read out the data from the SVFD and a command to read out the data from the HD is given from the input device 3.

When the command to read out the data stored in the SVFD is given, it is judged whether or not an execution inhibition flag is set to one (step 203). The reason for this is that in a case where the contents of the data stored in the SVFD are installed in the HD as described later, the data in the SVFD are inhibited from being read out, whereby the execution inhibition flag is set to one. When the execution inhibition flag is set to one, therefore, the control program 1 is terminated (YES in step 203).

The enciphered password and the IDs for the SVFD in the management key file 1 in the SVFD are stored in the SVFD by initial setting.

If the execution inhibition flag is not set to one (NO in step 203), it is judged whether or not the initial setting of the SVFD has been already finished (step 204).

If the initial setting of the SVFD has not been finished (NO in step 204), locations storing the enciphered password and the IDs are formed in the management key file 1 in the SVFD, to perform the initial setting (step 205). The version numbers of the SVFD and the OPFD have been already registered at the time of shipment.

When the initial setting is finished, indications of system registration processing and succession processing are displayed on the display unit 2, whereby system registration processing or succession processing are performed in accordance with a command from the input device 3 (steps 206 and 207). The system registration processing and the succession processing will be described later.

When the initial setting of the SVFD has been finished (YES in step 204), a password is entered from the input device 3 by a manager of the SVFD (step 210). It is judged whether or not the password coincides with a password represented by the enciphered password which has been already stored in the management key file 1 (step 211).

When the passwords coincide with each other (YES in step 211), it is judged that a user of the SVFD is a fair user, whereby indications of backup erasing processing (step 212), password resetting processing (step 213), OPFD inhibition releasing processing (step 214), IDm-for-OPFD setting processing (step 215), processing for reading a name registered in an OPFD (step 216), processing for customizing an OPFD under its own management (step 217), management IDm registering processing (step 218), management key eliminating processing (step 219), ciphertext data deciphering processing (step 220), and file checking processing (step 221) are displayed on the display unit 2. An operation command is given from the input device 3 by seeing the indications so that desired processing is performed. Processing based on the given operation command is performed. These processings will be described later.

In order to create a backup file of the SVFD, the user of the SVFD then designates a drive used for determining a destination at which the backup file is to be stored (the FD or the HD) and enters the name of a directory (step 208), whereby the data stored in the management key file 1 and the registered name reading file and generated in the steps 212 to 221 are transferred to the backup file (step 209).

Figure 44:
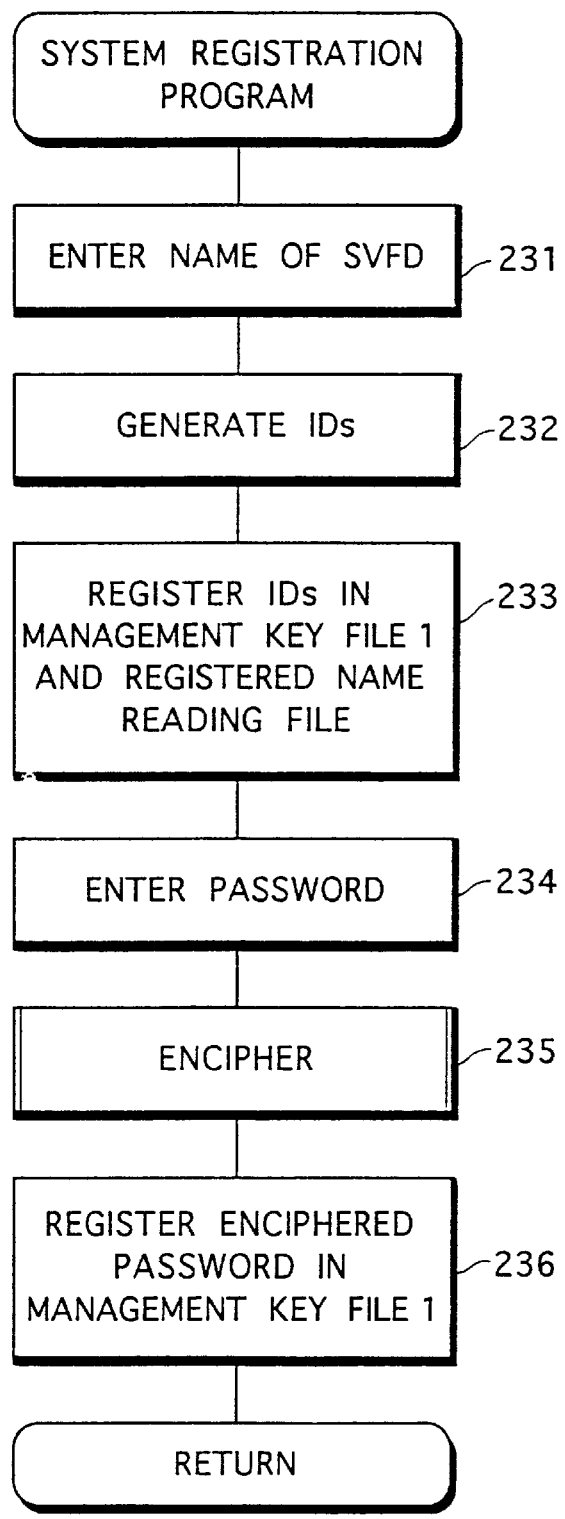
FIG. 44 is a flow chart showing the procedure for processing according to a system registration program stored in the SVFD.

FIG. 44 shows the procedure for processing according to a system registration program.

A name inherent to the SVFD and constituting IDs is entered by the manager (step 231). The IDs is generated from the entered name and identification data inherent to the SVFD (random-number data, data indicating the time when the name is entered, and the like are used as the inherent identification data) (step 232). The generated IDs is registered in the management key file 1 and the registered name reading file (step 233).

A password to be registered in the SVFD is entered from the input device 3 by the manager (step 234). The entered password is enciphered (step 235), and is registered in the management key file 1 (step 236). Since the password is registered upon being enciphered, the contents thereof can be prevented from being known even if another person reads out the enciphered password.

Figure 45:
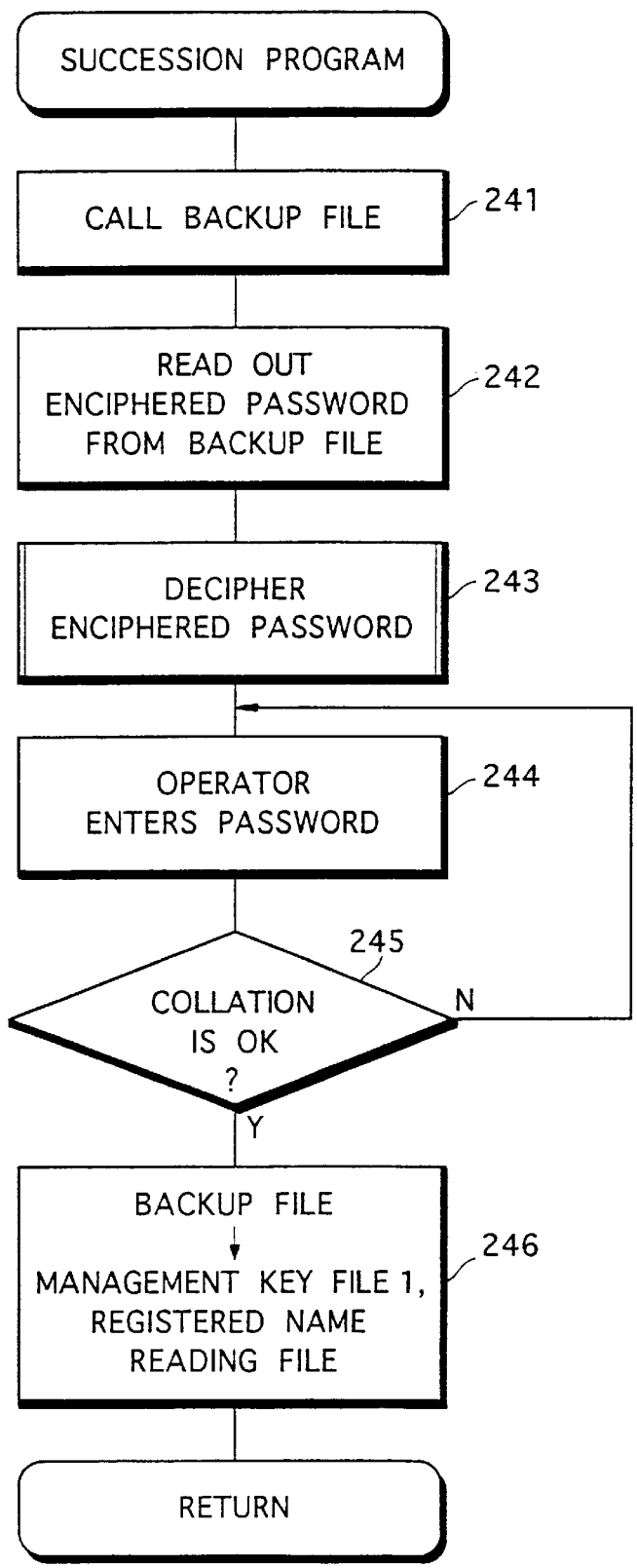
FIG. 45 is a flow chart showing the procedure for processing according to a succession program stored in the SVFD.

FIG. 45 shows the procedure for processing according to a succession program. The succession program is for transferring, in a case where the SVFD cannot be employed, for example, a case where the SVFD is damaged or a case where the SVFD is lost, the data of the SVFD which have been stored in the backup file to a new SVFD, to continue the processing using the SVFD.

Referring to FIG. 45, a command to call the backup file stored in the HD or the FD using the input device 3 is given (step 241). The enciphered password is read out from the called backup file (step 242), and is deciphered (step 243).

When a password is entered from the input device 3 by the manager (step 244), it is judged whether or not the password coincides with the password read out from the backup file and deciphered (step 245). When the passwords coincide with each other, it is judged that the user is a fair user, whereby the data in the management key file 1 and the registered name reading file which have been stored in the backup file are stored in a new SVFD (step 246). Consequently, it is possible to perform processing such as decryption of ciphertext data using the new SVFD.

Figure 46:
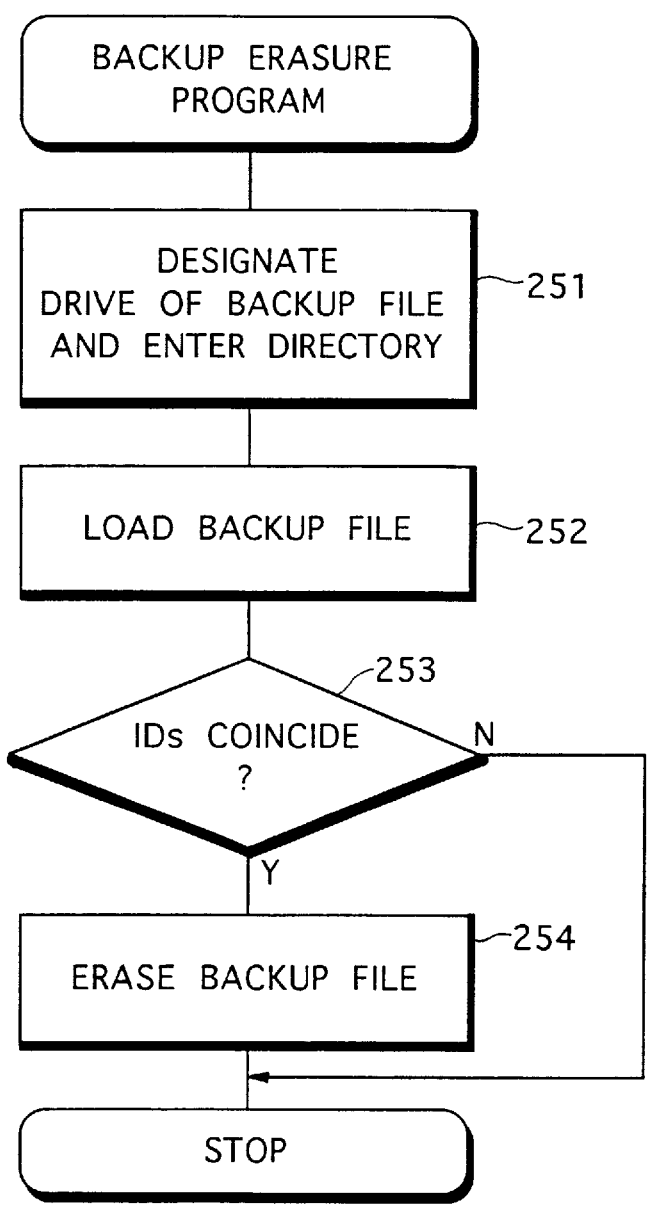
FIG. 46 is a flow chart showing the procedure for processing according to a backup erasure program stored in the SVFD.

FIG. 46 shows the procedure for processing according to a backup erasure program. The processing procedure indicates processing for erasing a backup file created for backing up the SVFD.

In FIG. 46, a drive (the HD drive 8 or the FD drive) for reading out a destination at which the backup file is stored (the HD or the FD) and the name of a directory are entered (step 251). Consequently, the backup file is read out (step 252). The IDs stored in the SVFD and IDs stored in the backup file read out are compared with each other (step 253). When the IDs's coincide with each other (YES in step 253), it is judged that the data stored in the SVFD and data stored in the backup file are the same, whereby the backup file is erased in accordance with a backup file erasure command entered from the input device 3 (step 254).

Figure 47:
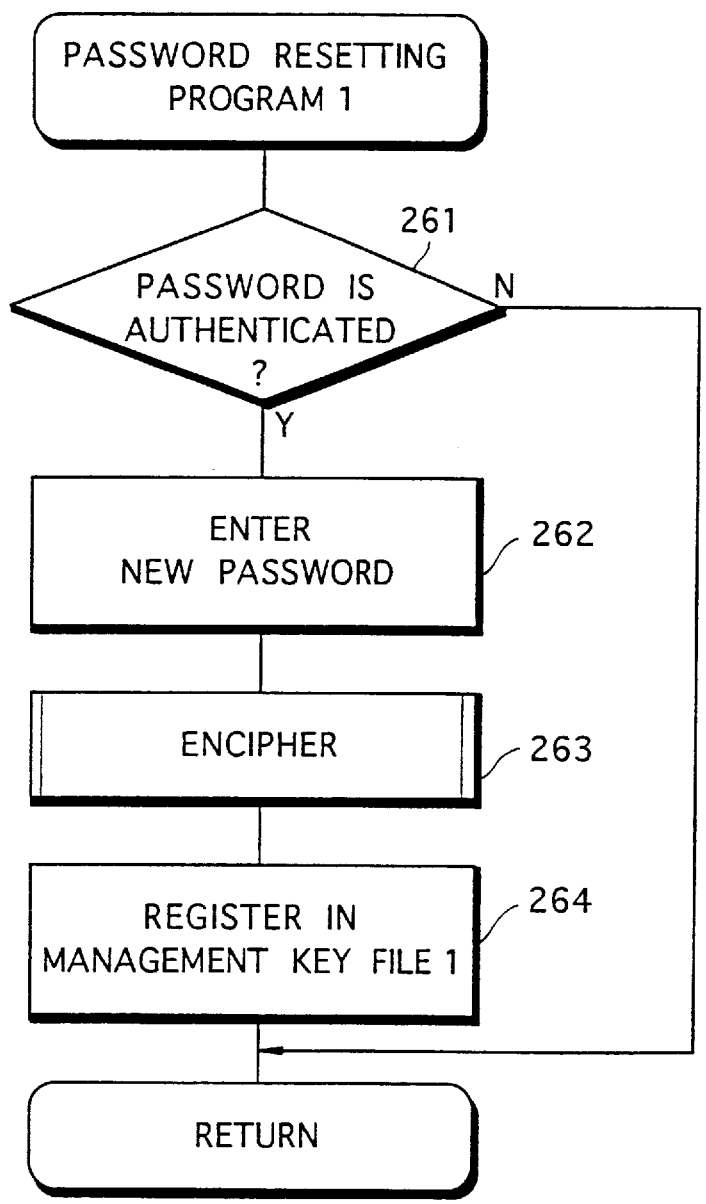
FIG. 47 is a flow chart showing the procedure for processing according to a password resetting program stored in the SVFD.

FIG. 47 shows the procedure for processing according to a resetting program for changing the password registered in the SVFD into another new password.

A password of the SVFD to be changed is entered from the input device 3 (step 261). If the entered password is a fair password of the SVFD to be changed, it is judged that a person who attempts to change the password is a fair user, whereby entry of a new password from the input device 3 is accepted (step 262). The entered new password is enciphered (step 263), and is registered in the management key file 1 (step 264). Thereafter, the password of the SVFD becomes the password newly entered.

If the password entered from the input device 3 in the step 261 is not a fair password of the SVFD to be changed, the password cannot be changed (NO in step 261).

Figure 48:
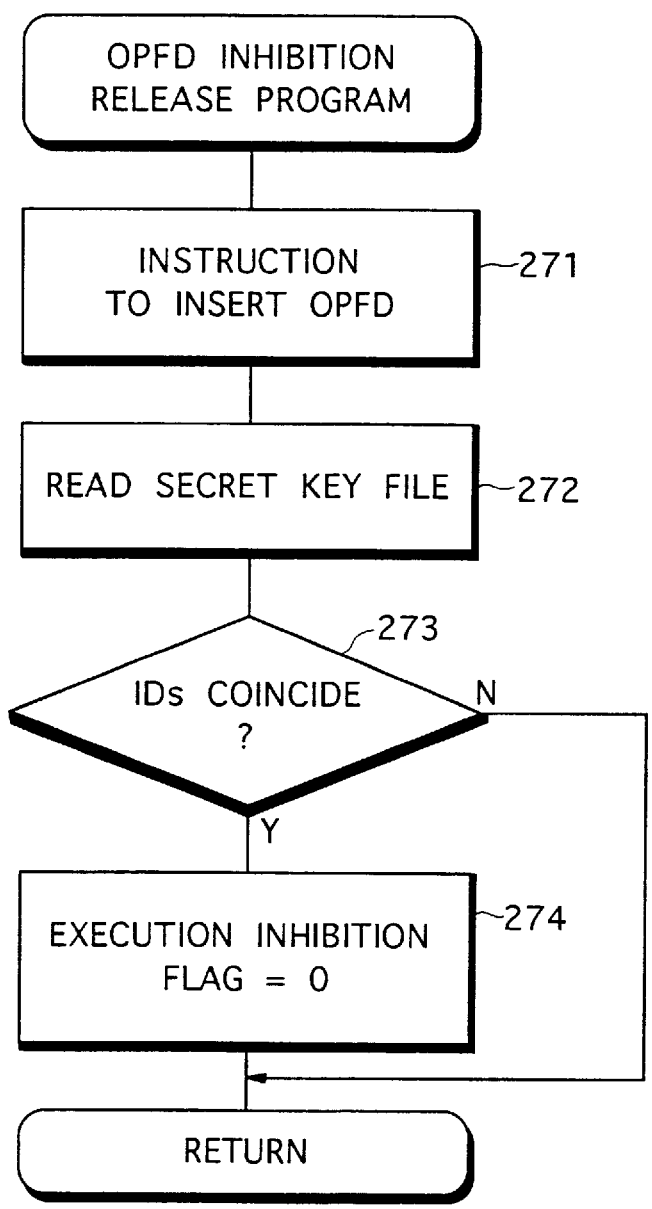
FIG. 48 is a flow chart showing the procedure for processing according to an OPFD release program stored in the SVFD.

FIG. 48 shows the procedure for processing according to an OPFD release program. The OPFD release program is for releasing, in a case where data stored in an OPFD is installed in the HD to inhibit execution using the OPFD, the inhibition.

In a case where the inhibition of the execution using the OPFD is released, an instruction to insert the OPFD whose inhibition is to be released into the FD drive is displayed on the display unit 2 (step 271). When the OPFD is mounted on the FD drive, a secret key file stored in the OPFD is read out (step 272). When the secret key file is read out, it is judged whether or not IDs stored in the secret key file and the IDs read out from the SVFD and stored in the internal memory in the computer system 1 coincide with each other (step 273). If the IDs's coincide with each other, the inhibition of the execution using the OPFD put under the management of the SVFD is released (step 274). Consequently, the inhibition of the execution using the OPFD by installing the data in the OPFD in the HD is released. Even when the HD is damaged so that the data cannot be read out from the HD, the data stored in the OPFD can be read out.

Figure 49:
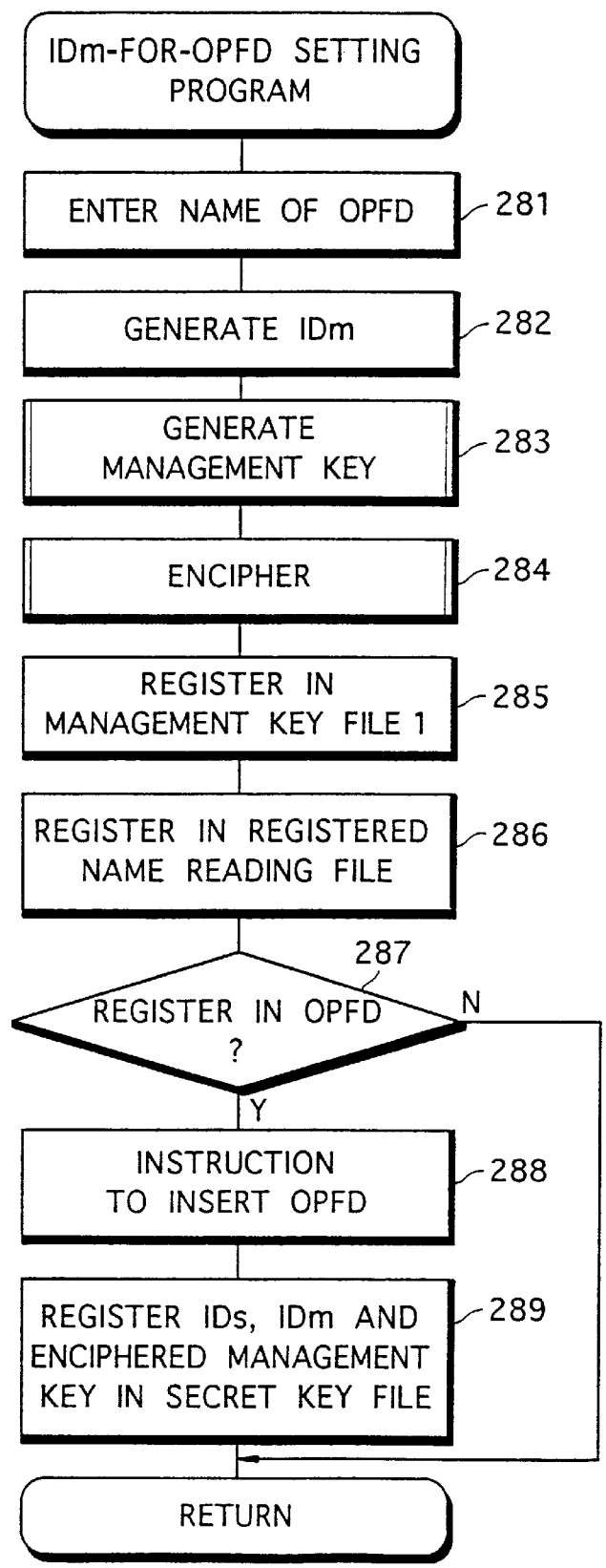
FIG. 49 is a flow chart showing the procedure for processing according to an IDm-for-OPFD setting program stored in the SVFD.

FIG. 49 shows the procedure for processing according to a program registering an IDm-for-OPFD.

Names inherent to OPFDs are respectively set in the OPFDs, and are handed over to workers of the respective OPFDs. The processing procedure for setting names inherent to OPFDs is shown in FIG. 49.

A name inherent to an OPFD is entered using the input device 3 (step 281). IDm for the OPFD is generated from the entered inherent name and identification data inherent to the OPFD (step 282). Further, a management key inherent to the OPFD is generated (step 283), and is enciphered (step 284).

The generated IDm and a management key corresponding to the IDm and enciphered are registered in the management key file in the SVFD (step 285). The inherent name entered from the input device 3 is also stored in the registered name reading file in the SVFD (step 286).

It is then judged whether or not the generated IDm and the enciphered management key are to be registered in the OPFD (step 287). When a command to manage the IDm and the enciphered management key is given from the input device 3 (YES in step 287), an instruction to insert the OPFD is displayed on the display unit 2 (step 288). When the OPFD is mounted on the FD drive, the IDs for the SVFD, the IDm for its own, and the enciphered management key are stored in a secret key file in the OPFD (step 289).

Figure 50:
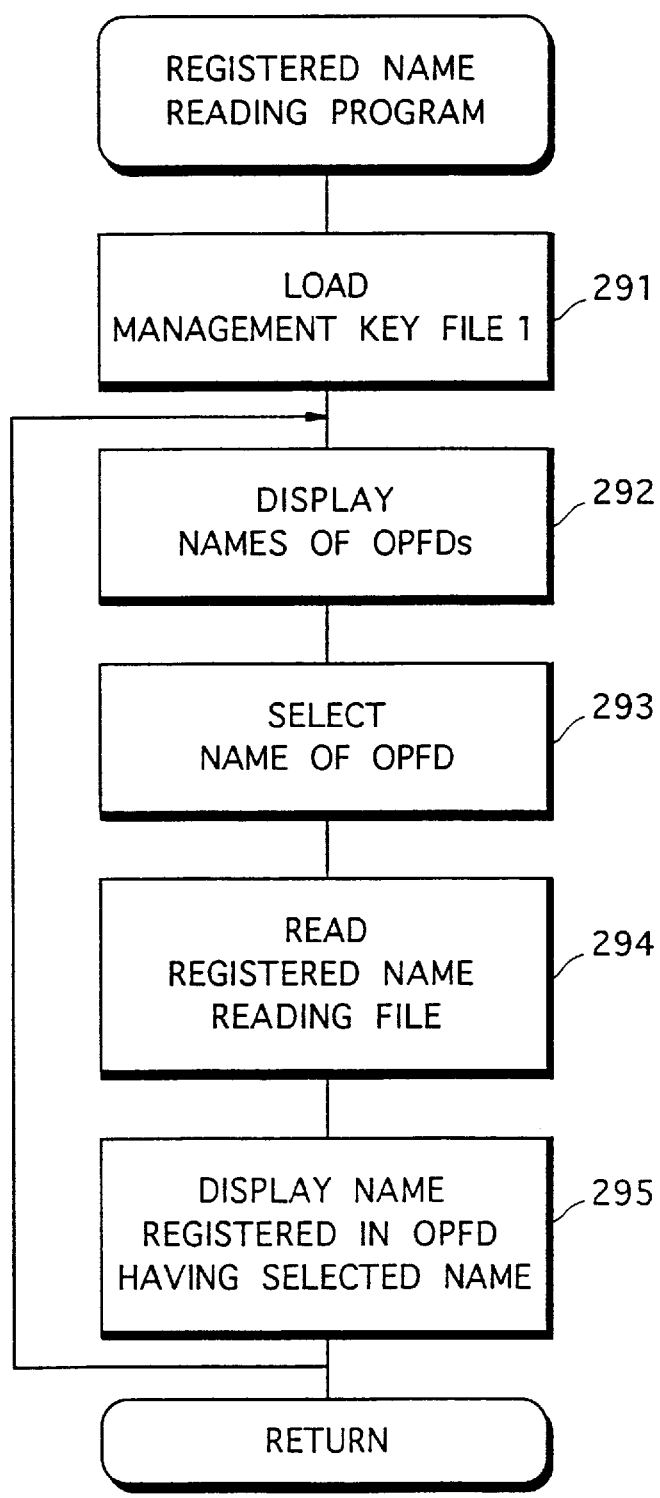
FIG. 50 is a flow chart showing the procedure for processing according to a registered name reading program stored in the SVFD.

FIG. 50 shows the procedure for processing according to a registered name reading program. The registered name reading program is for reading names of OPFDs managed by the SVFD.

When a registered name reading command is given from the input device 3, the management key file is read from the SVFD (step 291). Consequently, names of all OPFDs under the management of the SVFD are displayed on the display unit 2 (step 292). A desired name of the OPFD out of the names of the OPFDs displayed on the display unit 2 is entered from the input device 3 (step 293).

The registered name reading file is then read (step 294). When the registered name reading file is read, the name of the other OPFD which can be deciphered using the OPFD designated by the input device 3 (the name of the OPFD to be managed) out of data stored in the read registered name reading file is retrieved, and the retrieved name is displayed on the display unit 3 (step 295).

By registered name reading processing, it can be known which of the OPFDs is used for encryption and whether or not the result of the encryption can be deciphered using the SVFD.

Figure 51:
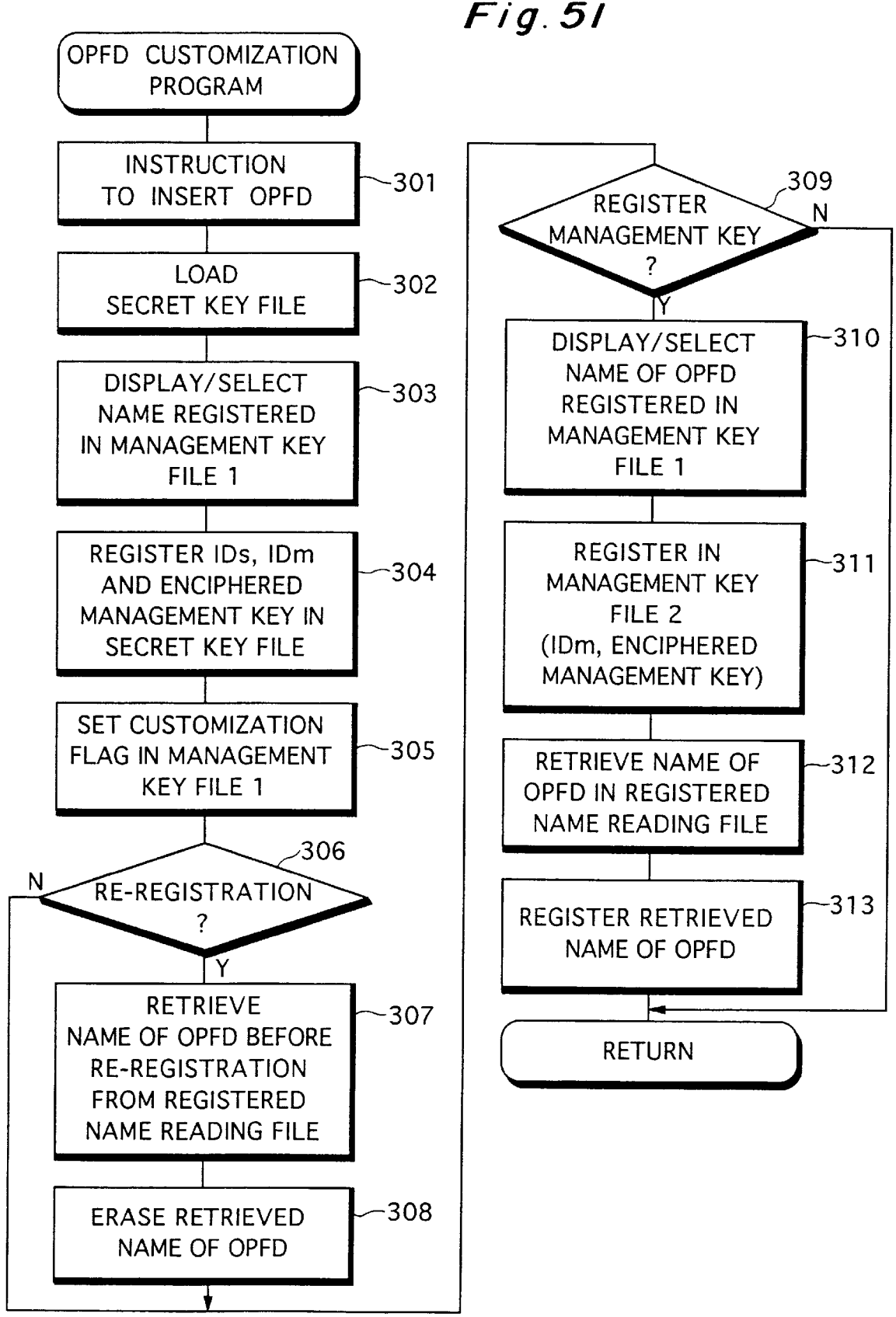
FIG. 51 is a flow chart showing the procedure for processing according to an OPFD customization program stored in the SVFD.

FIG. 51 shows the procedure for processing according to an OPFD customization program. The OPFD customization program is for storing IDs for the SVFD managing an OPFD, IDm for an OPFD and an enciphered management key in a secret key file in the OPFD put under the management of the SVFD, to customize the OPFD.

In FIG. 51, when a command to operate the OPFD customization program is entered from the input device 3, an instruction to insert an OPFD to be customized into the FD drive is displayed on the display unit 2.

When the OPFD to be customized is set in the FD drive, a secret key file stored in the OPFD is read out and is stored in the internal memory in the computer system 1 (step 302).

Furthermore, the name of an OPFD stored in the management key file 1 in the SVFD is displayed, and the name of the OPFD to be customized is entered from the input device 3 (step 303). IDs, IDm and an enciphered management key in the OPFD having the entered name are read out from the management key file 1 of the SVFD, and are registered in the secret key file in the OPFD to be customized (step 304). Consequently, the OPFD has been customized, whereby a customization flag is set to one in conformity with the IDm for the OPFD customized in the management key file 1 in the SVFD (step 305).

It is then judged whether or not in conformity with the name of the OPFD customized once, the OPFD having the name is to be customized again (step 306). This re-registration of the OPFD is executed when an old OPFD is changed into a new OPFD, for example.

In a case of the re-registration of the OPFD (YES in step 306), the registered name reading file is read out, whereby the name of the OPFD before the re-registration is searched (step 307). When the name of the OPFD before the re-registration is retrieved, the retrieved name of the OPFD and the name of the other OPFD stored in conformity with the name are erased from the registered name reading file (step 308). If it is not the case of the re-registration of the OPFD (NO in step 306), the processing in the steps 307 and 308 is skipped.

It is then judged whether or not a management key in the other OPFD is to be registered (step 309). By registering the management key in the other OPFD, data enciphered by using the other OPFD can be deciphered.

When the management key in the other OPFD is registered (YES in step 309), the names registered in the management key file 1 are displayed on the display unit 2, and a desired name is entered from the input device 3 (step 310). IDm corresponding to the name entered from the input device 3 and an enciphered management key in the OPFD corresponding to the name are registered in a management key file 2 in the OPFD (step 311).

Furthermore, the registered name reading file is read out (step 312), and a management key is stored in the name of the corresponding other OPFD in the registered name reading file (step 313).

Figure 52:
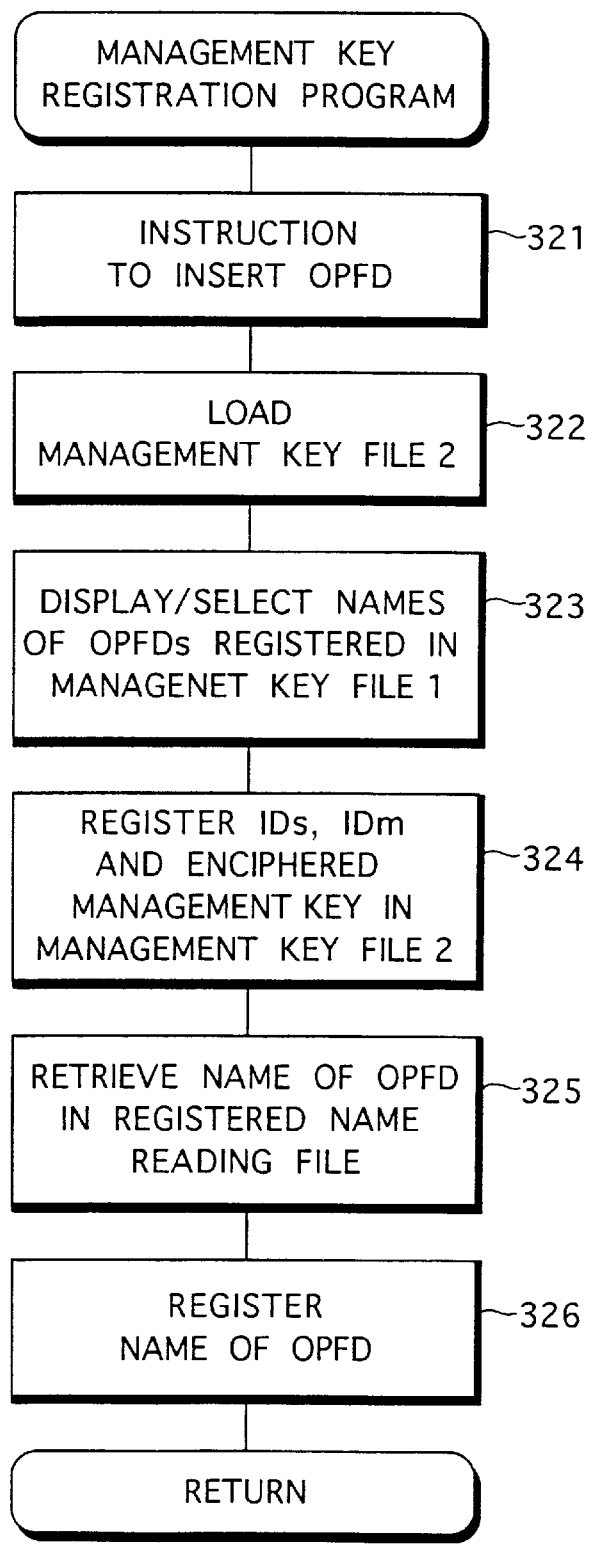
FIG. 52 is a flow chart showing the procedure for processing according to a management key registration program stored in the SVFD.

FIG. 52 shows the procedure for processing according to a management key registration program.

In FIG. 52, when a management key registration command is given from the input device 3, an instruction to insert an OPFD in which a management key is to be registered into the FD drive is displayed on the display unit 2 (step 321). When the OPFD is mounted on the FD drive, a management key file 2 stored in the OPFD is read out, and is stored in the internal memory in the computer system 1 (step 322).

The names of OPFDs having management keys stored in the management key file 1 are then displayed on the display unit 2. The name of the OPFD having a management key to be registered out of the names of the OPFDs displayed on the display unit 2 is entered from the input device 3 (step 323). A management key, and IDs and IDm stored in the OPFD having the name entered by the input device 3 are stored in the management key file 2 in the OPFD (step 324).

Furthermore, the registered name reading file is read out (step 325), and a management key is stored in the name of the corresponding other OPFD in the registered name reading file (step 326).

Figure 53:
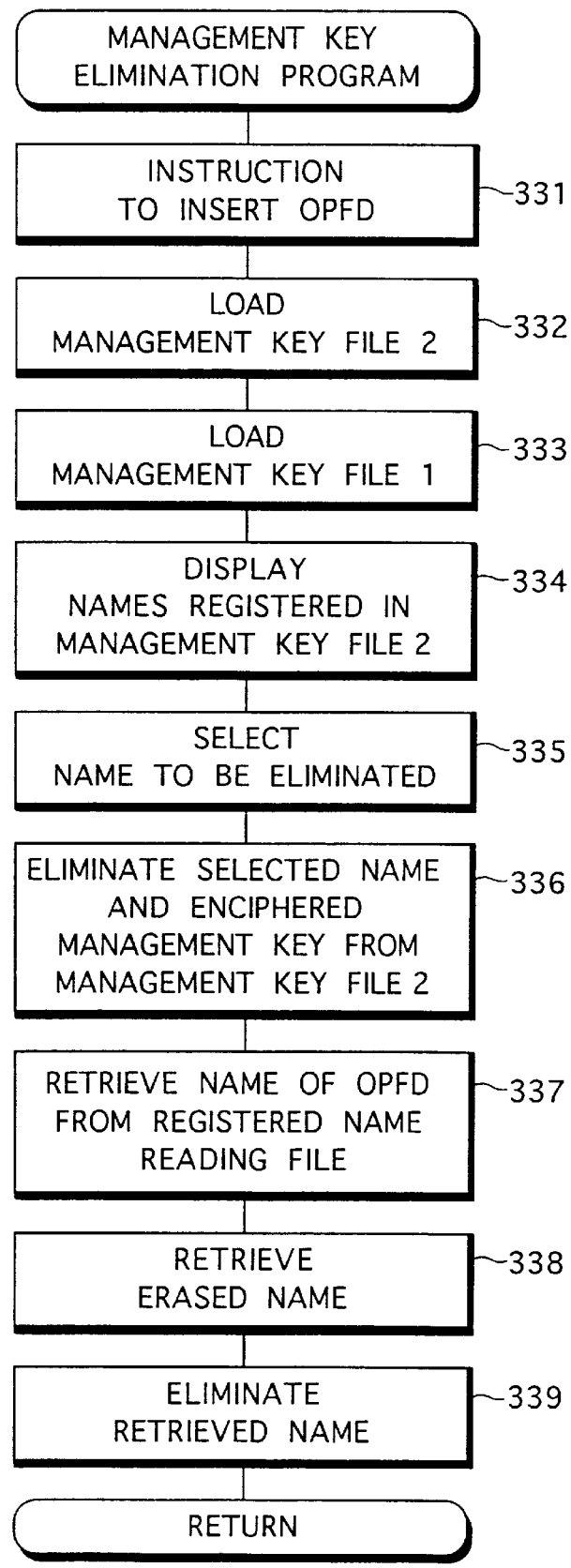
FIG. 53 is a flow chart showing the procedure for processing according to a management key elimination program stored in the SVFD.

FIG. 53 shows the procedure for processing according to a management key elimination program.

When a management key elimination command is entered into the input device 3, an instruction to insert an OPFD storing a management key to be eliminated into the FD drive is displayed on the display unit 2 (step 331). A management key file 2 is read out from the OPFD mounted on the FD drive, and is temporarily stored in the internal memory in the computer system 1 (step 332). The management key file in the SVFD is also read out (step 333).

The management key file 2 in the OPFD is read out, and the names of OPFDs having management keys stored in the management key file 2 are displayed on the display unit 2 (step 334).

The name of the OPFD having the management key to be eliminated out of the names of the OPFDs displayed on the display unit 2 is entered from the input device 3 (step 335). When the name is entered from the input device 3, the name and an enciphered management key corresponding to the name are eliminated from the management key file 2 (step 336).

The name of the OPFD having the eliminated management key is retrieved from the registered name reading file (step 337), and is eliminated (steps 338 and 339).

Figure 54A:
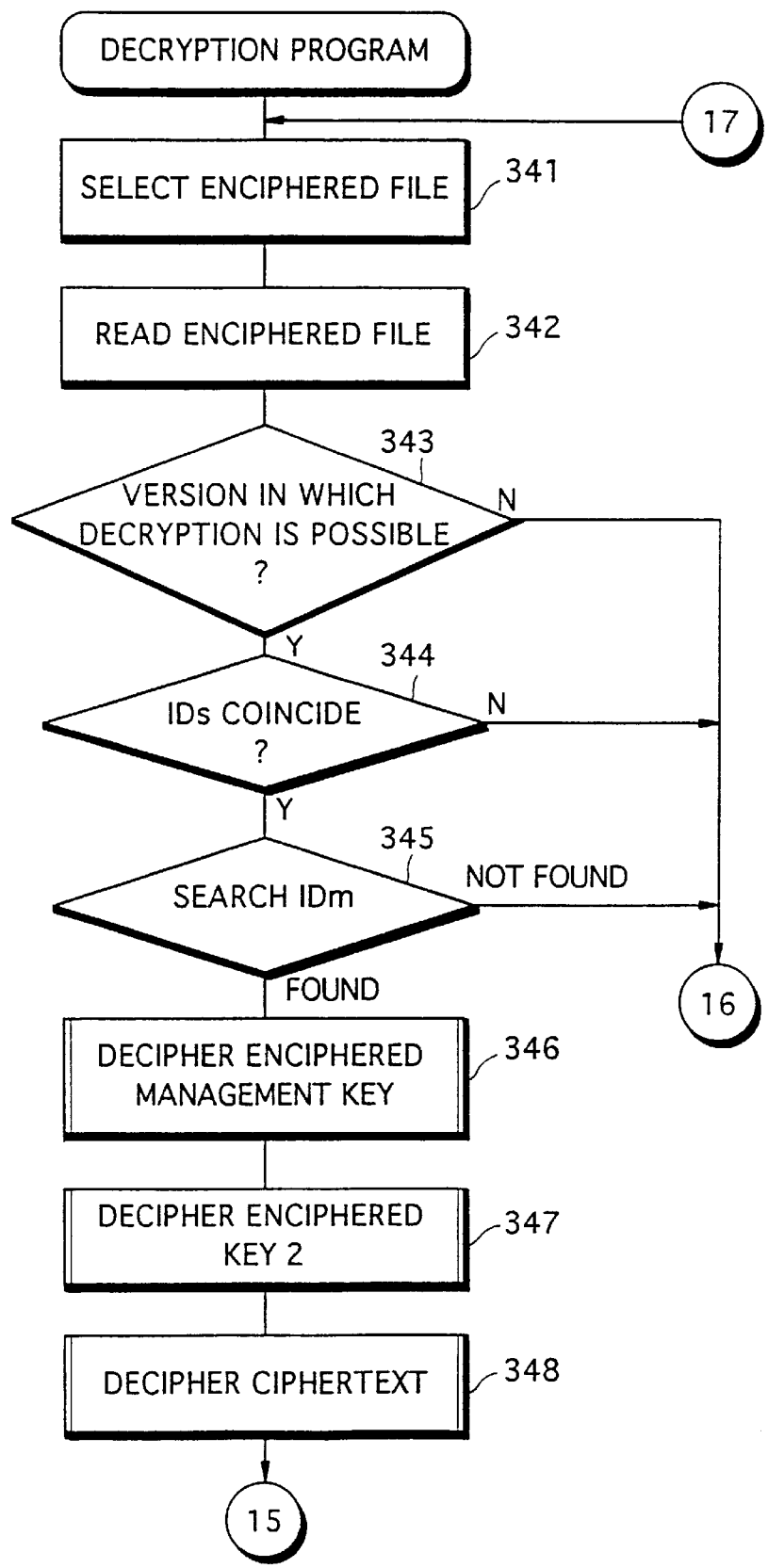
FIGS. 54a and 54b are flow charts showing the procedure for processing according to a decryption program stored in the SVFD.
Figure 54B:
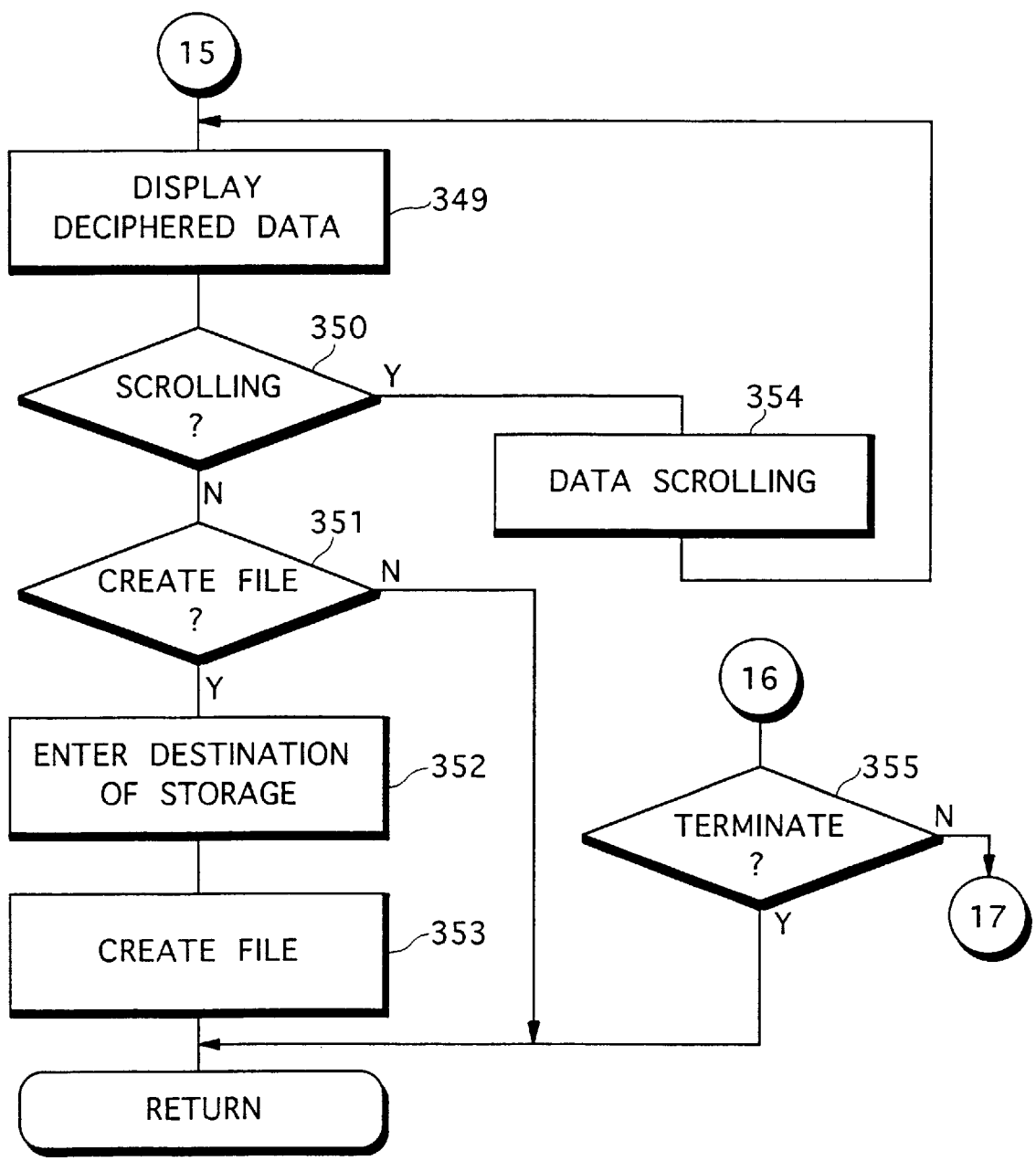

FIGS. 54a and 54b show the procedure for processing according to a decryption program of ciphertext data using the SVFD. Ciphertext data generated using a secret key and a management key stored in an OPFD can be deciphered using the SVFD.

FIGS. 54a and 54b show the procedure for decryption processing using the SVFD.

In FIG. 54a, an FD storing enciphered files is set in the FD drive 6. All the file names of the enciphered files stored in the FD are displayed on the display unit 2. The file name of an enciphered file to be deciphered out of the file names displayed on the display unit 2 is entered from the input device 3 (step 341). The enciphered file having the file name entered from the input device 3 is read from the FD (step 342).

In decryption processing of ciphertext data, it is necessary that ciphertext data enciphered by an OPFD having a low version can be deciphered by the SVFD having a higher version than the version of the OPFD. Therefore, the version of the OPFD stored in the enciphered file and the version of the SVFD are compared with each other (step 343). Decryption is possible if the version stored in the enciphered file is lower than the version of the SVFD, while being impossible if it is not lower.

When the version stored in the enciphered file is lower than the version of the SVFD, the IDs for the SVFD and IDs stored in the enciphered file are compared with each other (step 344). If the IDs's coincide with each other, the enciphered file can be deciphered because it is enciphered by the OPFD which is put under the management of the SVFD set in the enciphering/deciphering device. On the other hand, if the IDs's do not coincide with each other, the enciphered file cannot be deciphered because it is enciphered by the OPFD which is not put under the management of the SVFD set in the enciphering/deciphering device.

When the IDs's coincide with each other, so that it is judged that decryption is possible (YES in step 344), the same IDm as the IDm stored in the enciphered file is searched in the management key file 1 (step 345).

If the same IDm exist (step 345), an enciphered management key corresponding to the IDm retrieved from the management key file 1 is read out and is deciphered (step 346).

The enciphered key 2 is then read out from the enciphered file, and is deciphered using the deciphered management key (step 347). Ciphertext data is deciphered using the deciphered management key (step 348), and plaintext data obtained by the decryption is displayed on the display unit 2 (step 349).

It is judged whether or not the data displayed on the display 2 is scrolled (step 350), and data scrolling processing is performed if the data is scrolled (step 354). If the data is not scrolled (NO in step 350), it is judged whether or not a file for storing deciphered data is to be created (step 351).

When a file is created, a destination at which the file is to be stored is entered by the input device 3, to create the file (steps 352 and 353).

Figure 55:
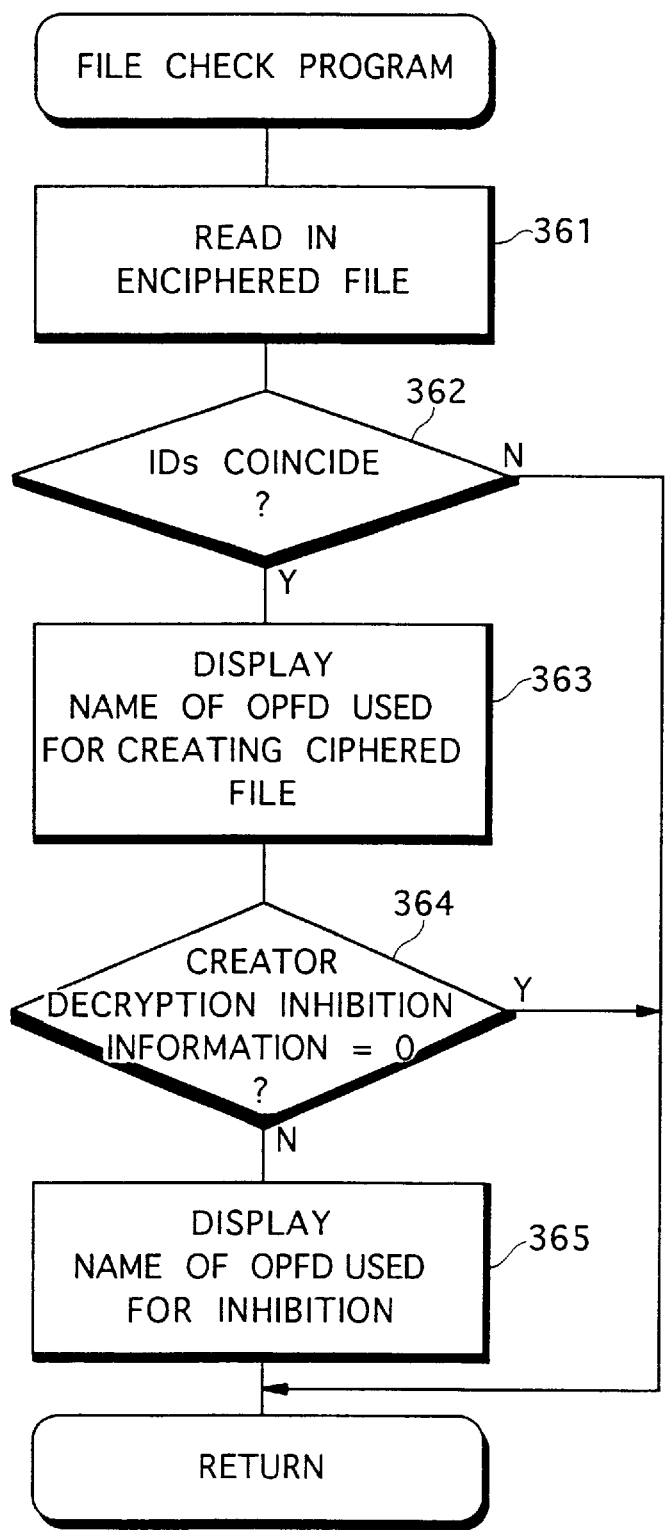
FIG. 55 is a flow chart showing the procedure for processing according to a file check program stored in the SVFD.

FIG. 55 shows the procedure for processing according to a file check program. The file check program is for confirming a creator of an enciphered file and a person who sets inhibition of decryption in a case where decryption is inhibited.

In FIG. 55, an FD storing an enciphered file set in an FD drive is stored in the internal memory in the computer system 1 (step 361). In order to confirm whether or not the enciphered file has been enciphered by an OPFD put under the management of the SVFD of its own, IDs stored in the enciphered file and the IDs stored in the SVFD are compared with each other (step 362).

When the IDs's coincide with each other, the name of the OPFD used for creating the enciphered file is read out from the enciphered file, and is displayed on the display unit 2 (step 363).

Furthermore, it is judged whether or not creator decryption inhibition information in an enciphered file is set to one (step 364), and the name of an OPFD used for inhibiting creator decryption is displayed on the display unit 2 if the creation decryption inhibition information is set to one (step 365).

Figure 56:
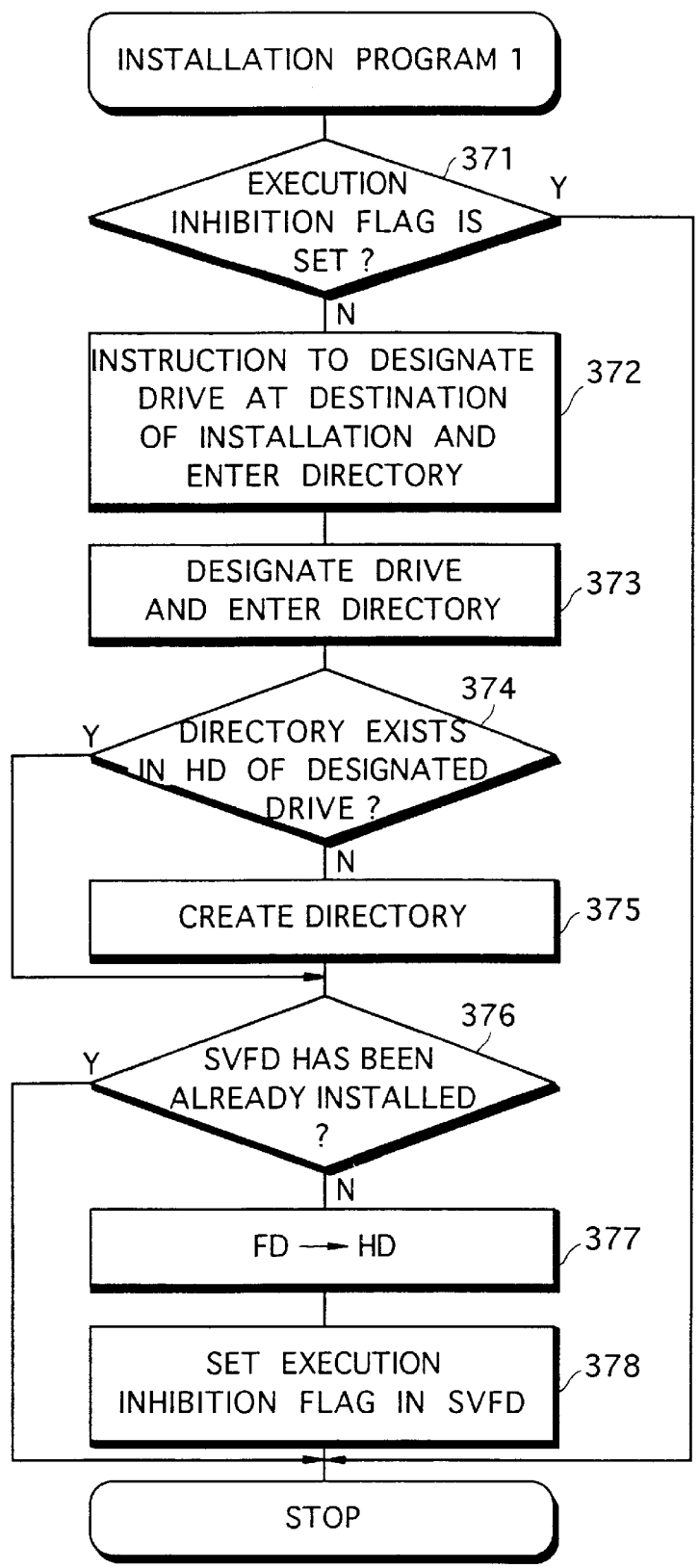
FIG. 56 is a flow chart showing the procedure for processing according to an installation program stored in the SVFD.

FIG. 56 shows the procedure for processing according to an installation program. The installation program is for transferring data stored in the SVFD to the HD and reading out the data from the HD, to perform encryption/decryption processing.

When the data in the SVFD have been already installed in the HD, an execution inhibition flag is set to one, to inhibit the installation. This is for preventing unfair copying of the data in the SVFD. Therefore, it is first judged whether or not the execution inhibition flag is set to one (step 371). When the execution inhibition flag is set to one (YES in step 371), the data cannot be installed, to terminate the processing.

If the execution inhibition flag is not set to one (NO in step 371), an instruction to enter a drive at a destination of the installation (the HD drive 8) and a directory is displayed on the display unit 2 (step 372). The drive at the destination of the installation and the directory are entered from the input device 3 on the basis of the display (step 373).

It is judged whether or not a directory has been already created in the drive at the destination of the installation entered from the input device 3 (step 374). When the directory is not created (NO in step 374), the directory is created (step 375). When the directory has been already created (YES in step 374), the processing in the step 375 is skipped.

Furthermore, it is judged whether or not the SVFD has been already installed (step 376), the data stored in the SVFD are transferred to the HD when the SVFD is not installed (step 377), and the execution inhibition flag of the SVFD is set to one (step 378).

Figure 57:
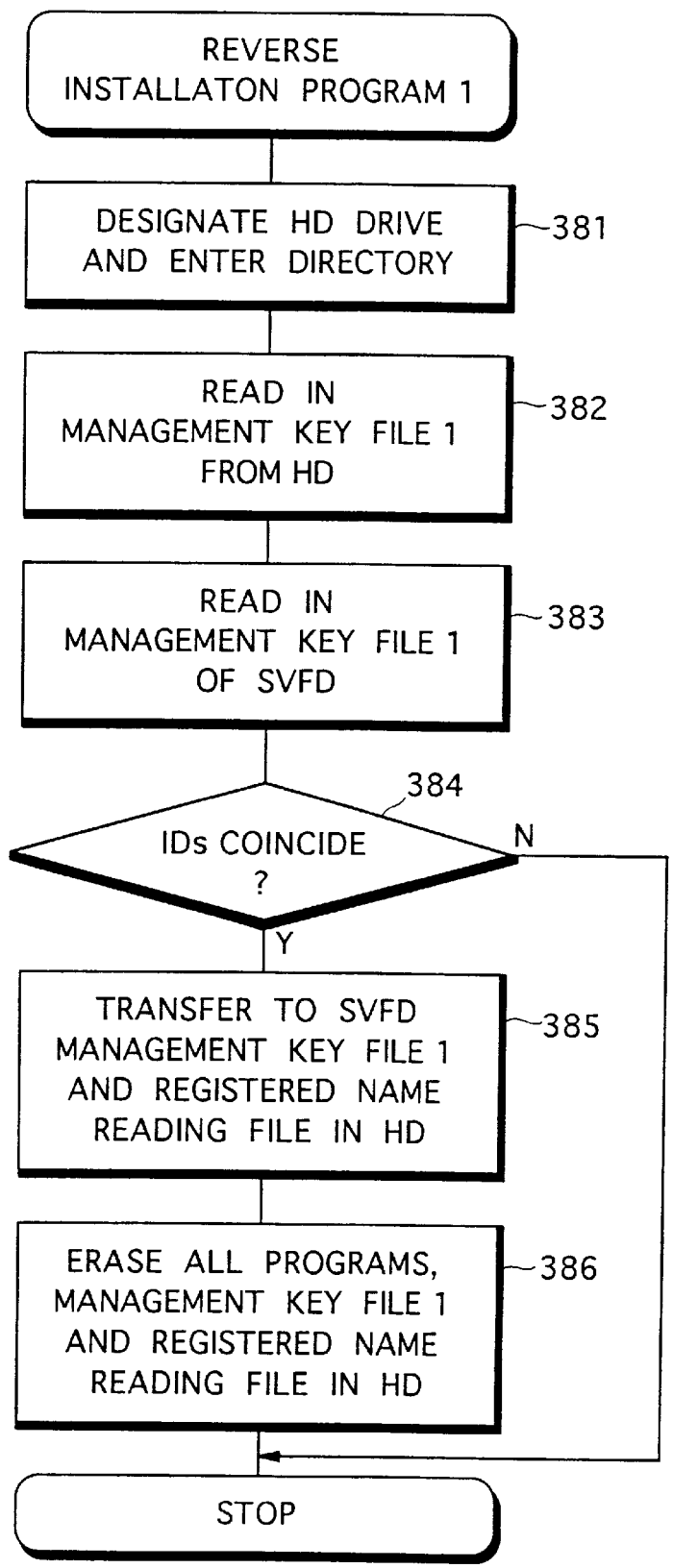
FIG. 57 is a flow chart showing the procedure for processing according to a reverse installation program stored in the SVFD.

FIG. 57 shows the procedure for processing according to a reverse installation program. The reverse installation program is for returning the data installed in the HD from the SVFD to the SVFD again.

In FIG. 57, the HD drive 8 and the directory name are entered from the input device 3 (step 381). Data stored in the HD are read by the entered HD drive 8, whereby a management key file 1 is read from the HD (step 382). The SVFD to be subjected to reverse-installation is set in the FD drive, whereby the management key file 1 in the SVFD is read (step 383).

IDs stored in the management key file 1 read from the HD and IDs stored in the management key file read from the SVFD are compared with each other (step 384). When the IDs's coincide with each other, the management key file 1 and a registered name reading file which have been stored in the HD are transferred to the SVFD, and are registered therein (step 385). When the management key file 1 and the registered name reading file are registered in the SVFD, programs of the HD, the management key file 1 and the registered name reading file which have been stored in the HD are erased (step 386). Consequently, the data in the HD is prevented from being read out.

Figure 58:
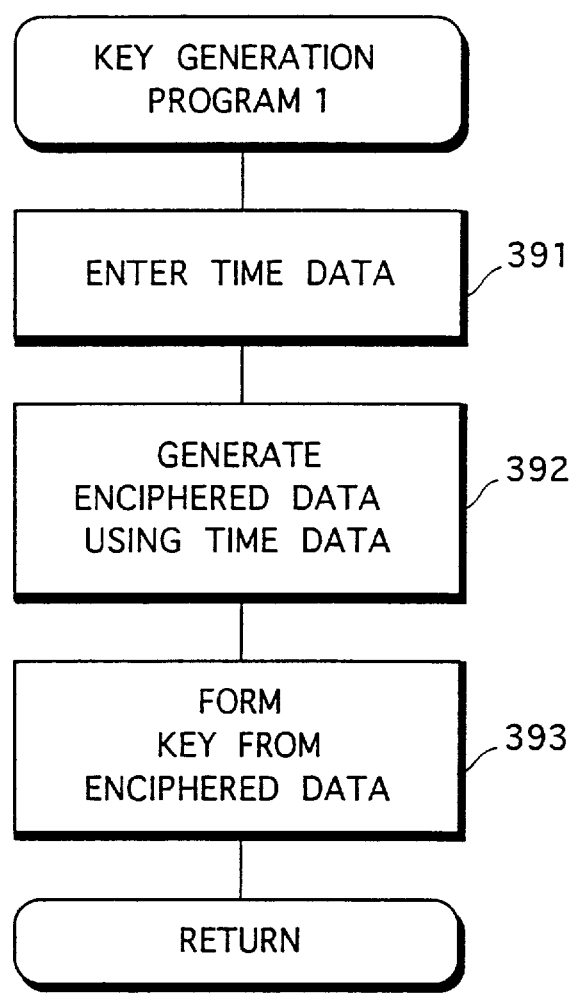
FIG. 58 is a flow chart showing the procedure for processing according to a key formation program stored in the SVFD.
Figure 59:
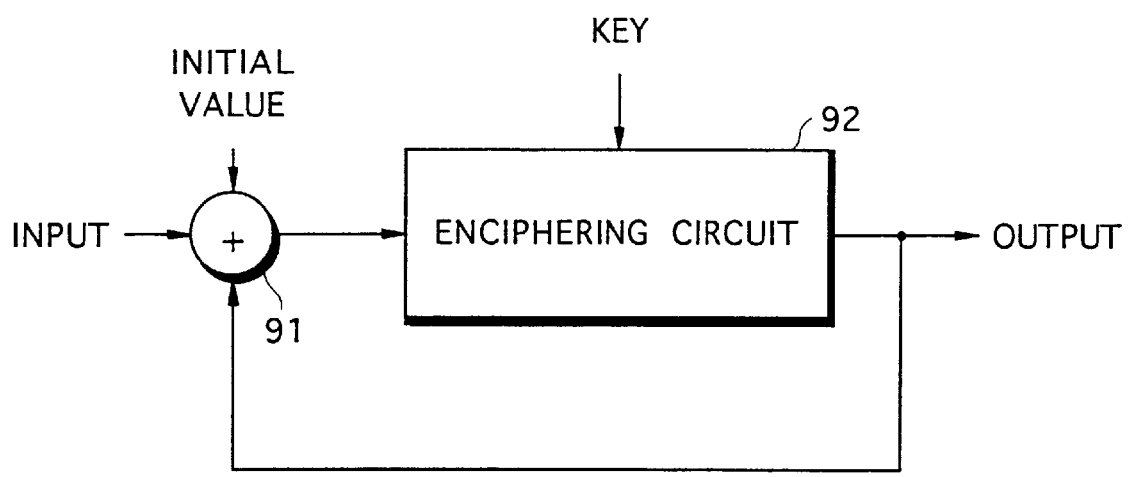
FIG. 59 illustrates one example of the construction of a key generating circuit.

FIG. 58 shows the procedure for processing according to an enciphered key generation program. FIG. 59 illustrates the electrical configuration for generating an enciphered key.

When an enciphered key is generated as shown in FIG. 59, input data and initial value data or output data of an enciphering circuit 92 are added in an adding circuit 91, and data obtained by the addition is entered into the enciphering circuit 92. The data entered into the enciphering circuit 92 is enciphered in the enciphering circuit 92 using a key, and is outputted. The data outputted from the enciphering circuit 92 is used as an enciphered key.

FIG. 58 shows the procedure for processing for generating, in such enciphered key generation, the enciphered key using time data as any one of the key, and the input data and the initial value data entered into the adding circuit 91.

In FIG. 58, the time data is entered (step 391), and the time data is used as the input data, the average data or the key shown in FIG. 59, to generate enciphered data (step 392). The enciphered data thus generated is used as a file key 44, a secret key 47 or a management key 48 (step 393).

(4) Contents of Programs in OPFD

Figure 60:
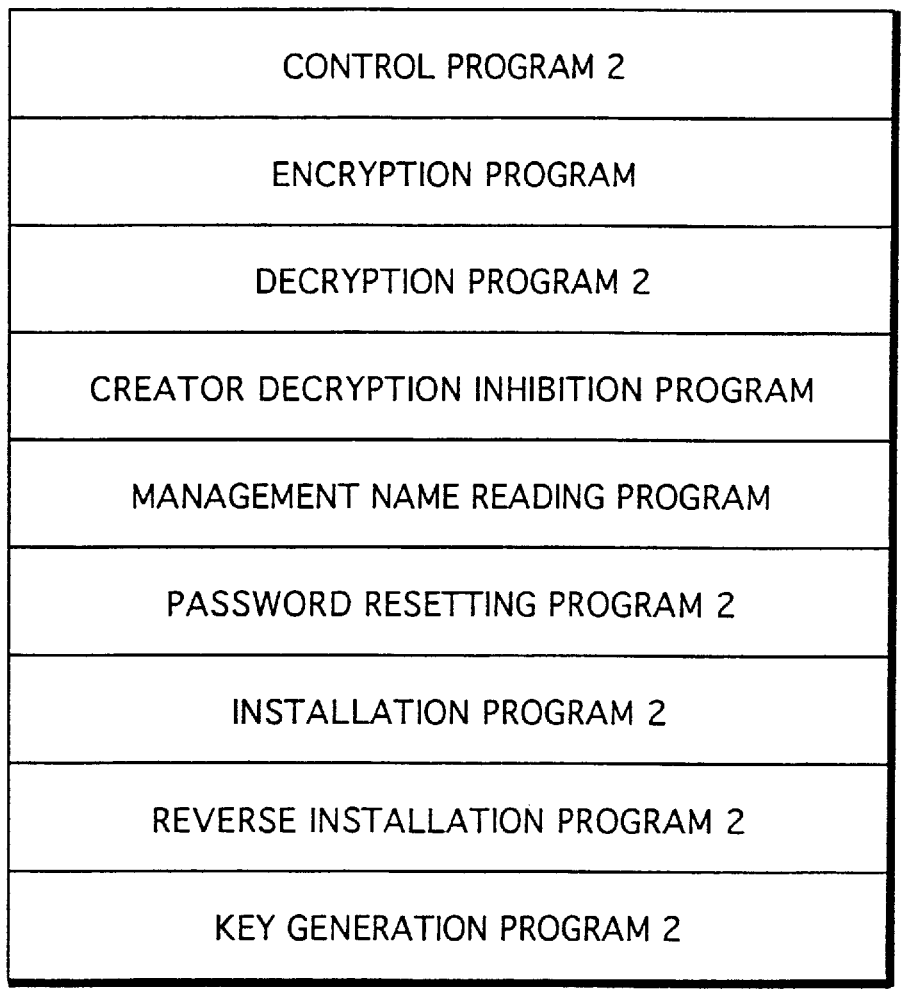
FIG. 60 illustrates the contents of a program file in an OPFD.
Figure 6:
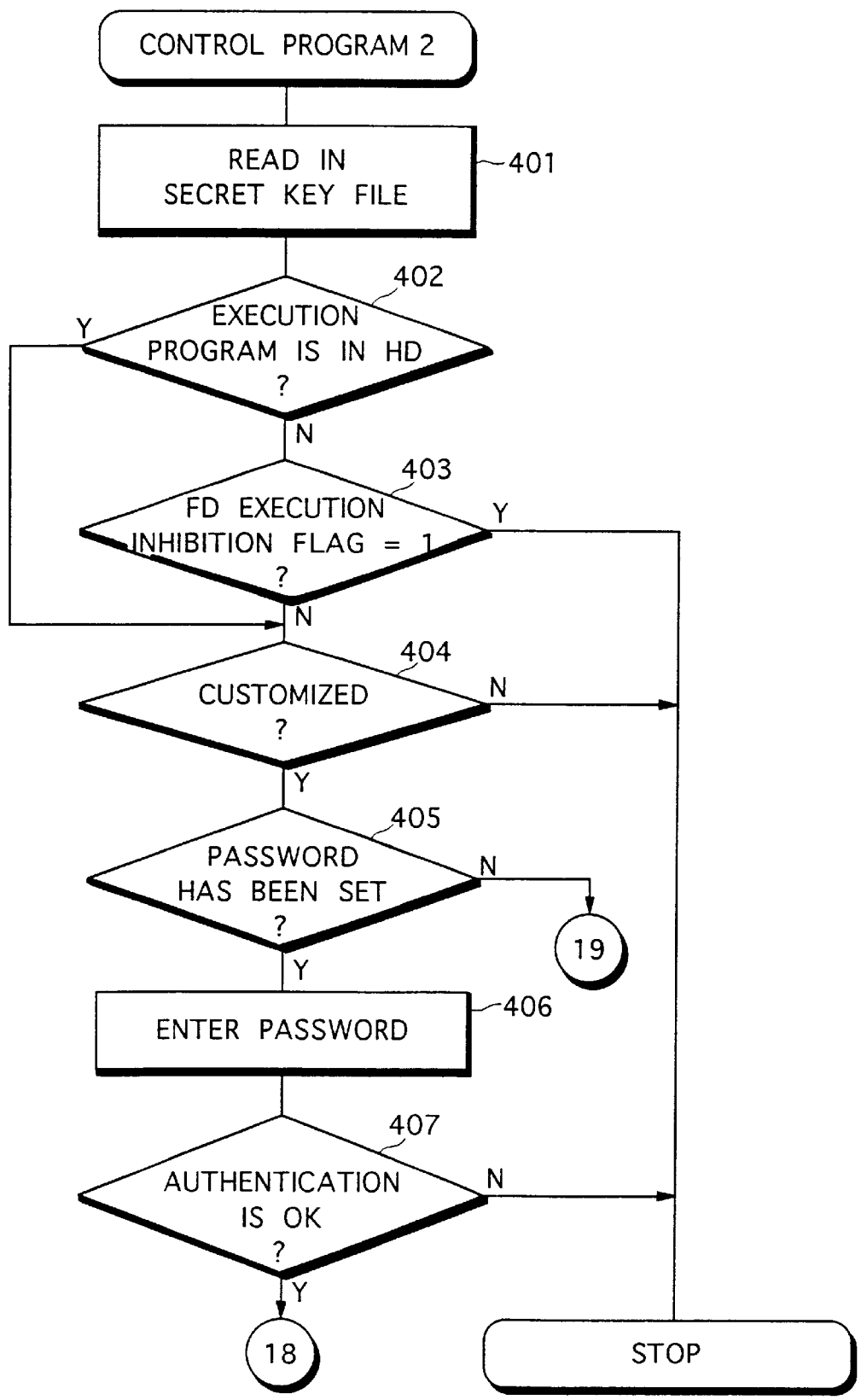

FIG. 60 illustrates the contents of a program file in an OPFD.

The OPFD stores a control program, an encryption program, a decryption program, a creator decryption inhibition program, a management name reading program, a password resetting program, an installation program, a reverse installation program, and a key generation program.

FIGS. 61*a* to 68 show the procedure for processing according to each of the programs in the program file stored in the OPFD.

Figure 61B:
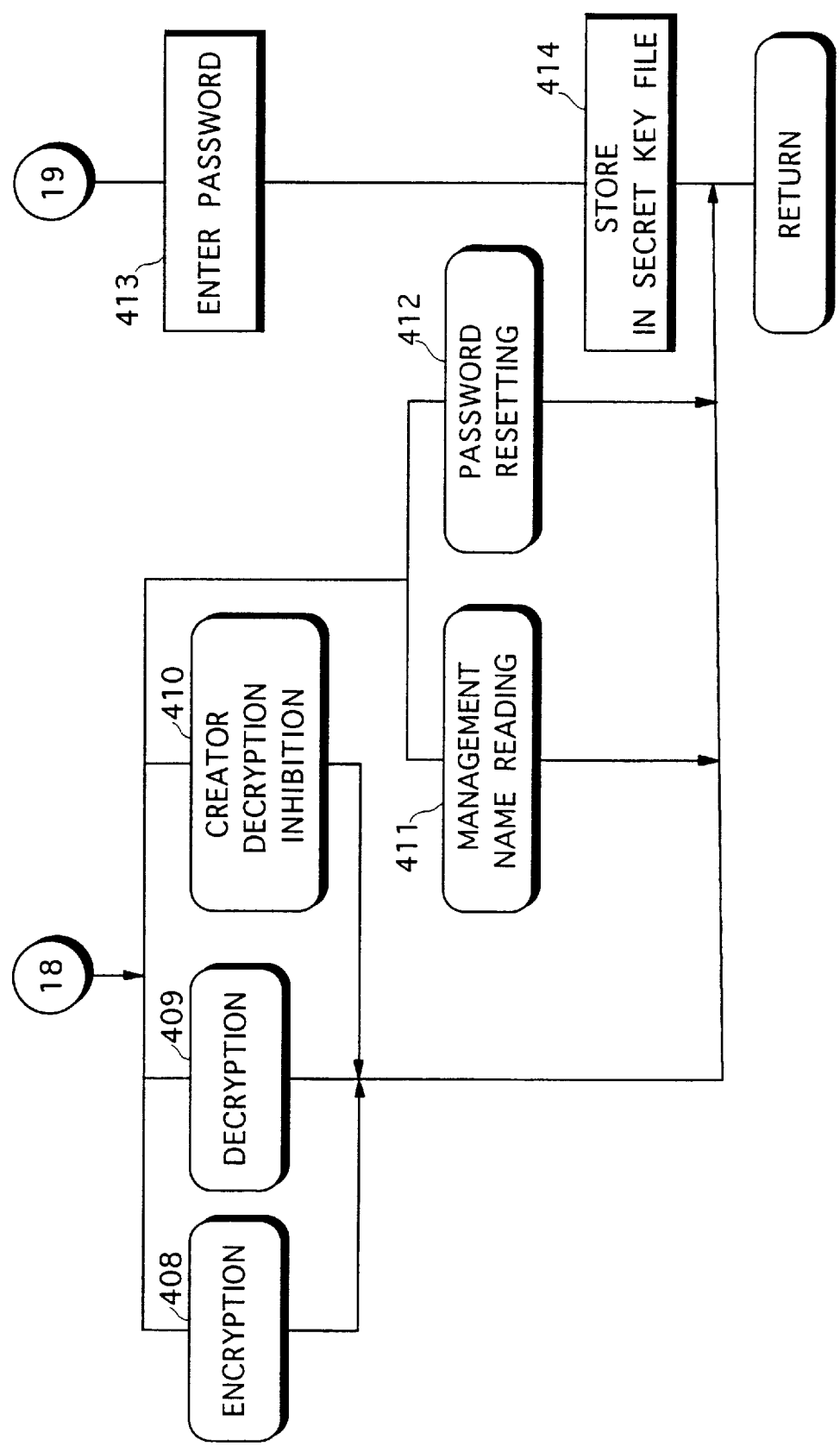

FIGS. 61*a* and 61*b* show the procedure for processing according to the control program in the OPFD.

In FIG. 61*a*, the OPFD is set in the FD drive, and a secret key file stored in the OPFD is read out (step 401). It is judged whether or not an execution program of the OPFD has been already installed in the HD (step 402). If the execution program is not installed in the HD, it is judged whether or not an FD execution inhibition flag is set to one (step 403).

If the FD execution inhibition flag is not set to one (NO in step 403), it is judged whether or not the OPFD is customized (step 404). If the OPFD has been already customized, the OPFD set in the FD drive can be employed. It is then judged whether or not an enciphered password is stored in the OPFD (step 405). If the enciphered password is stored in the OPFD (YES in step 405), a password is entered from the input device 3 in order to confirm whether or not a user of the OPFD is a fair user (step 406).

It is judged whether or not the passwords coincide with each other (step 407). If the passwords coincide with each other (YES in step 407), it is judged that the user of the OPFD is a fair user, whereby processing such as encryption is made possible. Consequently, encryption processing (step 408), decryption processing (step 409), processing for inhibiting creator decryption (step 410), management name reading processing (step 411), and password resetting processing (step 412) are made possible. The processing will be described in detail later.

When the enciphered password is not stored in the OPFD set in the FD drive (NO in step 405), the password used for confirming a fair user of the OPFD is entered from the input device 3 (step 413), and the password is enciphered and is registered in the secret key file (step 414).

Figure 62:
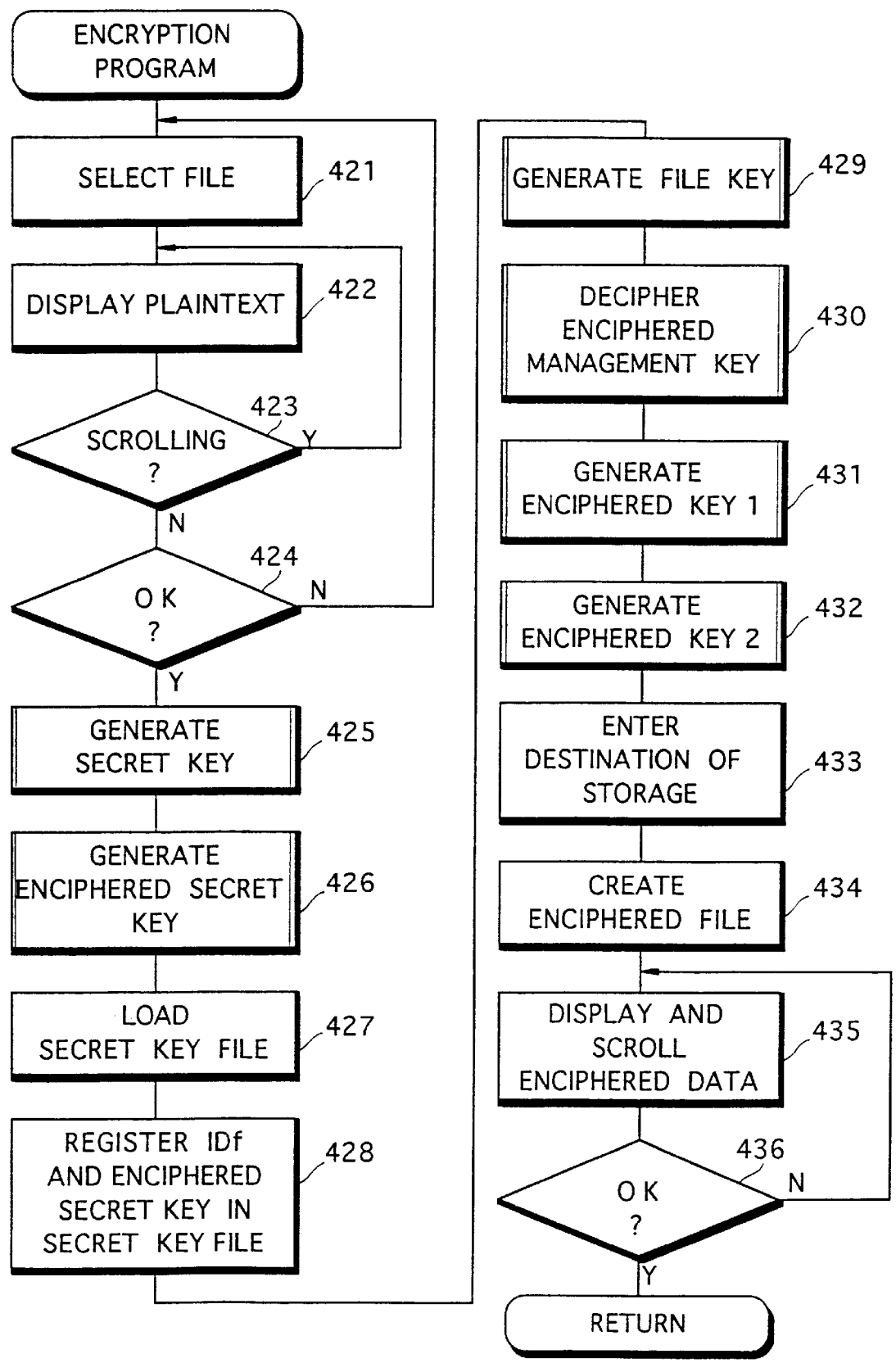
FIG. 62 is a flow chart showing the procedure for processing according to an encryption program stored in the OPFD.

FIG. 62 shows the procedure for processing according to the encryption program using the OPFD.

A plaintext file to be enciphered out of plaintext files stored in the external storage device 4 is selected by the input device 3 (step 421). Plaintext data selected by the input device 3 is displayed on the display unit 3 (step 422). If the plaintext data is not scrolled (NO in step 423), it is judged whether or not the data is normal (step 424).

If the data is normal, a secret key is generated and is enciphered (steps 425 and 426).

The OPFD is set in the FD drive 5, whereby a secret key file stored in the OPFD is read into the internal memory in the computer system 1 (step 427). The enciphered secret key and IDs are registered in the secret key file (step 428).

Furthermore, a file key is generated (step 429), and an enciphered management key which has been stored in the secret key file is deciphered (step 430).

An enciphered key 1 and an enciphered key 2 are generated from the generated secret key and the deciphered management key (steps 431 and 432).

A destination in an enciphered file at which the enciphered key 1 and the enciphered key 2 are to be stored is designated (step 433), and an enciphered file is created (step 434) and is stored.

When enciphered data is generated, the generated enciphered data is displayed on the display unit 2 (steps 435 and 436).

Figure 63A:
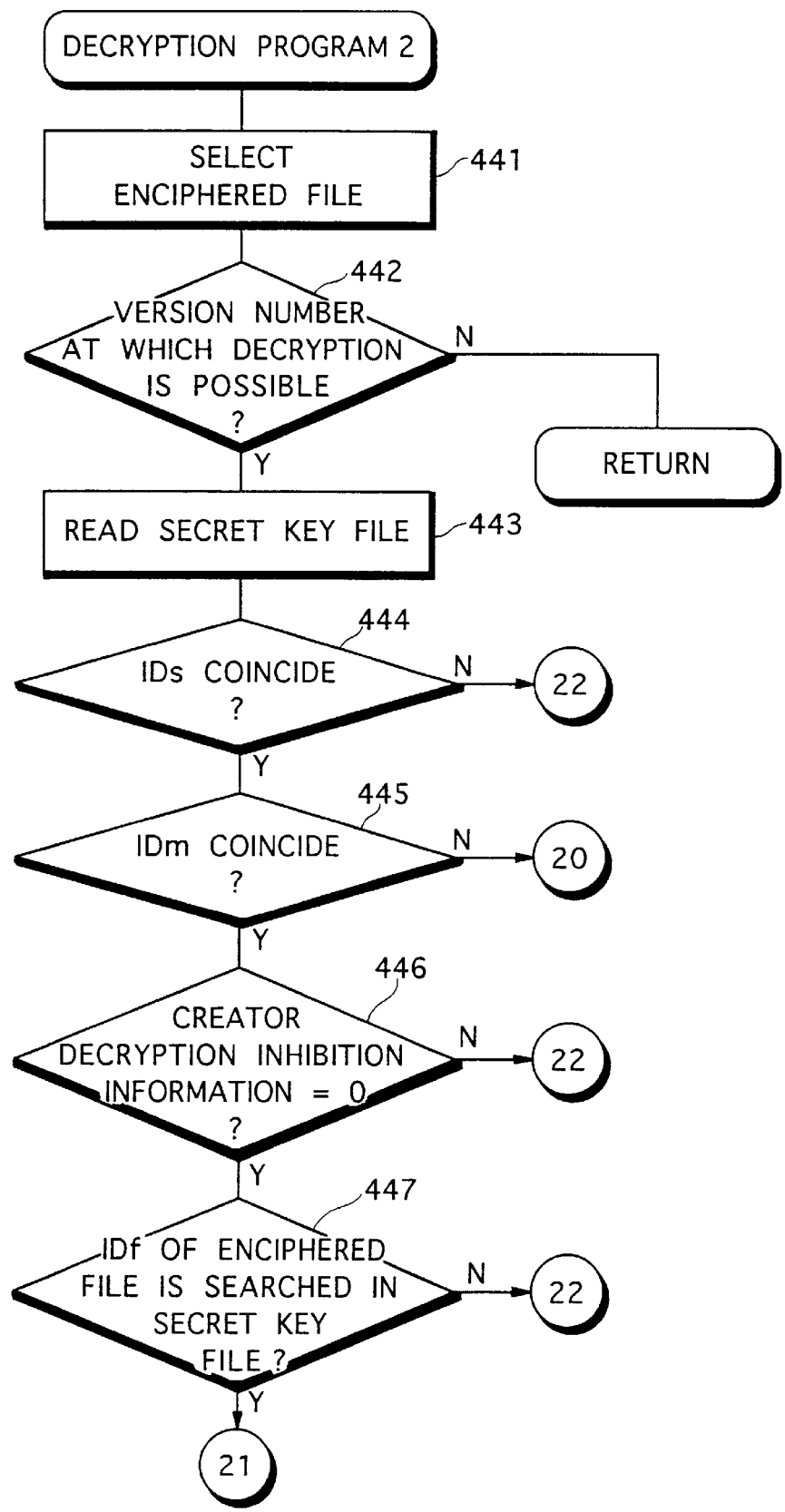
FIGS. 63a, 63b and 63c are flow charts showing the procedure for processing according to a decryption program stored in the OPFD.
Figure 63B:
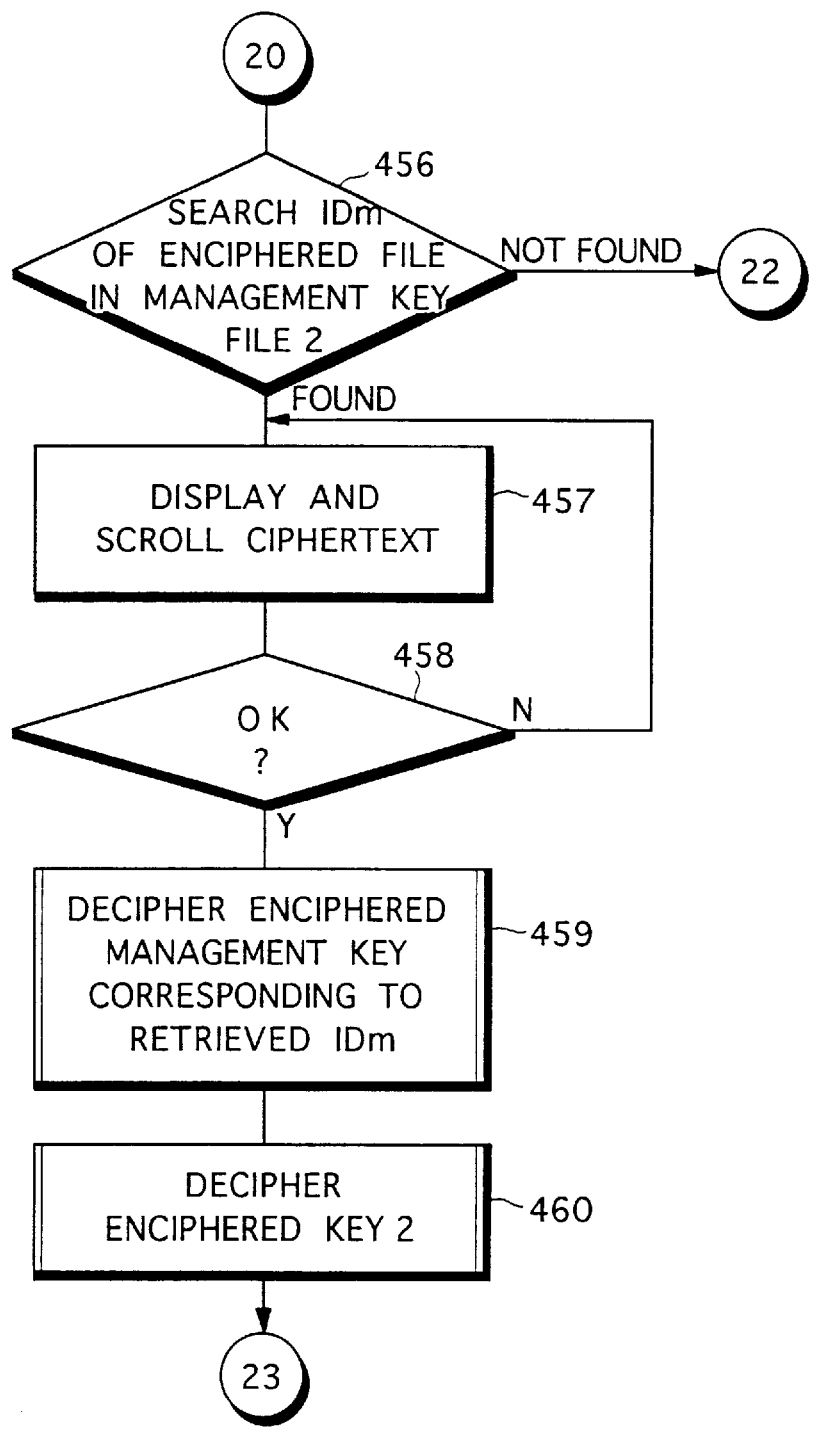
Figure 63C:
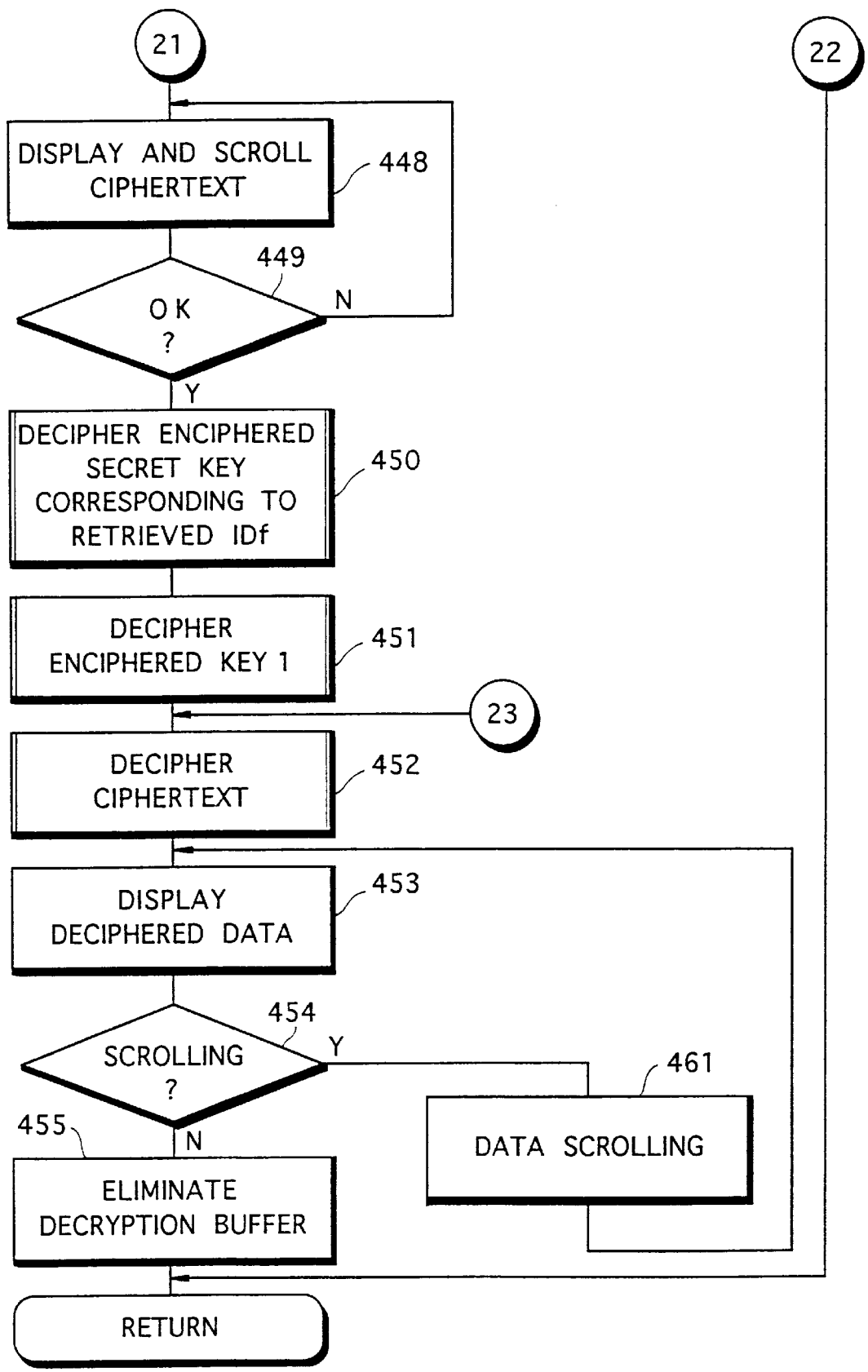

FIGS. 63a, 63b and 63c show the procedure for processing according to the decryption program. The decryption program is for decrypting ciphertext data enciphered by an OPFD using the OPFD. In the decryption program, there are cases such as a case where data enciphered using an OPFD of its own is deciphered and a case where data enciphered using an OPFD of another person is deciphered.

In FIG. 63a, an enciphered file to be deciphered out of enciphered files set in the FD drive is selected by the input device 3 (step 441).

It is judged whether or not a version number stored in the enciphered file is not more than the version number of the OPFD (step 442). If the version number is not more than the version number of the OPFD (YES in step 442), decryption is possible, whereby a secret key file stored in the OPFD is read out. It is judged whether or not IDs and IDm stored in the enciphered file respectively coincide with IDs and IDm stored in the secret key file (steps 444 and 445).

If the IDs's do not coincide with each other (NO in step 444), the enciphered file cannot be deciphered because it is not enciphered by OPFDs under the management of the same SVFD.

When the IDs's coincide with each other (YES in step 444), the enciphered file can be deciphered because it is enciphered by OPFDs under the management of the same SVFD. When the IDs's coincide with each other, it is judged whether or not the IDms coincide with each other (step 445). If the IDms coincide with each other, it is the ciphertext data generated by an OPFD of its own and is subjected to decryption processing using a secret key. If the IDms do not coincide with each other, it is the ciphertext data generated by an OPFD of another person and is subjected to decryption processing using a management key.

When the IDms coincide with each other (YES in step 445), it is judged whether or not creator decryption inhibition information in the OPFD is set to one (step 446). If the creator decryption inhibition information has been set to one, decryption is inhibited.

If the creator decryption inhibition information is not set to one (YES in step 446), it is judged whether or not the same IDf as IDf stored in the enciphered file is stored in the secret key file (step 447). When the IDf is stored in the secret key file (YES in step 447), the ciphertext data is scrolled on the display unit 3 in FIG. 63c (steps 448 and 449).

An enciphered secret key corresponding to the IDf retrieved in the secret key file is deciphered (step 450), and the enciphered key 1 is deciphered using the deciphered secret key (step 451). The ciphertext data which has been stored in the enciphered file is deciphered using the deciphered enciphered key 1 (step 452).

When the ciphertext data is deciphered, the deciphered data is displayed on the display unit 3 (step 453). If the deciphered data is not scrolled (NO in step 454), a decryption buffer is eliminated (step 455). If the deciphered data is scrolled (YES in step 454), data scrolling processing is performed (step 461).

If the IDms do not coincide with each other in the step 445, processing for deciphering the data enciphered by the OPFD of the other person is performed.

In FIG. 63b, the IDm of the enciphered file is retrieved from the management key file 2 (step 456), and the ciphertext data is displayed if the IDm is retrieved (steps 457 and 458). An enciphered management key corresponding to the retrieved IDm is retrieved and is deciphered (step 459). The enciphered key 2 is deciphered using the deciphered management key (step 460), and the ciphertext data is deciphered (step 452).

Figure 64:
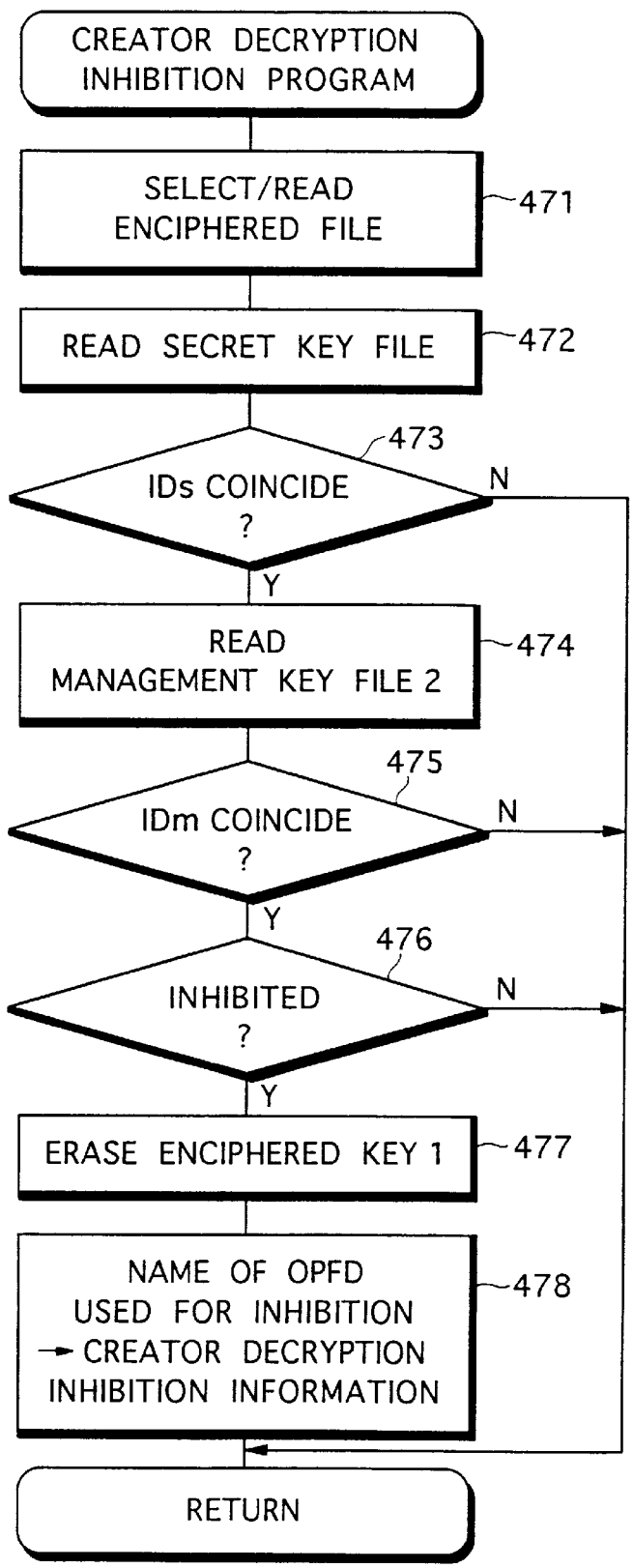
FIG. 64 is a flow chart showing the procedure for processing according to a creator decryption inhibition program stored in the OPFD.

FIG. 64 shows the procedure for processing according to the creator decryption inhibition program. The creator decryption inhibition program is for inhibiting ciphertext from being deciphered by a worker who has created the ciphertext.

An FD storing an enciphered file is set in the FD drive, and an enciphered file which is to be inhibited from being deciphered by a creator is selected (step 471). An OPFD is set in the FD drive, and a secret key file stored in the OPFD is read into the internal memory in the computer system 1 (step 472).

It is judged whether or not IDs stored in the enciphered file and IDs stored in the secret key file coincide with each other (step 473). If the IDs's coincide with each other, it is judged that they are the enciphered file which has been enciphered by OPFD put under the management of the same SVFD and the OPFD (YES in step 473), and a management key file of the OPFD is stored in the internal memory in the computer system 1 (step 474).

When IDm which coincides with IDm of the enciphered file exists in the management key file (YES in step 475), it is judged that the enciphered file has been enciphered by an OPFD which is managed by the OPFD of its own, whereby the inhibition of creator decryption is confirmed, so that the enciphered key 1 in the enciphered file is eliminated (step 477). Since the enciphered key 1 is eliminated, a file key cannot be obtained even if a secret key is used, whereby decryption processing is made impossible. The name of the OPFD used for inhibiting creator decryption is stored in the enciphered file (step 478).

Figure 65:
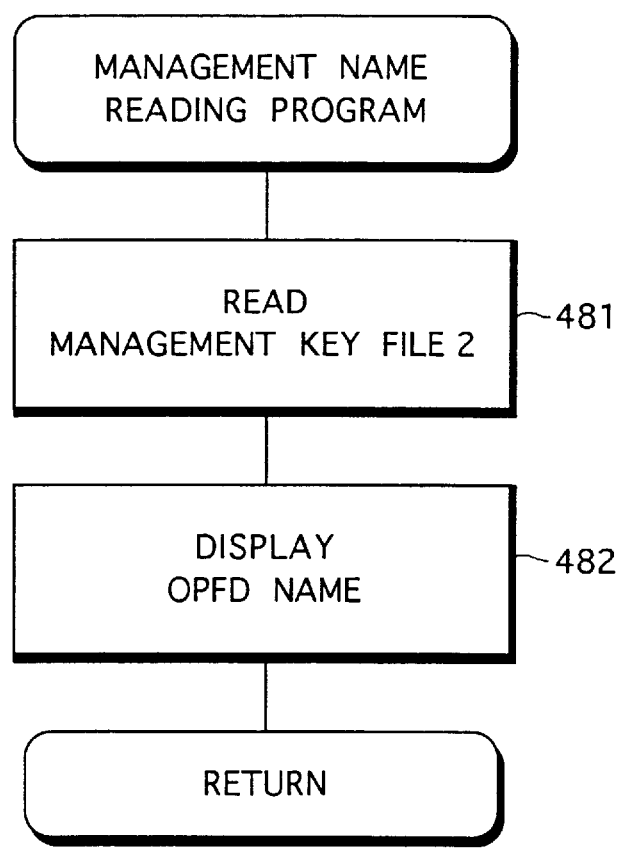
FIG. 65 is a flow chart showing the procedure for processing according to a management name reading program stored in the OPFD.

FIG. 65 shows the procedure for processing according to the management name reading program. The management name reading program is for displaying the name of an OPFD of another person which is managed by an OPFD of its own.

When the OPFD is set in the FD drive, a management key file is read in the memory contained in the computer system 1 (step 481). Consequently, the name of the OPFD of the other person which is managed by the OPFD of its own is displayed on the display unit 3 (step 482).

Figure 66:
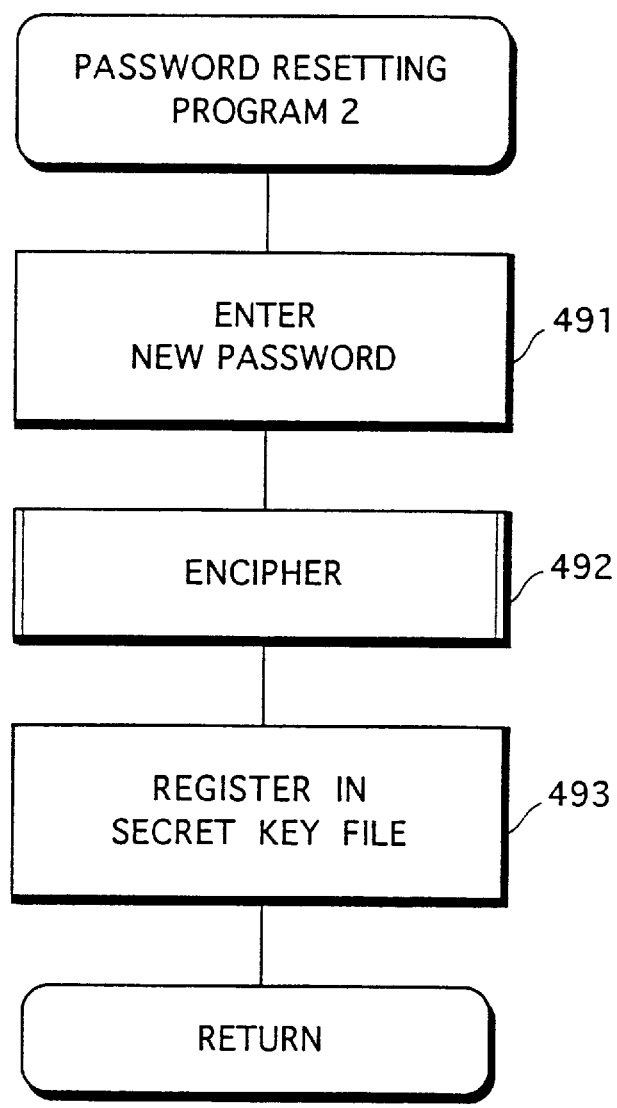
FIG. 66 is a flow chart showing the procedure for processing according to a password resetting program stored in the OPFD.

FIG. 66 shows the procedure for processing according to the password resetting program.

Although a password is also enciphered and is stored in the OPFD, the change thereof is also possible. When the password is changed, a new password is entered from the input device 3 (step 491), and is enciphered (step 492). The enciphered new password is stored in a secret key file (step 493). When the new password is stored in the OPFD, it is thereafter confirmed using the new password whether or not the user of the OPFD is a fair user.

Figure 67:
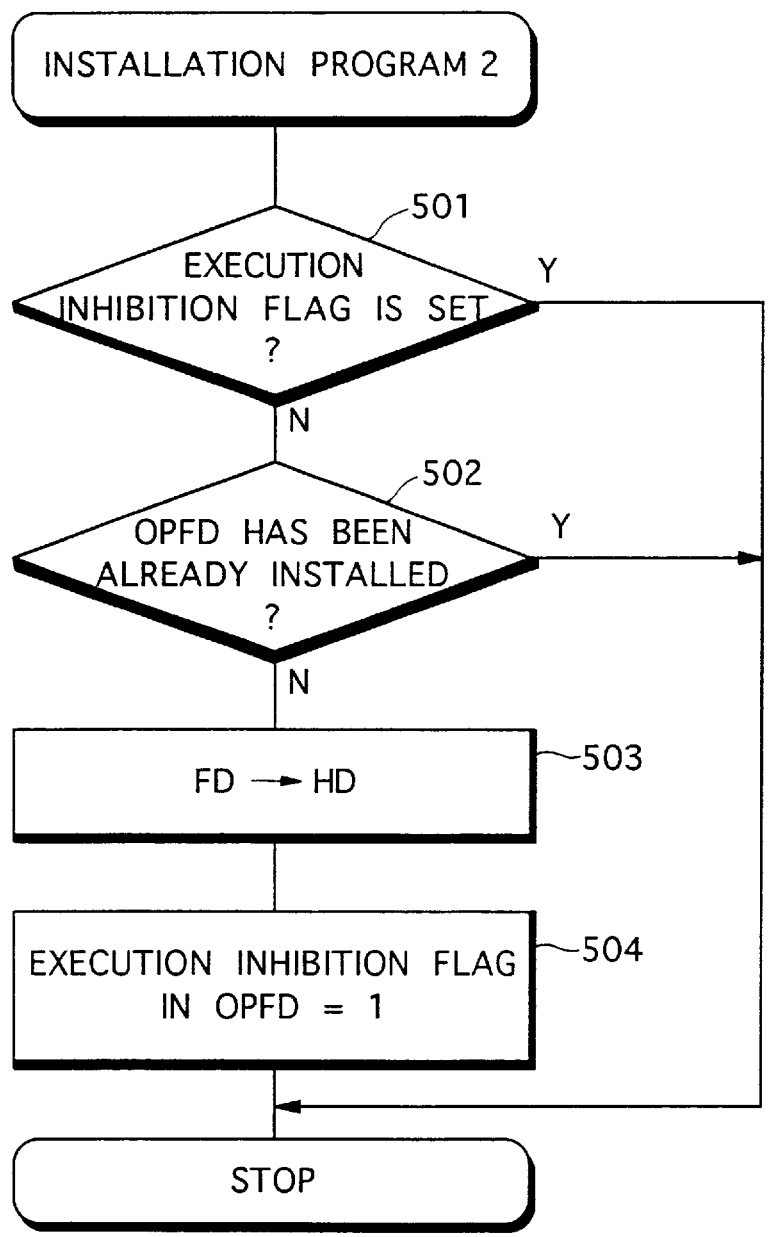
FIG. 67 is a flow chart showing the procedure for processing according to an installation program stored in the OPFD.

FIG. 67 shows the procedure for processing according to the installation program in the OPFD.

If an execution inhibition flag is not set in the OPFD (NO in step 501), it is judged whether or not the OPFD has been already installed in the HD (step 502). Unless the OPFD has been already installed in the HD, data in the OPFD are installed in the HD (step 503), and an execution inhibition flag of the OPFD is set to one.

Figure 68:
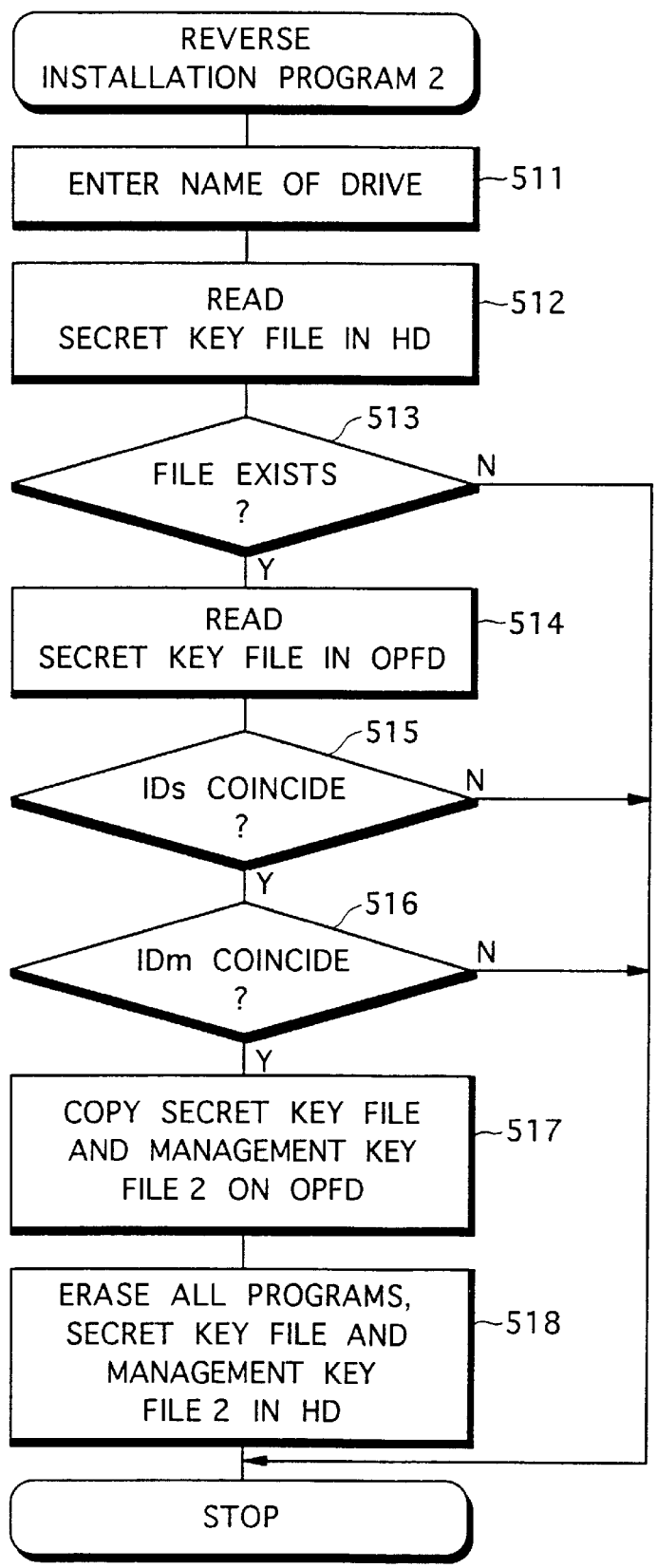
FIG. 68 is a flow chart showing the procedure for processing according to a reverse installation program stored in the OPFD.

FIG. 68 shows the procedure for processing according to the reverse installation program.

The name of the HD drive is entered (step 511), and a secret key file stored in the HD is read (step 512). If there is a secret key file (YES in step 513), the OPFD is set in the FD drive, and a secret key file of the OPFD is read (step 514).

When IDs's and IDms stored in the secret key files respectively coincide with each other (YES in steps 515 and 516), data stored in the HD are transferred to the OPFD, and are registered therein (step 517). The data which have been stored in the HD are erased (step 518).

Although an enciphered key can be also generated by the key generation program in the OPFD, the procedure for processing is the same as that using the SVFD and hence, the overlapped description is omitted.

According to the eighth embodiment, one manager, for example, a president, a secretary, etc. is made to have the SVFD, and staff members are made to have the respective OPFDs, whereby enciphered data generated by each of the staff members can be deciphered by the president, the secretary, etc. having the SVFD. By storing in the OPFD a management key of the other OPFD, ciphertext data generated by a person who has the other OPFD, for example, a staff member can be deciphered by his or her superior.

Inherent identification data are stored in addition to inherent identification names in the SVFD and the OPFD. Even if a new SVFD or OPFD is purchased, therefore, its inherent identification name and its inherent identification name respectively differ. Consequently, it is impossible to decipher using the SVFD or the OPFD newly purchased data enciphered using the other SVFD or the other OPFD. Therefore, high secrecy of the ciphertext data is maintained.

We claim:

1. An encryption/decryption communication system in which a first enciphering/deciphering device and a second enciphering/deciphering device are connected to each other through communicating means, wherein said first enciphering/deciphering device comprises data encryption key forming means for forming a data encryption key used for enciphering plaintext data, data enciphering means for enciphering said plaintext data using said data encryption key to form ciphertext data, key enciphering means for enciphering said data encryption key using a management key to form an enciphered key, first authenticator enciphering means for enciphering an authenticator for confirming whether or not transmitted data is correctly transmitted and received using said data encryption key to generate a first enciphered authenticator, and transmitting means for transmitting said ciphertext data, said enciphered key and said first enciphered authenticator, said second enciphering/deciphering device comprises receiving means for receiving the ciphertext data, the enciphered key, and the first enciphered authenticator transmitted by said transmitting means, key deciphering means for deciphering the enciphered key received by said receiving means using the same management key as the management key used in said first enciphering/deciphering device to form a data encryption key, data deciphering means for deciphering the ciphertext data received by said receiving means using the data encryption key formed by said key deciphering means to form plaintext data, authenticator deciphering means for deciphering the first enciphered authenticator received by said receiving means using the data encryption key formed by said key deciphering means, second authenticator enciphering means for enciphering the authenticator obtained as a result of the deciphering by said authenticator deciphering means using said management key to form a second enciphered authenticator, and returning means for returning said second enciphered authenticator to said first enciphering/deciphering device, and said first enciphering/deciphering device deciphers the second enciphered authenticator transmitted from said second enciphering/deciphering device using said management key, and collates the deciphered authenticator with the authenticator which has been subjected to the enciphering by said first authenticator enciphering means.

2. An encryption/decryption communication system in which a first enciphering/deciphering device and a second enciphering/deciphering device are connected to each other through communicating means, wherein said first enciphering/deciphering device comprises data encryption key forming means for forming a data encryption key used for enciphering plaintext data, data enciphering means for enciphering said plaintext data using said data encryption key to form ciphertext data, key enciphering means for enciphering said data encryption key using a management key to form an enciphered key, first authenticator enciphering means for enciphering an authenticator for confirming whether or not transmitted data is correctly transmitted and received using said management key to form a first enciphered authenticator, and transmitting means for transmitting said ciphertext data, said enciphered key and said first enciphered authenticator, said second enciphering/deciphering device comprises receiving means for receiving the ciphertext data, the enciphered key, and the first enciphered authenticator transmitted by said transmitting means, key deciphering means for deciphering the enciphered key received by said receiving means using the same management key as the management key used in said first enciphering/deciphering device to form a data encryption key, data deciphering means for deciphering the ciphertext data received by said receiving means using the data encryption key formed by said key deciphering means to form plaintext data, authenticator deciphering means for deciphering the first enciphered authenticator received by said receiving means using said management key, second authenticator enciphering means for enciphering the authenticator obtained as a result of the deciphering by said authenticator deciphering means using the data encryption key formed by said key deciphering means to form a second enciphered authenticator, and returning means for returning said second enciphered authenticator to said first enciphering/deciphering device, and said first enciphering/deciphering device deciphers the second enciphered authenticator transmitted from said second enciphering/deciphering device using said data encryption key formed by the data encryption key forming means, and collates the deciphered authenticator with the authenticator which has been subjected to the enciphering by said first authenticator enciphering means.

3. An enciphering/deciphering device using operation storage media each storing inherent supervisor identification data and inherent operation identification data and a supervisor storage medium storing said supervisor identification data, comprising:

data encryption key forming means for forming a data encryption key used for enciphering plaintext data;

secret key forming means for forming a secret key used for enciphering the data encryption key formed by said data encryption key forming means;

management key forming means for forming a management key used for enciphering the data encryption key formed by said data encryption key forming means;

first storage controlling means for storing in said operation storage medium the secret key formed by said secret key forming means and the management key formed by said management key forming means; and second storage controlling means for storing the management key formed by said management key forming means in said supervisor storage medium.

4. The enciphering/deciphering device according to claim 3, further comprising data enciphering means for enciphering said plaintext data using said data encryption key to form ciphertext data, first key enciphering means for enciphering said data encryption key using the secret key formed by said secret key forming means to form a first enciphered key, second key enciphering means for enciphering said data encryption key using the management key formed by said management key forming means to form a second enciphered key, and third storage controlling means for storing in a first storage medium said ciphertext data, said first enciphered key and said second enciphered key.

5. The enciphering/deciphering device according to claim 4, further comprising fourth storage controlling means for storing the management key stored in one operation storage medium in the other operation storage medium.

6. The enciphering/deciphering device according to claim 3, further comprising operation identification name entering means for entering an operation identification name inherent to said operation storage medium for identifying the operation storage medium, and supervisor identification name entering means for entering a supervisor identification name inherent to said supervisor storage medium for identifying the supervisor storage medium, said first storage controlling means storing in said operation storage medium the supervisor identification name entered by said supervisor identification name entering means and the operation identification name entered by said operation identification name entering means, and said second storage controlling means storing in said supervisor storage medium the supervisor identification name entered by said supervisor identification name entering means.

7. The enciphering/deciphering device according to claim 6, wherein said second storage controlling means stores in said supervisor storage medium a list of the operation identification names stored in said all operation storage media.

8. The enciphering/deciphering device according to claim 7, further comprising first selecting means for selecting a first operation identification name from the list of the operation identification names stored in said supervisor storage medium, second selecting means for selecting a second operation identification name, and fifth storage controlling means for storing identification data including the first operation identification name and the management key which are stored in a first operation storage medium specified by the first operation identification name selected by said first selecting means in a second operation storage medium specified by the second operation identification name selected by said second selecting means.

9. The enciphering/deciphering device according to claim 8, wherein said second storage controlling means stores in said supervisor storage medium the first operation identification name and the management key which are stored in said second operation storage medium in association with said second operation identification name.

10. The enciphering/deciphering device according to claim 7, further comprising overlapped names judging means for judging whether or not the operation identification name entered from said operation identification name entering means are overlapped with the operation identification names stored as a list in the supervisor storage medium, when said overlapped names judging means judges that they are overlapped with each other, a name obtained by adding an additive name to the operation identification name entered from said operation identification name entering means being stored in the operation storage medium.

11. The enciphering/deciphering device according to claim 3, further comprising secret key enciphering means for enciphering the secret key formed by said secret key forming means, and management key enciphering means for enciphering the management key formed by said management key forming means, said first storage controlling means storing in the operation storage medium the secret key enciphered by said secret key enciphering means and said management key enciphered by said management key enciphering means, said second storage controlling means storing in said supervisor storage medium the management key enciphered by said management key enciphering means.

12. The enciphering/deciphering device according to claim 11, wherein said secret key enciphering means enciphers the secret key formed by said secret key forming means using the management key formed by said management key forming means.

13. An enciphering/deciphering device comprising:

first reading means for reading out from a first storage medium storing ciphertext data, a first enciphered key and a second enciphered key the ciphertext data, the first enciphered key and the second enciphered key;

second reading means for reading out from an operation storage medium storing inherent operation identification data and a secret key for deciphering said first enciphered key read out from said first reading means the secret key;

first key deciphering means for deciphering said first enciphered key using the secret key read out by said second reading means to form a data decryption key;

first data deciphering means for deciphering said ciphertext data using the data decryption key formed by said first key deciphering means to form plaintext data; and storage controlling means for storing in a second storage medium the plaintext data formed by said first data deciphering means.

14. The enciphering/deciphering device according to claim 13, further comprising third reading means for reading out from a supervisor storage medium storing said operation identification data, inherent supervisor identification data and a management key for deciphering said second enciphered key read out from said first reading means the management key;

second key deciphering means for deciphering said second enciphered key using the management key read out by said third reading means to form a data decryption key; and second data deciphering means for deciphering said ciphertext data using the data decryption key formed by said second key deciphering means to form plaintext data, said storage controlling means storing in said second storage medium the plaintext data formed by said second data deciphering means.

15. The enciphering/deciphering device according to claim 14, wherein said second reading means reads out from an operation storage medium storing inherent operation identification data, a secret key for deciphering the first enciphered key, and a management key for the other operation storage medium said management key, and said second key deciphering means deciphers said second enciphered key using said management key read out by said second reading means to form a data decryption key.

16. The enciphering/deciphering device according to claim 15, further comprising judging means for judging whether or not said second enciphered key can be deciphered using the management key for the other operation storage medium stored in the operation storage medium, and first enciphered key eliminating means for erasing said first enciphered key stored in said first storage medium in response to the fact that said judging means judges that the deciphering is possible.

17. The enciphering/deciphering device according to claim 16, further comprising display controlling means for displaying the operation identification name of the operation storage medium in response to the fact that said first enciphered key is erased by said first enciphered key eliminating means.

18. The enciphering/deciphering device according to claim 14, further comprising storage controlling means for reading out data relating to the management key stored in said supervisor storage medium and storing the data in the other storage medium.

19. The enciphering/deciphering device according to claim 18, further comprising eliminating means for erasing the data relating to the management key in the supervisor storage medium which is stored in said other storage medium.

20. The enciphering/deciphering device according to claim 18, further comprising means for reversely transferring the data relating to the management key stored in said other storage medium to the original supervisor storage medium to store therein and erasing the data relating to the management key in said other storage medium.

21. The enciphering/deciphering device according to claim 3, further comprising transfer judging means for judging whether or not the data relating to the key stored in said operation storage medium or said supervisor storage medium has been transferred to the other storage medium, and reading inhibition controlling means for inhibiting the data relating to the key stored in the original operation storage medium or supervisor storage medium from being read out in response to the fact that the transfer judging means judges that the data has been transferred to the other storage medium.

22. The enciphering/deciphering device according to claim 21, further comprising first reading inhibition release controlling means for releasing the inhibition of the reading of the data in the operation storage medium by said reading inhibition controlling means.

23. The enciphering/deciphering device according to claim 3, wherein said operation identification data or said supervisor identification data is random-number data or enciphered time data.

24. The enciphering/deciphering device according to claim 4, wherein said supervisor storage medium or said operation storage medium stores a version code, and said third storage controlling means stores in said first storage medium said version code in addition to said ciphertext data, said first enciphered key and said second enciphered key.

25. The enciphering/deciphering device according to claim 14, wherein version codes are respectively stored in said first storage medium, said operation storage medium and said supervisor storage medium, further comprising comparing means for comparing the version code read out by said first reading means with the version code read out by said second reading means or the version code read out by said third reading means, and key formation controlling means for allowing the formation of the data decryption key by said first key deciphering means and the formation of the data decryption key by said second key deciphering means when it is judged that the version code read out by said first reading means represents an older version than a version represented by the version code read out by said second reading means or the version code read out by said third reading means as a result of the comparison by said comparing means.

26. The enciphering/deciphering device according to claim 3, wherein time data is fed as input data, an initial value or an enciphered key to enciphering means, and enciphered data obtained from said enciphering means is used as said data encryption key, said secret key or said management key.

27. An enciphering/deciphering method using operation storage media each storing inherent operation identification data and a supervisor storage medium storing inherent supervisor identification data, comprising the steps of:

forming a data encryption key used for enciphering plaintext data;

forming a secret key used for enciphering the formed data encryption key;

forming a management key used for enciphering the formed data encryption key;

storing in said operation storage medium the formed secret key and the formed management key; and storing the formed management key in said supervisor storage medium.

28. An enciphering/deciphering method using operation storage media each storing inherent operation identification data and a supervisor storage medium storing inherent supervisor identification data, comprising the steps of:

forming a data encryption key used for enciphering plaintext data;

forming a secret key used for enciphering the formed data encryption key, forming a management key used for enciphering the formed data encryption key;

storing in said operation storage medium the formed secret key and the formed management key;

storing the formed management key in said supervisor storage medium;

enciphering said plaintext data using said data encryption key to form ciphertext data;

enciphering said data encryption key using said secret key to form a first enciphered key;

enciphering said data encryption key using said management key to form a second enciphered key; and storing in a first storage medium said ciphertext data, said first enciphered key and said second enciphered key.

29. The enciphering/deciphering method according to claim 27, further comprising the step of storing the management key stored in one operation storage medium in the other operation storage medium.

30. An enciphering/deciphering method comprising the steps of:

reading out from a first storage medium storing ciphertext data, a first enciphered key and a second enciphered key the ciphertext data, the first enciphered key and the second enciphered key;

reading out from an operation storage medium storing an inherent operation identification name, inherent operation identification data, and a secret key for deciphering said first enciphered key said secret key;

deciphering said first enciphered key using said secret key read out to form a data decryption key;

deciphering said ciphertext data using the formed data decryption key to form plaintext data; and storing the formed plaintext data in a second storage medium.

31. The enciphering/deciphering method according to claim 30, further comprising the steps of reading out from an operation storage medium storing inherent operation identification data, a secret key for deciphering said first enciphered key, and a management key for the other operation storage medium said management key, and deciphering said second enciphered key using said management key read out to form a data decryption key.

32. The enciphering/deciphering method according to claim 29, comprising the step of performing encryption processing using time data as input data, an initial value or an encryption key, enciphered data obtained by the encryption processing being used as said data encryption key, said secret key or said management key.

33. An enciphering/deciphering method according to claim 30, further comprising the steps of reading out from a supervisor storage medium storing said operation identification name, said operation identification data, an inherent supervisor identification name, inherent supervisor identification data and a management key for deciphering said second enciphered key said management key, and deciphering said second enciphered key using said management key read out to form a data decryption key.

34. A computer readable operation storage medium which is used in an enciphering/deciphering device including a computer and is managed by a supervisor storage medium, the operation storage medium storing therein supervisor identification data inherent to said supervisor storage medium, an enciphered secret key obtained by enciphering a secret key for enciphering a data encryption key used for enciphering plaintext data, a decryption program for deciphering said enciphered secret key to obtain the secret key, an enciphered management key obtained by enciphering a management key for enciphering said data encryption key, and a decryption program for deciphering said enciphered management key to obtain the management key.

35. The operation storage medium according to claim 34, said operation storage medium storing therein an enciphered management key stored in the other operation storage medium than said operation storage medium.

36. A computer readable supervisor storage medium, which is used in an enciphering/deciphering device including a computer, for managing operation storage media each storing therein an enciphered secret key obtained by enciphering a secret key for enciphering a data encryption key used for enciphering a plaintext data and a first enciphered management key obtained by enciphering a management key for enciphering the data encryption key, the supervisor storage medium storing therein operation identification data inherent to said operation storage media, inherent supervisor identification data, a second enciphered management key obtained by enciphering the same management key as said management key, and a decryption program for deciphering said second enciphered management key to obtain said management key.

37. The supervisor storage medium according to claim 36, wherein said operation identification data includes a given operation identification name, said supervisor storage medium storing therein a program for displaying a list of the operation identification names stored therein.

38. The supervisor storage medium according to claim 36 further storing therein a program for erasing, from a storage medium storing therein ciphertext data enciphered using said data encryption key, a first enciphered key which is to be deciphered by said secret key and a second enciphered key which is to be deciphered by said management key, said first enciphered key.

39. The supervisor storage medium according to claim 36, wherein version codes are respectively stored in a storage medium, said operation storage medium and said supervisor storage medium, said supervisor storage medium further storing therein, a comparing program for comparing the version code read out from said storage medium with the version code read out from said operation storage medium or the version code read out from said supervisor storage medium, and a program for allowing the deciphering of said first enciphered management key and the deciphering of said second enciphered management key when it is judged that the version code read out from said storage medium represents an older version than or equal to a version represented by the version code read out from said operation storage medium or the version code read out from said supervisor storage medium as a result of the comparison by said comparing program.

* * * * *